US008483854B2

(12) United States Patent
Nagaraja et al.

(10) Patent No.: US 8,483,854 B2
(45) Date of Patent: Jul. 9, 2013

(54) SYSTEMS, METHODS, AND APPARATUS FOR CONTEXT PROCESSING USING MULTIPLE MICROPHONES

(75) Inventors: Nagendra Nagaraja, Bangalore (IN); Khaled El-Maleh, San Diego, CA (US); Eddie L. T. Choy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 889 days.

(21) Appl. No.: 12/129,421

(22) Filed: May 29, 2008

(65) Prior Publication Data

US 2009/0190780 A1 Jul. 30, 2009

Related U.S. Application Data

(60) Provisional application No. 61/024,104, filed on Jan. 28, 2008.

(51) Int. Cl.
*G06F 17/00* (2006.01)

(52) U.S. Cl.
USPC ............................ 700/94; 381/94.1; 381/94.7

(58) Field of Classification Search
USPC ........................................ 381/94.1, 317, 94.7
See application file for complete search history.

(56) References Cited

U.S. PATENT DOCUMENTS

| | | | |
|---|---|---|---|
| 5,537,509 | A | 7/1996 | Swaminathan et al. |
| 5,742,734 | A | 4/1998 | DeJaco et al. |
| 5,839,101 | A | 11/1998 | Vahatalo et al. |
| 5,960,389 | A | 9/1999 | Jarvinen et al. |
| 6,167,417 | A | 12/2000 | Parra et al. |
| 6,330,532 | B1 | 12/2001 | Manjunath et al. |
| 6,526,139 | B1 | 2/2003 | Rousell et al. |
| 6,691,084 | B2 | 2/2004 | Manjunath et al. |
| 6,717,991 | B1 | 4/2004 | Gustafsson et al. |
| 6,738,482 | B1 | 5/2004 | Jaber |
| 6,782,361 | B1 | 8/2004 | El-Maleh |
| 6,873,604 | B1 | 3/2005 | Surazski et al. |
| 7,133,825 | B2 | 11/2006 | Bou-Ghazale |

(Continued)

FOREIGN PATENT DOCUMENTS

| | | | |
|---|---|---|---|
| CN | 1132988 | A | 10/1996 |
| CN | 1247663 | A | 3/2000 |

(Continued)

OTHER PUBLICATIONS

International Preliminary Report on Patentability—PCT/US2008/078324, The International Bureau of WIPO—Geneva, Switzerland, Jan. 5, 2010.

(Continued)

*Primary Examiner* — Joseph Saunders, Jr.
(74) *Attorney, Agent, or Firm* — Espartaco Diaz Hidalgo

(57) ABSTRACT

Configurations disclosed herein include systems, methods, and apparatus that may be applied in a voice communications and/or storage application to remove, enhance, and/or replace the existing context. In one aspect, a method of processing a digital audio signal that includes a first audio context is disclosed. The method comprises based on a first audio signal that is produced by a first microphone, suppressing the first audio context from the digital audio signal to obtain a context-suppressed signal. The method may further comprise selecting a second context based on the first audio context, and mixing the second audio context with a signal that is based on the context-suppressed signal to obtain a context-enhanced signal.

26 Claims, 37 Drawing Sheets

U.S. PATENT DOCUMENTS

| | | | | |
|---|---|---|---|---|
| 7,162,212 | B2 | 1/2007 | Bennetts et al. | |
| 7,165,030 | B2 | 1/2007 | Yi et al. | |
| 7,174,022 | B1 | 2/2007 | Zhang | |
| 7,260,536 | B1 | 8/2007 | Abu-Samaha | |
| 7,295,972 | B2 | 11/2007 | Choi | |
| 7,536,298 | B2 * | 5/2009 | Ramkumar et al. | 704/201 |
| 7,539,615 | B2 | 5/2009 | Koistinen et al. | |
| 7,567,898 | B2 | 7/2009 | Bennett | |
| 7,613,607 | B2 | 11/2009 | Valve et al. | |
| 7,649,988 | B2 | 1/2010 | Suppappola et al. | |
| 7,657,427 | B2 | 2/2010 | Jelinek | |
| 7,668,714 | B1 | 2/2010 | Croak et al. | |
| 2001/0039873 | A1 | 11/2001 | Yi | |
| 2002/0025048 | A1 | 2/2002 | Gustafsson et al. | |
| 2002/0156623 | A1 | 10/2002 | Yoshida | |
| 2003/0200092 | A1 | 10/2003 | Gao et al. | |
| 2004/0133421 | A1 | 7/2004 | Burnett | |
| 2004/0204135 | A1 | 10/2004 | Zhao | |
| 2004/0230428 | A1 | 11/2004 | Choi | |
| 2005/0059434 | A1 | 3/2005 | Hong | |
| 2005/0152563 | A1 * | 7/2005 | Amada et al. | 381/94.1 |
| 2006/0215683 | A1 | 9/2006 | Sukkar et al. | |
| 2007/0027682 | A1 | 2/2007 | Bennett | |
| 2007/0100605 | A1 | 5/2007 | Renevey et al. | |
| 2007/0171931 | A1 | 7/2007 | Manjunath et al. | |
| 2007/0265842 | A1 | 11/2007 | Jarvinen et al. | |
| 2007/0286426 | A1 | 12/2007 | Xiang | |
| 2008/0208538 | A1 | 8/2008 | Visser et al. | |
| 2009/0089053 | A1 | 4/2009 | Choy et al. | |
| 2009/0089054 | A1 | 4/2009 | Wang et al. | |
| 2009/0192790 | A1 | 7/2009 | El-Maleh et al. | |
| 2009/0192791 | A1 | 7/2009 | El-Maleh et al. | |
| 2009/0192802 | A1 | 7/2009 | Nagaraja et al. | |
| 2009/0192803 | A1 | 7/2009 | Nagaraja et al. | |

FOREIGN PATENT DOCUMENTS

| | | | |
|---|---|---|---|
| EP | 1139227 | A2 | 10/2001 |
| EP | 1139337 | | 10/2001 |
| EP | 1509065 | | 2/2005 |
| JP | 10039897 | A | 2/1998 |
| JP | 2000004494 | A | 1/2000 |
| JP | 2000332677 | A | 11/2000 |
| JP | 2002515608 | A | 5/2002 |
| JP | 2002542689 | A | 12/2002 |
| JP | 2006081051 | A | 3/2006 |
| WO | 98024053 | | 6/1998 |
| WO | 2006052395 | | 5/2006 |

OTHER PUBLICATIONS

International Search Report—PCT/US08/078325—International Search Authority—European Patent Office—Feb. 18, 2009.

International Search Report—PCT/US08/078327—International Search Authority—European Patent Office—Apr. 28, 2009.

International Search Report—PCT/US08/078329—International Search Authority—European Patent Office—Jan. 15, 2009.

International Search Report—PCT/US08/078332—International Search Authority—European Patent Office—Dec. 12, 2008.

Partial International Search Report—PCT/US08/078325—International Search Authority—European Patent Office—Dec. 8, 2008.

Partial International Search Report—PCT/US08/078327—International Search Authority—European Patent Office—Dec. 29, 2008.

Written Opinion—PCT/US08/078325—International Search Authority—European Patent Office—Feb. 18, 2009.

Written Opinion—PCT/US08/078327—International Search Authority—European Patent Office—Apr. 28, 2009.

Written Opinion—PCT/US08/078329—International Search Authority—European Patent Office—Jan. 15, 2009.

Written Opinion—PCT/US08/078332—International Search Authority—European Patent Office—Dec. 12, 2008.

M. Athineos et al. Sound texture modelling with linear prediction in both time and frequency domains. Proc. ICASSP-2003, Apr. 2003, Hong Kong, China. Last accessed Jan. 14, 2007 at www.ee.columbia.edu/~dpwe/pubs/icassp03-ctflp.pdf (4 pp.).

Mobile firm offers 'phoney alibi'. BBC News. Mar. 10, 2004. Last accessed Jan. 14, 2007 at http://news.bbc.co.uk/2/hi/technology/3498714.stm (2 pp.).

M. Cardle et al. Sound-by-Numbers: Motion-Driven Sound Synthesis. Eurographics/SIGGRAPH Symposium on Computer Animation, 2003. Last accessed Jan. 14, 2007 at http://www.cardle.info/lab/publications/SoundbyNumbers2003_Cardle.pdf (7 pp.).

H.-T. Cheng et al. A Collaborative Privacy-Enhanced Alibi Phone. Proc. Int'l Conf. on Grid and Pervasive Computing, Taiwan, May 2006, pp. 405-414.

H.-T. Cheng et al. A Collaborative Privacy-Enhanced Alibi Phone. Last accessed Jan. 14, 2007 at www.cooperatique.com/doc/alibi_phone_globecom_2005.pdf (6 pp.).

H.-T. Cheng et al. DoCoDeMo Phone: An Imperceptible Approach for Privacy Protection. Last accessed Jan. 14, 2007 at www.csie.ntu,edu.tw/~hchu/papers/persec_2005.pdf (5 pp.).

S. Dubnov et al. Synthesizing Sound Textures through Wavelet Tree Learning. IEEE Computer Graphics and Applications, Jul./Aug. 2002, pp. 38-48.

S. Dubnov et al. Synthesis of Sound Textures by Learning and Resampling of Wavelet Trees. Last accessed Jan. 14, 2007 at www.cs.cmu.edu/~zivbj/graphics/soundTexture.pdf (26 pp.).

K.H. El-Maleh. Classification-Based Techniques for Digital Coding of Speech-plus-Noise. Ph.D. thesis, McGill Univ., Montreal, Canada, Jan. 2004.

ETSI Standard ES 202 050 V1.1.5 (Jan. 2007). Speech Processing, Transmission and Quality Aspects (STQ); Distributed speech recognition; Advanced front-end feature extraction algorithm; Compression algorithms. European Telecommunications Standards Institute, 2007.

H. Francois et al. Dual-microphone robust front-end for arm's-length speech recognition. IWAENC 2006, Paris, France, Sep. 12-14, 2006. Last accessed Jan. 14, 2007 at www.iwaenc06.enst.fr/iwaenc2006/pdf/A19.pdf (4 pp.).

H.W. Gierlich et al. Background Noise Transmission and Comfort Noise Insertion: The Influence of Signal Processing on "Speech"-Quality in Complex Telecommunication Scenarios. Last accessed Jan. 14, 2007 at www.head-acoustics.de/downloads/publications/speech_quality/157.pdf (4 pp.).

H. Gustafsson et al. Dual-Microphone Spectral Subtraction. Research report 2/00, Univ. of Karlskrona, Sweden ISSN 1103-1581.

R. Hoskinson. Manipulation and Resynthesis of Environmental Sounds with Natural Wavelet Grains. M.S. thesis, Univ. of British Columbia, Vancouver, Canada, 2002.

C. Liu et al. A two-microphone dual delay-line approach for extraction of a speech sound in the presence of multiple interferers. J. Acoust. Soc. Am., vol. 110, No. 6, Dec. 2001, pp. 3218-3231.

L. Ma et al. Context Awareness using Environmental Noise Classification. Proc. Eurospeech 2003, Geneva, Switzerland, pp. 2237-2240.

A. Misra et al. A new paradigm for sound design. Proc. Ninth Int'l Conf. on Digital Audio Effects, Montreal, Canada, Sep. 2006, pp. DAFX-319-DAFX-324.

Y. Qian et al. Classified Comfort Noise Generation for Efficient Voice Transmission. Interspeech 2006, Sep. 17-21, Pittsburgh, PA. Last accessed Jan. 14, 2007 at http://www.ece.mcgill.ca/~pkabal/papers/2006/QianC2006.pdf (4 pp.).

H. Saruwatari et al. Blind Source Separation Combining Independent Component Analysis and Beamforming. EURASIP Journal on Applied Signal Processing 2003:11, 1135-1146, 2003.

G. Strobl. Parametric Sound Texture Generator. Thesis, Univ. of Music and Dramatic Arts, Graz, Austria, Jan. 2007.

G. Strobl et al. Sound texture modeling: a survey. Last accessed Jan. 14, 2007 at pagesperso-orange.fr/gmem/smc06/papers/8-soundtexturemodelingSMC06.pdf (5 pp.).

M. Tuffy. The Removal of Environmental Noise in Cellular Communications by Perceptual Techniques. Ph.D. thesis, Univ. of Edinburgh, UK, 1999.

DAS, U.S. Appl. No. 09/191,643 *Closed-Loop Variable-Rate Multimode Predictive Speech Coder, filed Nov. 13, 1998.

"Speech processing devices for acoustic enhancement; p. 330 (Mar. 2003)" ITU-T Standard in Force (I). International Telecommunication Union, Geneva, CH, No. P 330, Mar. 16, 2003, XP017402414.

Bar-Joseph Z et al: "Synthesizing sound textures through wavelet tree learning" IEEE Computer Graphics and Applications, IEEE Service Center, New York, NY, US, vol. 22, No. 4, Jul. 1, 2002, pp. 38-48, XP011094556.
El Maleh et al, "Frame-level Noise Classification in Mobile Environments," Proc. IEEE Int'l Conf. ASSP, 1999, vol. I, pp. 237-240.
L. Molgedey et al. "Separation of a mixture of independent signals using time delayed correlations," Phys. Rev. Lett., 72(23): 3634-3637, 1994.
L. Parra et al, "Convolutive blind source separation of non-stationary sources", IEEE Trans. On Speech and Audio Processing, 8(3): 320-327, May 2000.
Philip Arden BT United Kingdom: "Proposed first draft of G.IPP: Transmission performance parameters of IP networks affecting perceived speech quality and other voiceband services; D 126" ITU-T Draft Study Period 2001-52001, International Telecommunication.
Y. Qian. "Classified Comfort Noise Generation for Efficient Voice Transmission" Interspeech 2006—ICSLP, pp. 225-228.
R. Mukai et al, "Removal of residual crosstalk components in blind source separation using LMS filters," Proc. of 12th IEEE Workshop on Neural Networks of Signal Processing, pp. 435-444, Martigny, Switzerland, Sep. 2002.
R. Mukai et al.: "Removal of residual cross-talk components in blind source separation using time-delayed spectral subtraction," Proc of ICASSP 2002, pp. 1789-1792, May 2002.
S. Amari et al.: "A New Learning Algorithm for Blind Signal Separation" In: Advances in Neural Information Processing Systems, 8, pp. 757-763, 1996.
S F. Boll, "Supperession of Acoustic Noise in Speech Using Spectral Subtraction" IEEE Trans. Acoustics, Speech and Signal Processing, 27(2): 112-120, Apr. 1979.
Yamato K et al.: "Post-processing noise suppressor with adaptive gain-flooring for cell-phone handsets and IC recorders" Internet Citation, [Online] 2004, XP002470252, Retrieved from the Internet: URL:http://ieeexplore.ieee.org/iel5/4145986/4099325/0414609.
Yektaeian M et al "Comparison of spectral subtraction methods used in noise suppression algorithms" Information, Communications &Signal Processing, 2007 6th International Conference on, IEEE, Piscataway, NJ, USA, Dec. 10, 2007, pp. 1-4, XP031229350.
ETSI TS 126 092 V.6.0.0 "Adaptive Multi Rate (AMR)," ch. 6 Dec. 2004.
Rosenberg et al.: RFC 3261, "SIP: Session Initiation Protocol", Jun. 2002, pp. 1-269.
International Search Report—PCT/US08/078324—International Search Authority—European Patent Office—Dec. 1, 2008.
Written Opinion—PCT/US08/078324—International Search Authority—European Patent Office—Dec. 1, 2008.
Petrovsky, et al., "Auditory Model Based Speech Enhancement System for Hands-Free Devices". Proc. EUSIPCO 2002, vol. 1, Toulouse, France, 2002, pp. 487-490.
S.M.Kuo, et al., Integrated near-end acoustic echo and noise reduction systems, ISCAS 2003, vol. 4, pp. 412-415, May 2003.

* cited by examiner

FIG. 13A
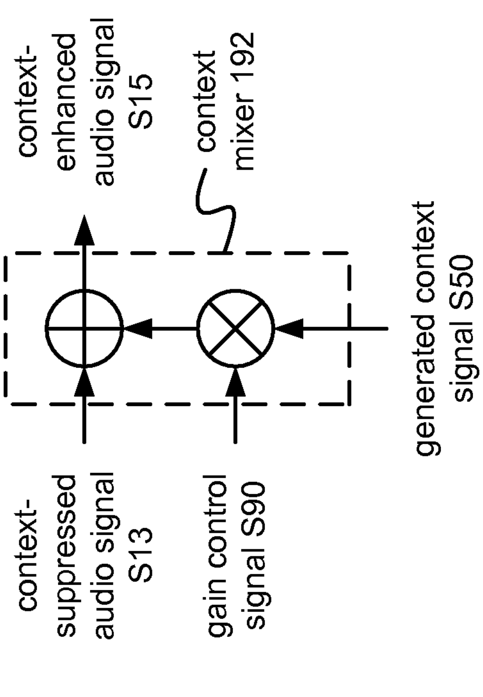
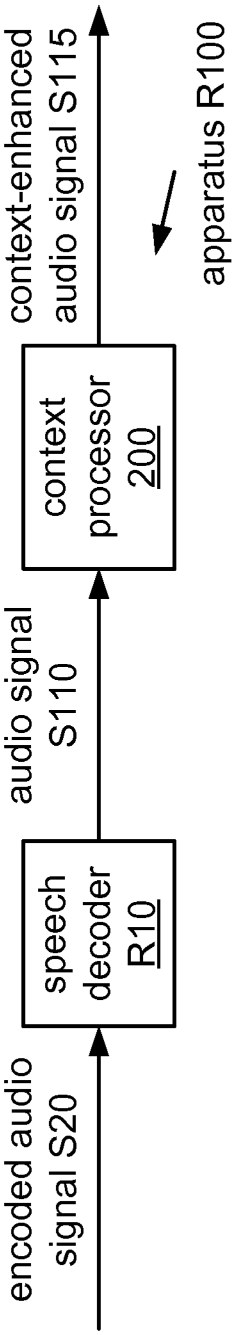
FIG. 13B

SYSTEMS, METHODS, AND APPARATUS FOR CONTEXT PROCESSING USING MULTIPLE MICROPHONES

RELATED APPLICATIONS

Claim of Priority Under 35 U.S.C. §119

The present Application for patent claims priority to Provisional Application No. 61/024,104 entitled "SYSTEMS, METHODS, AND APPARATUS FOR CONTEXT PROCESSING" filed Jan. 28, 2008, and assigned to the assignee hereof.

REFERENCE TO CO-PENDING APPLICATIONS FOR PATENT

The present Application for patent is related to the following co-pending U.S. patent applications:

"SYSTEMS, METHODS, AND APPARATUS FOR CONTEXT SUPPRESSION USING RECEIVERS", having Ser. No. 12/129,455, filed concurrently herewith, assigned to the assignee hereof, "SYSTEMS, METHODS, AND APPARATUS FOR CONTEXT DESCRIPTOR TRANSMISSION" having Ser. No. 12/129,525, filed concurrently herewith, assigned to the assignee hereof, "SYSTEMS, METHODS, AND APPARATUS FOR CONTEXT PROCESSING USING MULTI RESOLUTION ANALYSIS" having Ser. No. 12/129,466, filed concurrently herewith, assigned to the assignee hereof, and "SYSTEMS, METHODS, AND APPARATUS FOR CONTEXT REPLACEMENT BY AUDIO LEVEL" having Ser. No. 12/129,483, filed concurrently herewith, assigned to the assignee hereof.

FIELD

This disclosure relates to processing of speech signals.

BACKGROUND

Applications for communication and/or storage of a voice signal typically use a microphone to capture an audio signal that includes the sound of a primary speaker's voice. The part of the audio signal that represents the voice is called the speech or speech component. The captured audio signal will usually also include other sound from the microphone's ambient acoustic environment, such as background sounds. This part of the audio signal is called the context or context component.

Transmission of audio information, such as speech and music, by digital techniques has become widespread, particularly in long distance telephony, packet-switched telephony such as Voice over IP (also called VoIP, where IP denotes Internet Protocol), and digital radio telephony such as cellular telephony. Such proliferation has created interest in reducing the amount of information used to transfer a voice communication over a transmission channel while maintaining the perceived quality of the reconstructed speech. For example, it is desirable to make the best use of available wireless system bandwidth. One way to use system bandwidth efficiently is to employ signal compression techniques. For wireless systems which carry speech signals, speech compression (or "speech coding") techniques are commonly employed for this purpose.

Devices that are configured to compress speech by extracting parameters that relate to a model of human speech generation are often called voice coders, codecs, vocoders, "audio coders," or "speech coders," and the description that follows uses these terms interchangeably. A speech coder generally includes a speech encoder and a speech decoder. The encoder typically receives a digital audio signal as a series of blocks of samples called "frames," analyzes each frame to extract certain relevant parameters, and quantizes the parameters into an encoded frame. The encoded frames are transmitted over a transmission channel (i.e., a wired or wireless network connection) to a receiver that includes a decoder. Alternatively, the encoded audio signal may be stored for retrieval and decoding at a later time. The decoder receives and processes encoded frames, dequantizes them to produce the parameters, and recreates speech frames using the dequantized parameters.

In a typical conversation, each speaker is silent for about sixty percent of the time. Speech encoders are usually configured to distinguish frames of the audio signal that contain speech ("active frames") from frames of the audio signal that contain only context or silence ("inactive frames"). Such an encoder may be configured to use different coding modes and/or rates to encode active and inactive frames. For example, inactive frames are typically perceived as carrying little or no information, and speech encoders are usually configured to use fewer bits (i.e., a lower bit rate) to encode an inactive frame than to encode an active frame.

Examples of bit rates used to encode active frames include 171 bits per frame, eighty bits per frame, and forty bits per frame. Examples of bit rates used to encode inactive frames include sixteen bits per frame. In the context of cellular telephony systems (especially systems that are compliant with Interim Standard (IS)-95 as promulgated by the Telecommunications Industry Association, Arlington, Va., or a similar industry standard), these four bit rates are also referred to as "full rate," "half rate," "quarter rate," and "eighth rate," respectively.

SUMMARY

This document describes a method of processing a digital audio signal that includes a first audio context. This method includes suppressing the first audio context from the digital audio signal, based on a first audio signal that is produced by a first microphone, to obtain a context-suppressed signal. This method also includes mixing a second audio context with a signal that is based on the context-suppressed signal to obtain a context-enhanced signal. In this method, the digital audio signal is based on a second audio signal that is produced by a second microphone different than the first microphone. This document also describes an apparatus, a combination of means, and a computer-readable medium relating to this method.

This document also describes a method of processing a digital audio signal that is based on a signal received from a first transducer. This method includes suppressing a first audio context from the digital audio signal to obtain a context-suppressed signal; mixing a second audio context with a signal that is based on the context-suppressed signal to obtain a context-enhanced signal; converting a signal that is based on at least one among (A) the second audio context and (B) the context-enhanced signal to an analog signal; and using a second transducer to produce an audible signal that is based on the analog signal. In this method, both of the first and second transducers are located within a common housing.

This document also describes an apparatus, a combination of means, and a computer-readable medium relating to this method.

This document also describes a method of processing an encoded audio signal. This method includes decoding a first plurality of encoded frames of the encoded audio signal according to a first coding scheme to obtain a first decoded audio signal that includes a speech component and a context component; decoding a second plurality of encoded frames of the encoded audio signal according to a second coding scheme to obtain a second decoded audio signal; and, based on information from the second decoded audio signal, suppressing the context component from a third signal that is based on the first decoded audio signal to obtain a context-suppressed signal. This document also describes an apparatus, a combination of means, and a computer-readable medium relating to this method.

This document also describes a method of processing a digital audio signal that includes a speech component and a context component. This method includes suppressing the context component from the digital audio signal to obtain a context-suppressed signal; encoding a signal that is based on the context-suppressed signal to obtain an encoded audio signal; selecting one among a plurality of audio contexts; and inserting information relating to the selected audio context into a signal that is based on the encoded audio signal. This document also describes an apparatus, a combination of means, and a computer-readable medium relating to this method.

This document also describes a method of processing a digital audio signal that includes a speech component and a context component. This method includes suppressing the context component from the digital audio signal to obtain a context-suppressed signal; encoding a signal that is based on the context-suppressed signal to obtain an encoded audio signal; over a first logical channel, sending the encoded audio signal to a first entity; and, over a second logical channel different than the first logical channel, sending to a second entity (A) audio context selection information and (B) information identifying the first entity. This document also describes an apparatus, a combination of means, and a computer-readable medium relating to this method.

This document also describes a method of processing an encoded audio signal. This method includes, within a mobile user terminal, decoding the encoded audio signal to obtain a decoded audio signal; within the mobile user terminal, generating an audio context signal; and, within the mobile user terminal, mixing a signal that is based on the audio context signal with a signal that is based on the decoded audio signal. This document also describes an apparatus, a combination of means, and a computer-readable medium relating to this method.

This document also describes a method of processing a digital audio signal that includes a speech component and a context component. This method includes suppressing the context component from the digital audio signal to obtain a context-suppressed signal; generating an audio context signal that is based on a first filter and a first plurality of sequences, each of the first plurality of sequences having a different time resolution; and mixing a first signal that is based on the generated audio context signal with a second signal that is based on the context-suppressed signal to obtain a context-enhanced signal. In this method, generating an audio context signal includes applying the first filter to each of the first plurality of sequences. This document also describes an apparatus, a combination of means, and a computer-readable medium relating to this method.

This document also describes a method of processing a digital audio signal that includes a speech component and a context component. This method includes suppressing the context component from the digital audio signal to obtain a context-suppressed signal; generating an audio context signal; mixing a first signal that is based on the generated audio context signal with a second signal that is based on the context-suppressed signal to obtain a context-enhanced signal; and calculating a level of a third signal that is based on the digital audio signal. In this method, at least one among the generating and the mixing includes controlling, based on the calculated level of the third signal, a level of the first signal. This document also describes an apparatus, a combination of means, and a computer-readable medium relating to this method.

This document also describes a method of processing a digital audio signal according to a state of a process control signal, where the digital audio signal has a speech component and a context component. This method includes encoding frames of a part of the digital audio signal that lacks the speech component at a first bit rate when the process control signal has a first state. This method includes suppressing the context component from the digital audio signal, when the process control signal has a second state different than the first state, to obtain a context-suppressed signal. This method includes mixing an audio context signal with a signal that is based on the context-suppressed signal, when the process control signal has the second state, to obtain a context-enhanced signal. This method includes encoding frames of a part of the context-enhanced signal that lacks the speech component at a second bit rate when the process control signal has the second state, where the second bit rate is higher than the first bit rate. This document also describes an apparatus, a combination of means, and a computer-readable medium relating to this method.

BRIEF DESCRIPTION OF THE DRAWINGS

FIG. 13A shows a block diagram of an implementation 192 of context mixer 190.

FIG. 13B shows a block diagram of an apparatus R100 according to a configuration.

Figure 1A:
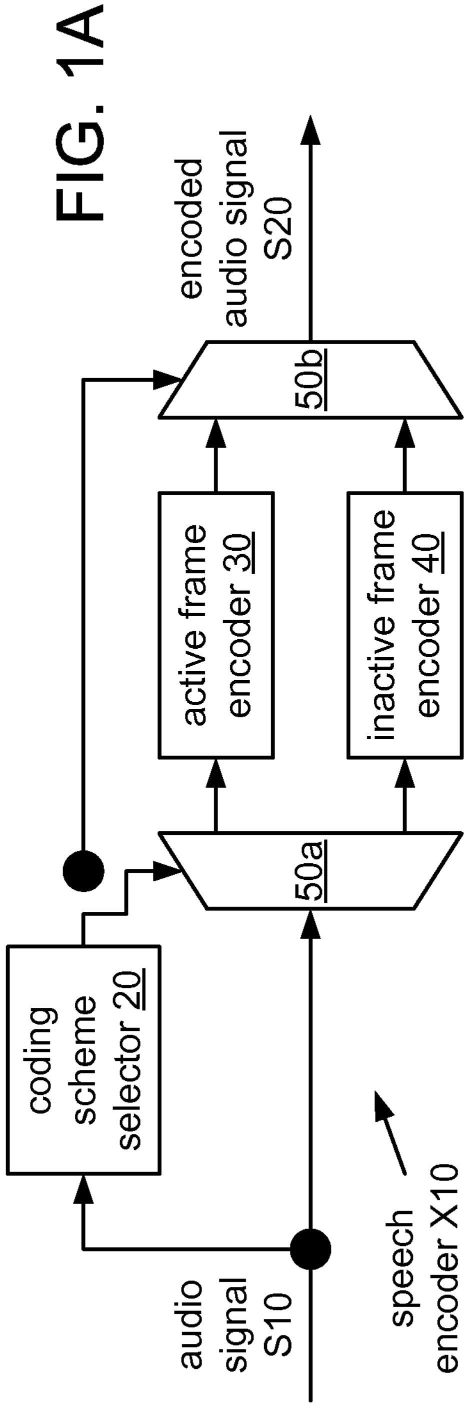
FIG. 1A shows a block diagram of a speech encoder X10.

In these figures, the same reference labels refer to the same or analogous elements.

DETAILED DESCRIPTION

Although the speech component of an audio signal typically carries the primary information, the context component also serves an important role in voice communications applications such as telephony. As the context component is present during both active and inactive frames, its continued reproduction during inactive frames is important to provide a sense of continuity and connectedness at the receiver. The reproduction quality of the context component may also be important for naturalness and overall perceived quality, especially for hands-free terminals which are used in noisy environments.

Mobile user terminals such as cellular telephones allow voice communications applications to be extended into more locations than ever before. As a consequence, the number of different audio contexts that may be encountered is increasing. Existing voice communications applications typically treat the context component as noise, although some contexts are more structured than others and may be harder to encode recognizably.

In some cases, it may be desirable to suppress and/or mask the context component of an audio signal. For security reasons, for example, it may be desirable to remove the context component from the audio signal before transmission or storage. Alternatively, it may be desirable to add a different context to the audio signal. For example, it may be desirable to create an illusion that the speaker is at a different location and/or in a different environment. Configurations disclosed herein include systems, methods, and apparatus that may be applied in a voice communications and/or storage application to remove, enhance, and/or replace the existing audio context. It is expressly contemplated and hereby disclosed that the configurations disclosed herein may be adapted for use in networks that are packet-switched (for example, wired and/or wireless networks arranged to carry voice transmissions according to protocols such as VoIP) and/or circuit-switched. It is also expressly contemplated and hereby disclosed that the configurations disclosed herein may be adapted for use in narrowband coding systems (e.g., systems that encode an audio frequency range of about four or five kilohertz) and for use in wideband coding systems (e.g., systems that encode audio frequencies greater than five kilohertz), including whole-band coding systems and split-band coding systems.

Unless expressly limited by its context, the term “signal” is used herein to indicate any of its ordinary meanings, including a state of a memory location (or set of memory locations) as expressed on a wire, bus, or other transmission medium. Unless expressly limited by its context, the term “generating” is used herein to indicate any of its ordinary meanings, such as computing or otherwise producing. Unless expressly limited by its context, the term "calculating" is used herein to indicate any of its ordinary meanings, such as computing, evaluating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B").

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). Unless indicated otherwise, the term "context" (or "audio context") is used to indicate a component of an audio signal that is different than the speech component and conveys audio information from the ambient environment of the speaker, and the term "noise" is used to indicate any other artifact in the audio signal that is not part of the speech component and does not convey information from the ambient environment of the speaker.

For speech coding purposes, a speech signal is typically digitized (or quantized) to obtain a stream of samples. The digitization process may be performed in accordance with any of various methods known in the art including, for example, pulse code modulation (PCM), companded mu-law PCM, and companded A-law PCM. Narrowband speech encoders typically use a sampling rate of 8 kHz, while wideband speech encoders typically use a higher sampling rate (e.g., 12 or 16 kHz).

The digitized speech signal is processed as a series of frames. This series is usually implemented as a nonoverlapping series, although an operation of processing a frame or a segment of a frame (also called a subframe) may also include segments of one or more neighboring frames in its input. The frames of a speech signal are typically short enough that the spectral envelope of the signal may be expected to remain relatively stationary over the frame. A frame typically corresponds to between five and thirty-five milliseconds of the speech signal (or about forty to 200 samples), with ten, twenty, and thirty milliseconds being common frame sizes. Typically all frames have the same length, and a uniform frame length is assumed in the particular examples described herein. However, it is also expressly contemplated and hereby disclosed that nonuniform frame lengths may be used.

A frame length of twenty milliseconds corresponds to 140 samples at a sampling rate of seven kilohertz (kHz), 160 samples at a sampling rate of eight kHz, and 320 samples at a sampling rate of 16 kHz, although any sampling rate deemed suitable for the particular application may be used. Another example of a sampling rate that may be used for speech coding is 12.8 kHz, and further examples include other rates in the range of from 12.8 kHz to 38.4 kHz.

FIG. 1A shows a block diagram of a speech encoder X10 that is configured to receive an audio signal S10 (e.g., as a series of frames) and to produce a corresponding encoded audio signal S20 (e.g., as a series of encoded frames). Speech encoder X10 includes a coding scheme selector 20, an active frame encoder 30, and an inactive frame encoder 40. Audio signal S10 is a digital audio signal that includes a speech component (i.e., the sound of a primary speaker's voice) and a context component (i.e., ambient environmental or background sounds). Audio signal S10 is typically a digitized version of an analog signal as captured by a microphone.

Coding scheme selector 20 is configured to distinguish active frames of audio signal S10 from inactive frames. Such an operation is also called "voice activity detection" or "speech activity detection," and coding scheme selector 20 may be implemented to include a voice activity detector or speech activity detector. For example, coding scheme selector 20 may be configured to output a binary-valued coding scheme selection signal that is high for active frames and low for inactive frames. FIG. 1A shows an example in which the coding scheme selection signal produced by coding scheme selector 20 is used to control a pair of selectors 50*a* and 50*b* of speech encoder X10.

Coding scheme selector 20 may be configured to classify a frame as active or inactive based on one or more characteristics of the energy and/or spectral content of the frame such as frame energy, signal-to-noise ratio (SNR), periodicity, spectral distribution (e.g., spectral tilt), and/or zero-crossing rate. Such classification may include comparing a value or magnitude of such a characteristic to a threshold value and/or comparing the magnitude of a change in such a characteristic (e.g., relative to the preceding frame) to a threshold value. For example, coding scheme selector 20 may be configured to evaluate the energy of the current frame and to classify the frame as inactive if the energy value is less than (alternatively, not greater than) a threshold value. Such a selector may be configured to calculate the frame energy as a sum of the squares of the frame samples.

Another implementation of coding scheme selector 20 is configured to evaluate the energy of the current frame in each of a low-frequency band (e.g., 300 Hz to 2 kHz) and a high-frequency band (e.g., 2 kHz to 4 kHz) and to indicate that the frame is inactive if the energy value for each band is less than (alternatively, not greater than) a respective threshold value. Such a selector may be configured to calculate the frame energy in a band by applying a passband filter to the frame and calculating a sum of the squares of the samples of the filtered frame. One example of such a voice activity detection operation is described in section 4.7 of the Third Generation Partnership Project 2 (3GPP2) standards document C.S0014-C, v10 (January 2007), available online at www-dot-3gpp2-dot-org.

Additionally or in the alternative, such classification may be based on information from one or more previous frames and/or one or more subsequent frames. For example, it may be desirable to classify a frame based on a value of a frame characteristic that is averaged over two or more frames. It may be desirable to classify a frame using a threshold value that is based on information from a previous frame (e.g., background noise level, SNR). It may also be desirable to configure coding scheme selector 20 to classify as active one or more of the first frames that follow a transition in audio signal S10 from active frames to inactive frames. The act of continuing a previous classification state in such manner after a transition is also called a "hangover".

Active frame encoder 30 is configured to encode active frames of the audio signal. Encoder 30 may be configured to encode active frames according to a bit rate such as full rate, half rate, or quarter rate. Encoder 30 may be configured to encode active frames according to a coding mode such as code-excited linear prediction (CELP), prototype waveform interpolation (PWI), or prototype pitch period (PPP).

A typical implementation of active frame encoder 30 is configured to produce an encoded frame that includes a description of spectral information and a description of temporal information. The description of spectral information may include one or more vectors of linear prediction coding (LPC) coefficient values, which indicate the resonances of the encoded speech (also called "formants"). The description of spectral information is typically quantized, such that the LPC vector or vectors are usually converted into a form that may be quantized efficiently, such as line spectral frequencies (LSFs), line spectral pairs (LSPs), immittance spectral frequencies (ISFs), immittance spectral pairs (ISPs), cepstral coefficients, or log area ratios. The description of temporal information may include a description of an excitation signal, which is also typically quantized.

Inactive frame encoder 40 is configured to encode inactive frames. Inactive frame encoder 40 is typically configured to encode the inactive frames at a lower bit rate than the bit rate used by active frame encoder 30. In one example, inactive frame encoder 40 is configured to encode inactive frames at eighth rate using a noise-excited linear prediction (NELP) coding scheme. Inactive frame encoder 40 may also be configured to perform discontinuous transmission (DTX), such that encoded frames (also called "silence description" or SID frames) are transmitted for fewer than all of the inactive frames of audio signal S10.

A typical implementation of inactive frame encoder 40 is configured to produce an encoded frame that includes a description of spectral information and a description of temporal information. The description of spectral information may include one or more vectors of linear prediction coding (LPC) coefficient values. The description of spectral information is typically quantized, such that the LPC vector or vectors are usually converted into a form that may be quantized efficiently, as in the examples above. Inactive frame encoder 40 may be configured to perform an LPC analysis having an order that is lower than the order of an LPC analysis performed by active frame encoder 30, and/or inactive frame encoder 40 may be configured to quantize the description of spectral information into fewer bits than a quantized description of spectral information produced by active frame encoder 30. The description of temporal information may include a description of a temporal envelope (e.g., including a gain value for the frame and/or a gain value for each of a series of subframes of the frame), which is also typically quantized.

It is noted that encoders 30 and 40 may share common structure. For example, encoders 30 and 40 may share a calculator of LPC coefficient values (possibly configured to produce a result having a different order for active frames than for inactive frames) but have respectively different temporal description calculators. It is also noted that a software or firmware implementation of speech encoder X10 may use the output of coding scheme selector 20 to direct the flow of execution to one or another of the frame encoders, and that such an implementation may not include an analog for selector **50*a* and/or for selector 50*b***.

It may be desirable to configure coding scheme selector 20 to classify each active frame of audio signal S10 as one of several different types. These different types may include frames of voiced speech (e.g., speech representing a vowel sound), transitional frames (e.g., frames that represent the beginning or end of a word), and frames of unvoiced speech (e.g., speech representing a fricative sound). The frame classification may be based on one or more features of the current frame, and/or of one or more previous frames, such as frame energy, frame energy in each of two or more different frequency bands, SNR, periodicity, spectral tilt, and/or zero-crossing rate. Such classification may include comparing a value or magnitude of such a factor to a threshold value and/or comparing the magnitude of a change in such a factor to a threshold value.

It may be desirable to configure speech encoder X10 to use different coding bit rates to encode different types of active frames (for example, to balance network demand and capacity). Such operation is called "variable-rate coding." For example, it may be desirable to configure speech encoder X10 to encode a transitional frame at a higher bit rate (e.g., full rate), to encode an unvoiced frame at a lower bit rate (e.g., quarter rate), and to encode a voiced frame at an intermediate bit rate (e.g., half rate) or at a higher bit rate (e.g., full rate).

Figure 2:
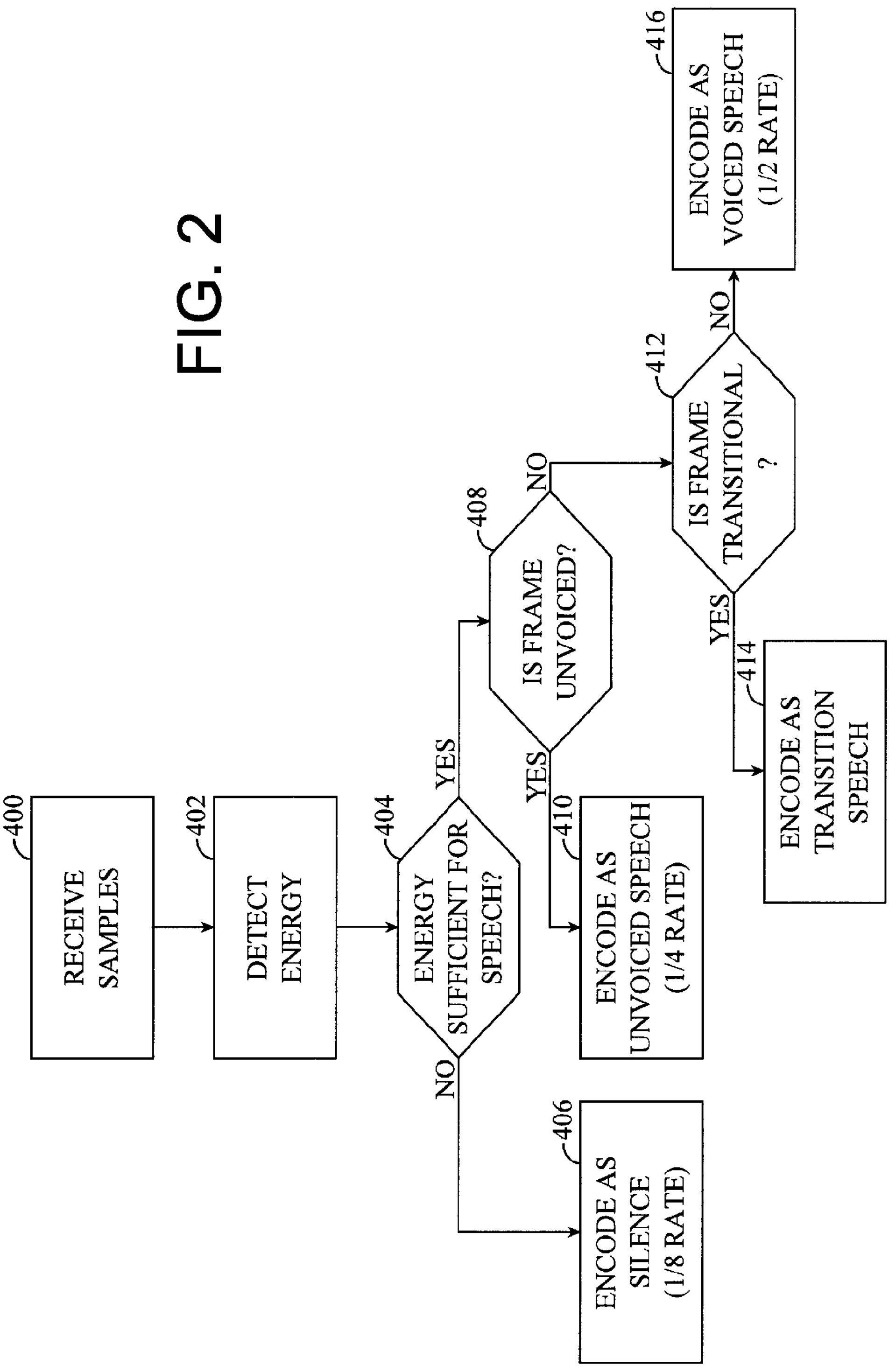
FIG. 2 shows one example of a decision tree.

FIG. 2 shows one example of a decision tree that an implementation 22 of coding scheme selector 20 may use to select a bit rate at which to encode a particular frame according to the type of speech the frame contains. In other cases, the bit rate selected for a particular frame may also depend on such criteria as a desired average bit rate, a desired pattern of bit rates over a series of frames (which may be used to support a desired average bit rate), and/or the bit rate selected for a previous frame.

Additionally or in the alternative, it may be desirable to configure speech encoder X10 to use different coding modes to encode different types of speech frames. Such operation is called "multi-mode coding." For example, frames of voiced speech tend to have a periodic structure that is long-term (i.e., that continues for more than one frame period) and is related to pitch, and it is typically more efficient to encode a voiced frame (or a sequence of voiced frames) using a coding mode that encodes a description of this long-term spectral feature. Examples of such coding modes include CELP, PWI, and PPP. Unvoiced frames and inactive frames, on the other hand, usually lack any significant long-term spectral feature, and a speech encoder may be configured to encode these frames using a coding mode that does not attempt to describe such a feature, such as NELP.

It may be desirable to implement speech encoder X10 to use multi-mode coding such that frames are encoded using different modes according to a classification based on, for example, periodicity or voicing. It may also be desirable to implement speech encoder X10 to use different combinations of bit rates and coding modes (also called "coding schemes") for different types of active frames. One example of such an implementation of speech encoder X10 uses a full-rate CELP scheme for frames containing voiced speech and transitional frames, a half-rate NELP scheme for frames containing unvoiced speech, and an eighth-rate NELP scheme for inactive frames. Other examples of such implementations of speech encoder X10 support multiple coding rates for one or more coding schemes, such as full-rate and half-rate CELP schemes and/or full-rate and quarter-rate PPP schemes. Examples of multi-scheme encoders, decoders, and coding techniques are described in, for example, U.S. Pat. No. 6,330,532, entitled "METHODS AND APPARATUS FOR MAINTAINING A TARGET BIT RATE IN A SPEECH CODER," and U.S. Pat. No. 6,691,084, entitled "VARIABLE RATE SPEECH CODING"; and in U.S. patent application Ser. No. 09/191,643, entitled "CLOSED-LOOP VARIABLE-RATE MULTIMODE PREDICTIVE SPEECH CODER," and Ser. No. 11/625,788, entitled "ARBITRARY AVERAGE DATA RATES FOR VARIABLE RATE CODERS."

Figure 1B:
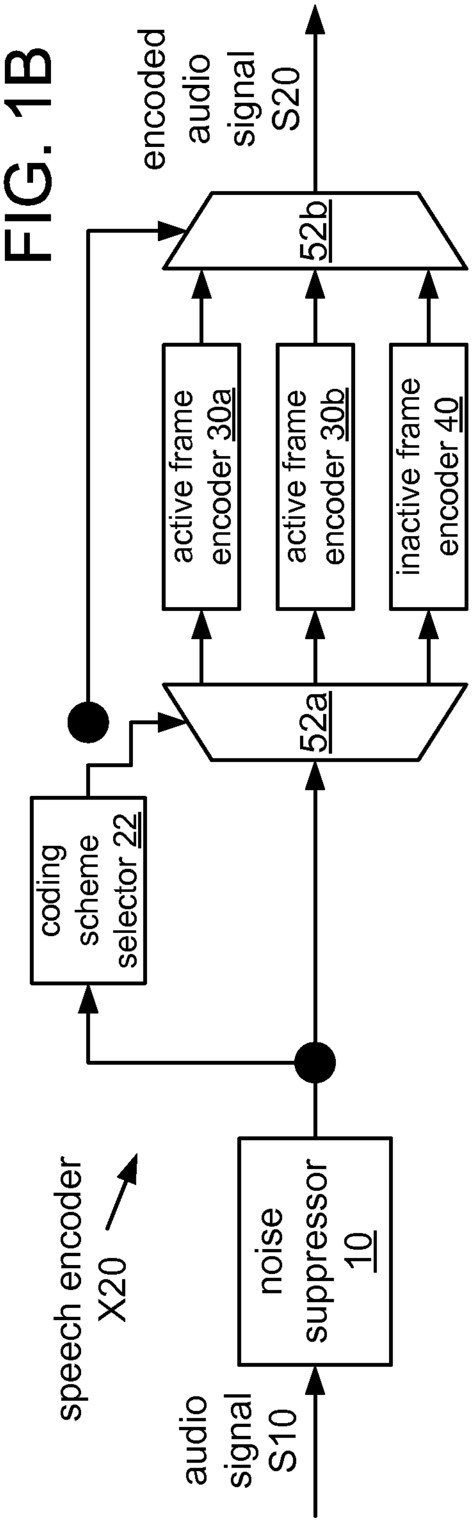
FIG. 1B shows a block diagram of an implementation X20 of speech encoder X10.

FIG. 1B shows a block diagram of an implementation X20 of speech encoder X10 that includes multiple implementations **30*a*, 30*b* of active frame encoder 30. Encoder 30*a* is configured to encode a first class of active frames (e.g., voiced frames) using a first coding scheme (e.g., full-rate CELP), and encoder 30*b* is configured to encode a second class of active frames (e.g., unvoiced frames) using a second coding scheme that has a different bit rate and/or coding mode than the first coding scheme (e.g., half-rate NELP). In this case, selectors 52***a* and 52*b* are configured to select among the various frame encoders according to a state of a coding scheme selection signal produced by coding scheme selector 22 that has more than two possible states. It is expressly disclosed that speech encoder X20 may be extended in such manner to support selection from among more than two different implementations of active frame encoder 30.

One or more among the frame encoders of speech encoder X20 may share common structure. For example, such encoders may share a calculator of LPC coefficient values (possibly configured to produce results having different orders for different classes of frames) but have respectively different temporal description calculators. For example, encoders 30*a* and 30*b* may have different excitation signal calculators.

As shown in FIG. 1B, speech encoder X10 may also be implemented to include a noise suppressor 10. Noise suppressor 10 is configured and arranged to perform a noise suppression operation on audio signal S10. Such an operation may support improved discrimination between active and inactive frames by coding scheme selector 20 and/or better encoding results by active frame encoder 30 and/or inactive frame encoder 40. Noise suppressor 10 may be configured to apply a different respective gain factor to each of two or more different frequency channels of the audio signal, where the gain factor for each channel may be based on an estimate of the noise energy or SNR of the channel. It may be desirable to perform such gain control in a frequency domain as opposed to a time domain, and one example of such a configuration is described in section 4.4.3 of the 3GPP2 standards document C.S0014-C referenced above. Alternatively, noise suppressor 10 may be configured to apply an adaptive filter to the audio signal, possibly in a frequency domain. Section 5.1 of the European Telecommunications Standards Institute (ETSI) document ES 202 0505 v1.1.5 (January 2007, available online at www-dot-etsi-dot-org) describes an example of such a configuration that estimates a noise spectrum from inactive frames and performs two stages of mel-warped Wiener filtering, based on the calculated noise spectrum, on the audio signal.

Figure 3A:
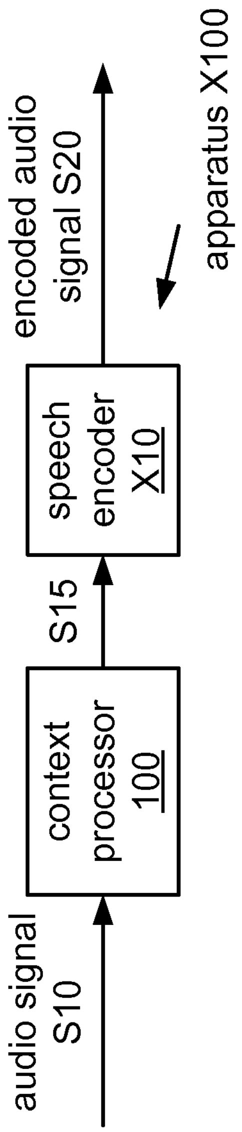
FIG. 3A shows a block diagram of an apparatus X100 according to a general configuration.

FIG. 3A shows a block diagram of an apparatus X100 according to a general configuration (also called an encoder, encoding apparatus, or apparatus for encoding). Apparatus X100 is configured to remove the existing context from audio signal S10 and to replace it with a generated context that may be similar to or different from the existing context. Apparatus X100 includes a context processor 100 that is configured and arranged to process audio signal S10 to produce a context-enhanced audio signal S15. Apparatus X100 also includes an implementation of speech encoder X10 (e.g., speech encoder X20) that is arranged to encode context-enhanced audio signal S15 to produce encoded audio signal S20. A communications device that includes apparatus X100, such as a cellular telephone, may be configured to perform further processing operations on encoded audio signal S20, such as error-correction, redundancy, and/or protocol (e.g., Ethernet, TCP/IP, CDMA2000) coding, before transmitting it into a wired, wireless, or optical transmission channel (e.g., by radio-frequency modulation of one or more carriers).

Figure 3B:
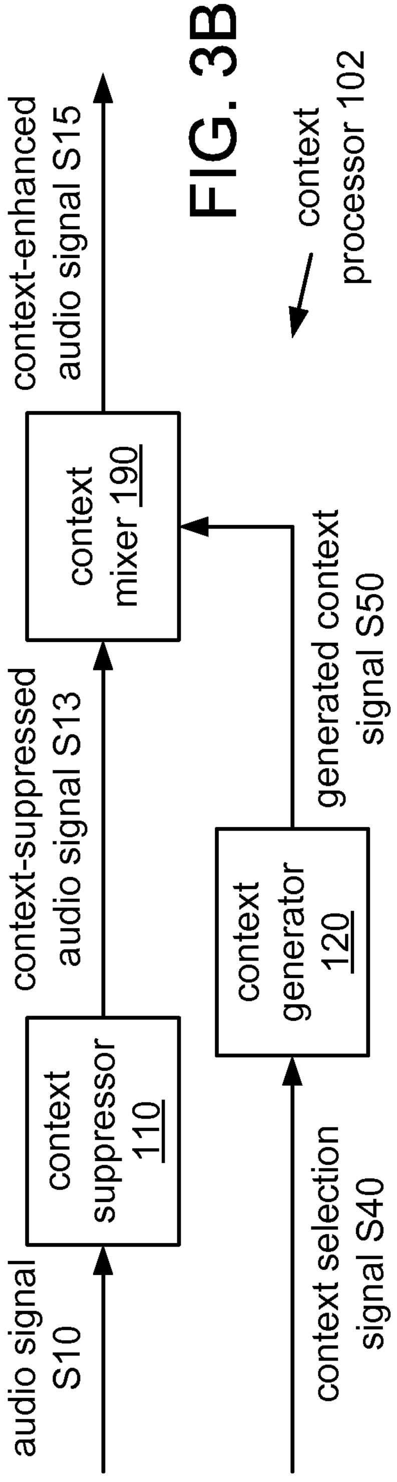
FIG. 3B shows a block diagram of an implementation 102 of context processor 100.

FIG. 3B shows a block diagram of an implementation 102 of context processor 100. Context processor 102 includes a context suppressor 110 that is configured and arranged to suppress the context component of audio signal S10 to produce a context-suppressed audio signal S13. Context processor 102 also includes a context generator 120 that is configured to produce a generated context signal S50 according to a state of a context selection signal S40. Context processor 102 also includes a context mixer 190 that is configured and arranged to mix context-suppressed audio signal S13 with generated context signal S50 to produce context-enhanced audio signal S15.

As shown in FIG. 3B, context suppressor 110 is arranged to suppress the existing context from the audio signal before encoding. Context suppressor 110 may be implemented as a more aggressive version of noise suppressor 10 as described above (e.g., by using one or more different threshold values). Alternatively or additionally, context suppressor 110 may be implemented to use audio signals from two or more microphones to suppress the context component of audio signal S10. FIG. 3G shows a block diagram of an implementation 102A of context processor 102 that includes such an implementation 110A of context suppressor 110. Context suppressor 110A is configured to suppress the context component of audio signal S10, which is based, for example, on an audio signal produced by a first microphone. Context suppressor 110A is configured to perform such an operation by using an audio signal SA1 (e.g., another digital audio signal) that is based on an audio signal produced by a second microphone. Suitable examples of multiple-microphone context suppression are disclosed in, for example, U.S. patent application Ser. No. 11/864,906, entitled "APPARATUS AND METHOD OF NOISE AND ECHO REDUCTION" (Choy et al.) and U.S. patent application Ser. No. 12/037,928, entitled "SYSTEMS, METHODS, AND APPARATUS FOR SIGNAL SEPARATION" (Visser et al.). A multiple-microphone implementation of context suppressor 110 may also be configured to provide information to a corresponding implementation of coding scheme selector 20 for improving speech activity detection performance, according to a technique as disclosed in, for example, U.S. patent application Ser. No. 11/864,897, entitled "MULTIPLE MICROPHONE VOICE ACTIVITY DETECTOR" (Choy et al.).

Figure 3C:
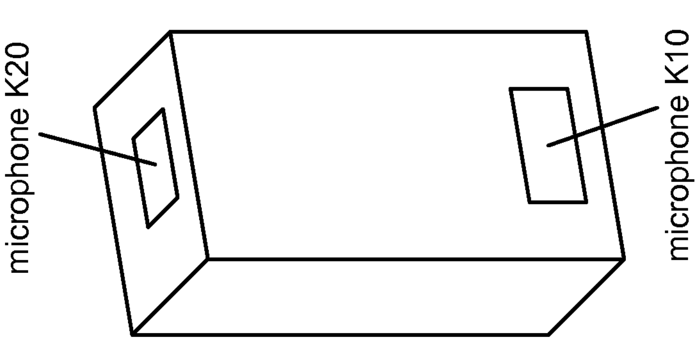
FIGS. 3C-3F show various mounting configurations for two microphones K10 and K20 in a portable or hands-free device.
Figure 3D:
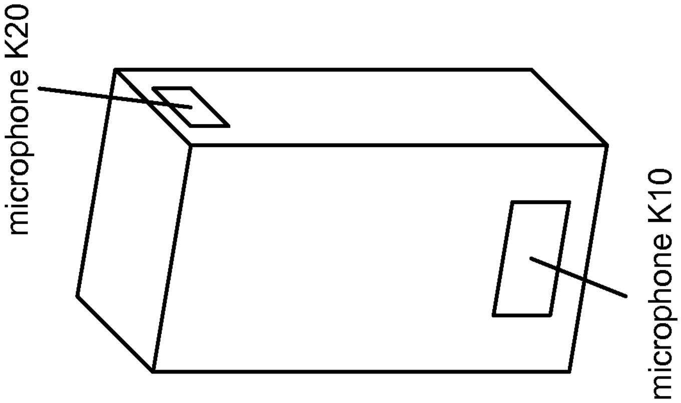
Figure 3E:
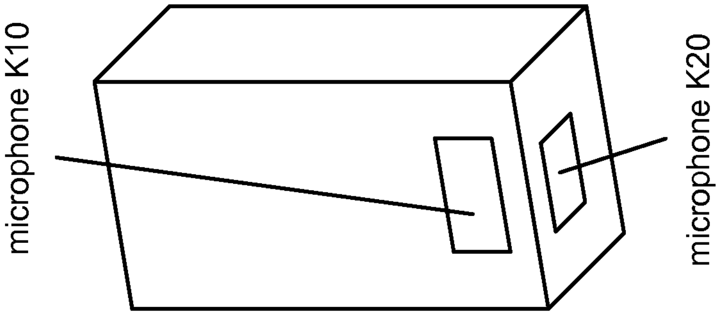
Figure 3F:
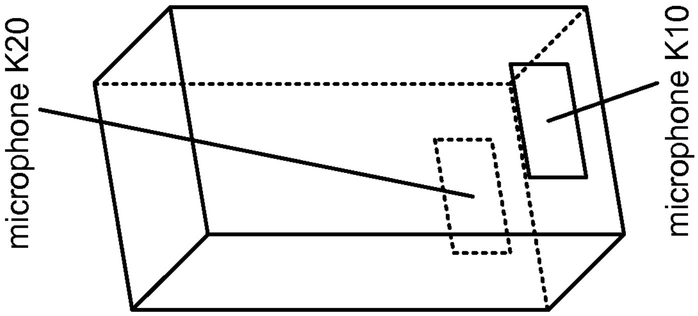
Figure 3G:
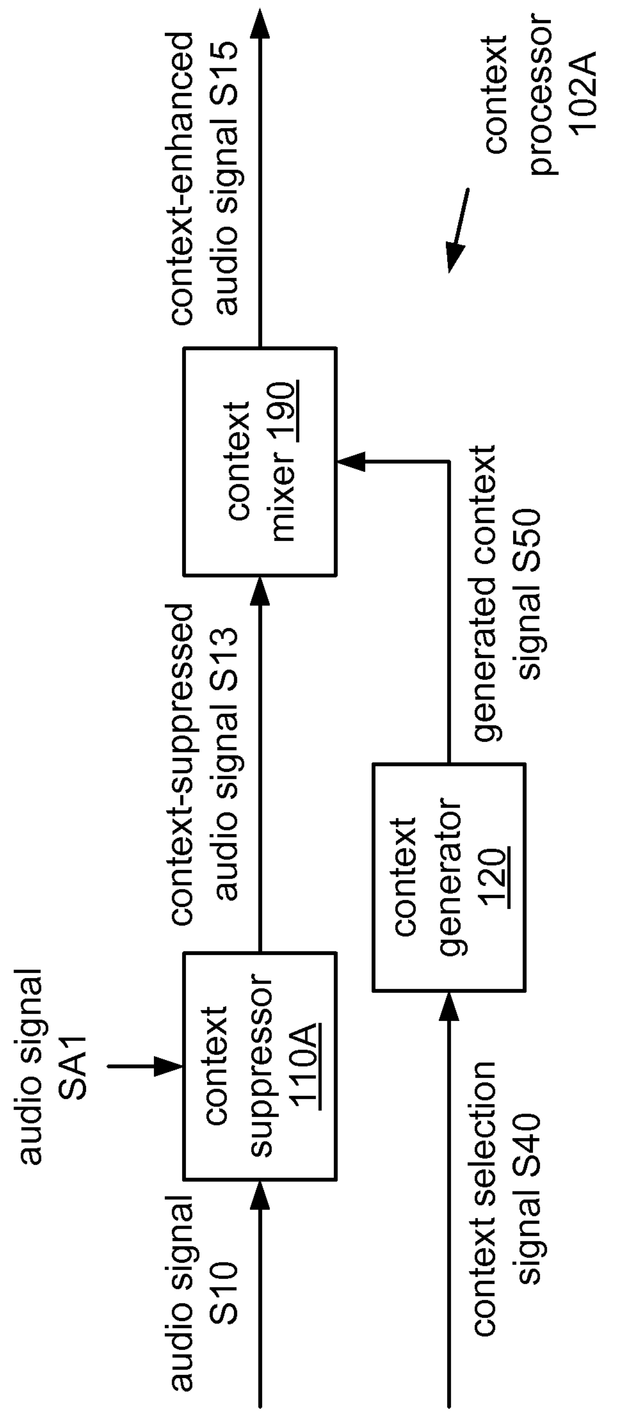
FIG. 3G shows a block diagram of an implementation 102A of context processor 102.

FIGS. 3C-3F show various mounting configurations for two microphones K10 and K20 in a portable device that includes such an implementation of apparatus X100 (such as a cellular telephone or other mobile user terminal) or in a hands-free device, such as an earpiece or headset, that is configured to communicate over a wired or wireless (e.g., Bluetooth) connection to such a portable device. In these examples, microphone K10 is arranged to produce an audio signal that contains primarily the speech component (e.g., an analog precursor of audio signal S10), and microphone K20 is arranged to produce an audio signal that contains primarily the context component (e.g., an analog precursor of audio signal SA1). FIG. 3C shows one example of an arrangement in which microphone K10 is mounted behind a front face of the device and microphone K20 is mounted behind a top face of the device. FIG. 3D shows one example of an arrangement in which microphone K10 is mounted behind a front face of the device and microphone K20 is mounted behind a side face of the device. FIG. 3E shows one example of an arrangement in which microphone K10 is mounted behind a front face of the device and microphone K20 is mounted behind a bottom face of the device. FIG. 3F shows one example of an arrangement in which microphone K10 is mounted behind a front (or inner) face of the device and microphone K20 is mounted behind a rear (or outer) face of the device.

Context suppressor 110 may be configured to perform a spectral subtraction operation on the audio signal. Spectral subtraction may be expected to suppress a context component that has stationary statistics but may not be effective to suppress contexts that are nonstationary. Spectral subtraction may be used in applications having one microphone as well as applications in which signals from multiple microphones are available. In a typical example, such an implementation of context suppressor 110 is configured to analyze inactive frames of the audio signal to derive a statistical description of the existing context, such as an energy level of the context component in each of a number of frequency subbands (also referred to as "frequency bins"), and to apply a corresponding frequency-selective gain to the audio signal (e.g., to attenuate the audio signal over each of the frequency subbands based on the corresponding context energy level). Other examples of spectral subtraction operations are described in S. F. Boll, "Suppression of Acoustic Noise in Speech Using Spectral Subtraction," IEEE Trans. Acoustics, Speech and Signal Processing, 27(2): 112-120, April 1979; R. Mukai, S. Araki, H. Sawada and S. Makino, "Removal of residual crosstalk components in blind source separation using LMS filters," Proc. of 12th IEEE Workshop on Neural Networks for Signal Processing, pp. 435-444, Martigny, Switzerland, September 2002; and R. Mukai, S. Araki, H. Sawada and S. Makino, "Removal of residual cross-talk components in blind source separation using time-delayed spectral subtraction," Proc. of ICASSP 2002, pp. 1789-1792, May 2002.

Additionally or in an alternative implementation, context suppressor 110 may be configured to perform a blind source separation (BSS, also called independent component analysis) operation on the audio signal. Blind source separation may be used for applications in which signals from one or more microphones (in addition to the microphone used for capturing audio signal S10) are available. Blind source separation may be expected to suppress contexts that are stationary as well as contexts that have nonstationary statistics. One example of a BSS operation as described in U.S. Pat. No. 6,167,417 (Parra et al.) uses a gradient descent method to calculate coefficients of a filter used to separate the source signals. Other examples of BSS operations are described in S. Amari, A. Cichocki, and H. H. Yang, "A new learning algorithm for blind signal separation," Advances in Neural Information Processing Systems 8, MIT Press, 1996; L. Molgedey and H. G. Schuster, "Separation of a mixture of independent signals using time delayed correlations," Phys. Rev. Lett., 72(23): 3634-3637, 1994; and L. Parra and C. Spence, "Convolutive blind source separation of non-stationary sources", IEEE Trans. on Speech and Audio Processing, 8(3): 320-327, May 2000. Additionally or in an alternative to the implementations discussed above, context suppressor 100 may be configured to perform a beamforming operation. Examples of beamforming operations are disclosed in, for example, U.S. patent application Ser. No. 11/864,897, referenced above and H. Saruwatari et al., "Blind Source Separation Combining Independent Component Analysis and Beamforming," EURASIP Journal on Applied Signal Processing, 2003:11, 1135-1146 (2003).

Microphones that are located near to each other, such as microphones mounted within a common housing such as the casing of a cellular telephone or hands-free device, may produce signals that have high instantaneous correlation. A person of ordinary kill in the art would also recognize that one or more microphones may be placed in a microphone housing within the common housing (i.e., the casing of the entire devide). Such correlation may degrade the performance of a BSS operation, and in such cases it may be desirable to decorrelate the audio signals before the BSS operation. Decorrelation is also typically effective for echo cancellation. A decorrelator may be implemented as a filter (possibly an adaptive filter) having five or fewer taps, or even three or fewer taps. The tap weights of such a filter may be fixed or may be selected according to correlation properties of the input audio signal, and it may be desirable to implement a decorrelation filter using a lattice filter structure. Such an implementation of context suppressor 110 may be configured to perform a separate decorrelation operation on each of two or more different frequency subbands of the audio signal.

An implementation of context suppressor 110 may be configured to perform one or more additional processing operations on at least the separated speech component after a BSS operation. For example, it may be desirable for context suppressor 110 to perform a decorrelation operation on at least the separated speech component. Such an operation may be performed separately on each of two or more different frequency subbands of the separated speech component.

Additionally or in the alternative, an implementation of context suppressor 110 may be configured to perform a nonlinear processing operation on the separated speech component, such as spectral subtraction based on the separated context component. Spectral subtraction, which may further suppress the existing context from the speech component, may be implemented as a frequency-selective gain that varies over time according to the level of a corresponding frequency subband of the separated context component.

Additionally or in the alternative, an implementation of context suppressor 110 may be configured to perform a center clipping operation on the separated speech component. Such an operation typically applies a gain to the signal that varies over time in proportion to signal level and/or to speech activity level. One example of a center clipping operation may be expressed as $y[n]=\{0 \text{ for } |x[n]|<C;\ x[n] \text{ otherwise}\}$, where x[n] is the input sample, y[n] is the output sample, and C is the value of the clipping threshold. Another example of a center clipping operation may be expressed as $y[n]=\{0 \text{ for } |x[n]|<C,\ \mathrm{sgn}(x[n])(|x[n]|-C) \text{ otherwise}\}$, where sgn(x[n]) indicates the sign of x[n].

It may be desirable to configure context suppressor 110 to remove the existing context component substantially completely from the audio signal. For example, it may be desirable for apparatus X100 to replace the existing context component with a generated context signal S50 that is dissimilar to the existing context component. In such case, substantially complete removal of the existing context component may help to reduce audible interference in the decoded audio signal between the existing context component and the replacement context signal. In another example, it may be desirable for apparatus X100 to be configured to conceal the existing context component, whether or not a generated context signal S50 is also added to the audio signal.

It may be desirable to implement context processor 100 to be configurable among two or more different modes of operation. For example, it may be desirable to provide for (A) a first mode of operation in which context processor 100 is configured to pass the audio signal with the existing context component remaining substantially unchanged and (B) a second mode of operation in which context processor 100 is configured to remove the existing context component substantially completely (possibly replacing it with a generated context signal S50). Support for such a first mode of operation (which may be configured as the default mode) may be useful for allowing backward compatibility of a device that includes apparatus X100. In the first mode of operation, context processor 100 may be configured to perform a noise suppression operation on the audio signal (e.g., as described above with reference to noise suppressor 10) to produce a noise-suppressed audio signal.

Further implementations of context processor 100 may be similarly configured to support more than two modes of operation. For example, such a further implementation may be configurable to vary the degree to which the existing context component is suppressed, according to a selectable one of three or more modes in the range of from at least substantially no context suppression (e.g., noise suppression only), to partial context suppression, to at least substantially complete context suppression.

Figure 4A:
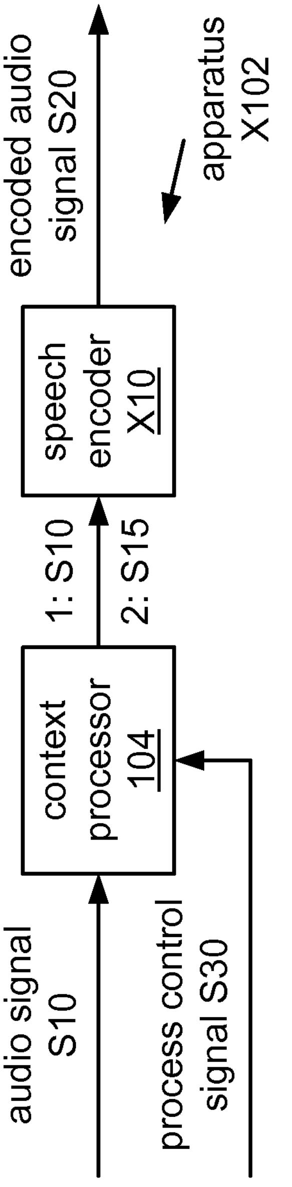
FIG. 4A shows a block diagram of an implementation X102 of apparatus X100.
Figure 16:
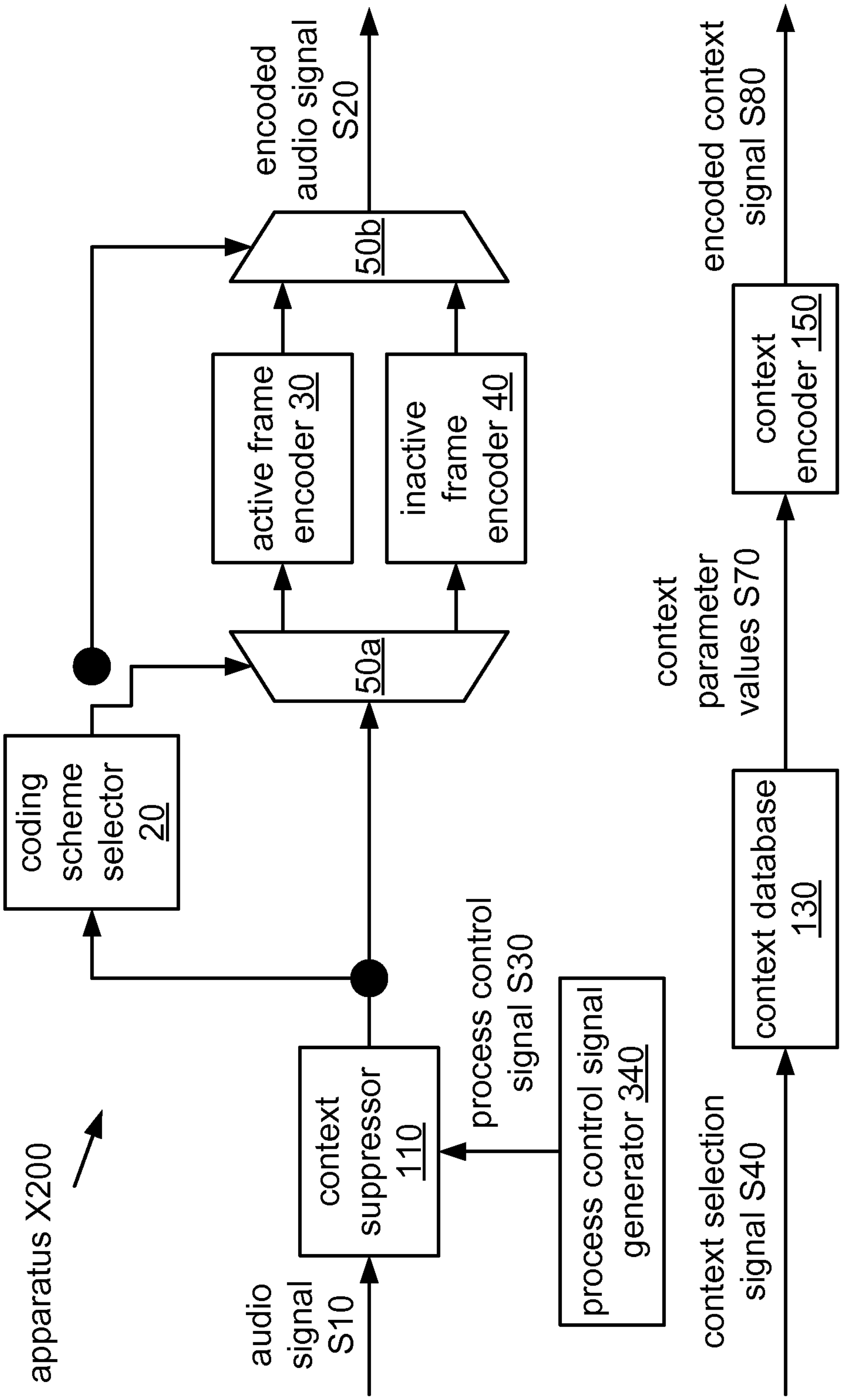
FIG. 16 shows a block diagram of an implementation X200 of apparatus X100.

FIG. 4A shows a block diagram of an implementation X102 of apparatus X100 that includes an implementation 104 of context processor 100. Context processor 104 is configured to operate, according to the state of a process control signal S30, in one of two or more modes as described above. The state of process control signal S30 may be controlled by a user (e.g., via a graphical user interface, switch, or other control interface), or process control signal S30 may be generated by a process control generator 340 (as illustrated in FIG. 16) that includes an indexed data structure, such as a table, which associates different values of one or more variables (e.g., physical location, operating mode) with different states of process control signal S30. In one example, process control signal S30 is implemented as a binary-valued signal (i.e., a flag) whose state indicates whether the existing context component is to be passed or suppressed. In such case, context processor 104 may be configured in the first mode to pass audio signal S10 by disabling one or more of its elements and/or removing such elements from the signal path (i.e., allowing the audio signal to bypass them), and may be configured in the second mode to produce context-enhanced audio signal S15 by enabling such elements and/or inserting them into the signal path. Alternatively, context processor 104 may be configured in the first mode to perform a noise suppression operation on audio signal S10 (e.g., as described above with reference to noise suppressor 10), and may be configured in the second mode to perform a context replacement operation on audio signal S10. In another example, process control signal S30 has more than two possible states, with each state corresponding to a different one of three or more modes of operation of the context processor in the range of from at least substantially no context suppression (e.g., noise suppression only), to partial context suppression, to at least substantially complete context suppression.

Figure 4B:
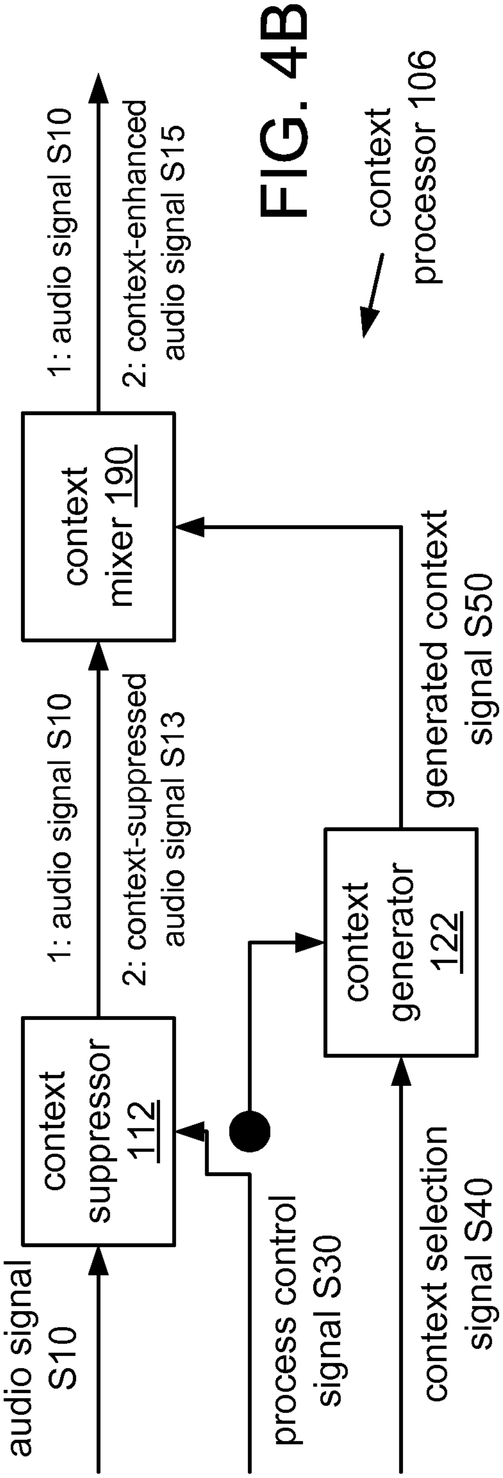
FIG. 4B shows a block diagram of an implementation 106 of context processor 104.

FIG. 4B shows a block diagram of an implementation 106 of context processor 104. Context processor 106 includes an implementation 112 of context suppressor 110 that is configured to have at least two modes of operation: a first mode of operation in which context suppressor 112 is configured to pass audio signal S10 with the existing context component remaining substantially unchanged, and a second mode of operation in which context suppressor 112 is configured to remove the existing context component substantially completely from audio signal S10 (i.e., to produce context-suppressed audio signal S13). It may be desirable to implement context suppressor 112 such that the first mode of operation is the default mode. It may be desirable to implement context suppressor 112 to perform, in the first mode of operation, a noise suppression operation on the audio signal (e.g., as described above with reference to noise suppressor 10) to produce a noise-suppressed audio signal.

Context suppressor 112 may be implemented such that in its first mode of operation, one or more elements that are configured to perform a context suppression operation on the audio signal (e.g., one or more software and/or firmware routines) are bypassed. Alternatively or additionally, context suppressor 112 may be implemented to operate in different modes by changing one or more threshold values of such a context suppression operation (e.g., a spectral subtraction and/or BSS operation). For example, context suppressor 112 may be configured in the first mode to apply a first set of threshold values to perform a noise suppression operation, and may be configured in the second mode to apply a second set of threshold values to perform a context suppression operation.

Process control signal S30 may be used to control one or more other elements of context processor 104. FIG. 4B shows an example in which an implementation 122 of context generator 120 is configured to operate according to a state of process control signal S30. For example, it may be desirable to implement context generator 122 to be disabled (e.g., to reduce power consumption), or otherwise to prevent context generator 122 from producing generated context signal S50, according to a corresponding state of process control signal S30. Additionally or alternatively, it may be desirable to implement context mixer 190 to be disabled or bypassed, or otherwise to prevent context mixer 190 from mixing its input audio signal with generated context signal S50, according to a corresponding state of process control signal S30.

Figure 5A:
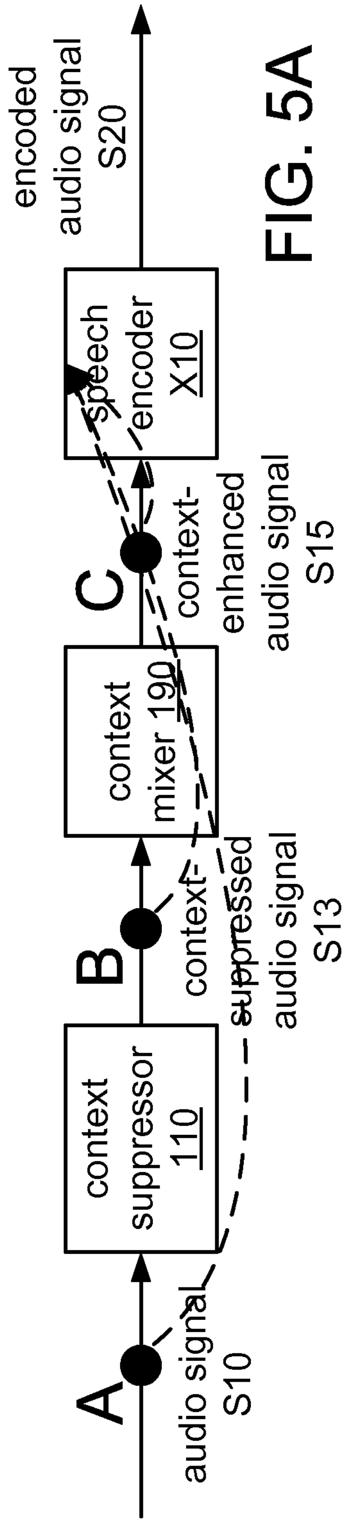
FIG. 5A illustrates various possible dependencies between audio signals and an encoder selection operation.
Figure 6:
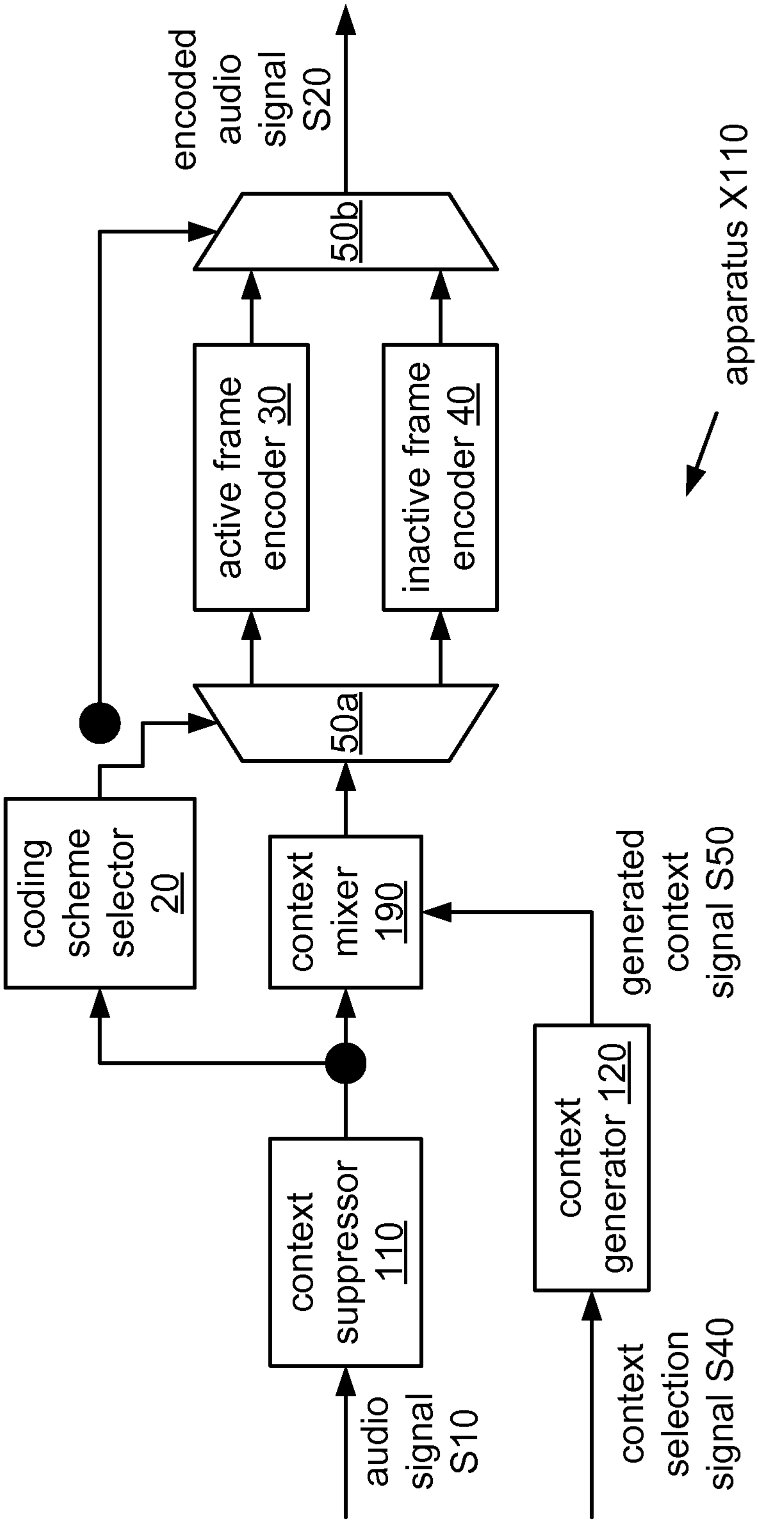
FIG. 6 shows a block diagram of an implementation X110 of apparatus X100.

As noted above, speech encoder X10 may be configured to select from among two or more frame encoders according to one or more characteristics of audio signal S10. Likewise, within an implementation of apparatus X100, coding scheme selector 20 may be variously implemented to produce an encoder selection signal according to one or more characteristics of audio signal S10, context-suppressed audio signal S13, and/or context-enhanced audio signal S15. FIG. 5A illustrates various possible dependencies between these signals and the encoder selection operation of speech encoder X10. FIG. 6 shows a block diagram of a particular implementation X110 of apparatus X100 in which coding scheme selector 20 is configured to produce an encoder selection signal based on one or more characteristics of context-suppressed audio signal S13 (indicated as point B in FIG. 5A), such as frame energy, frame energy in each of two or more different frequency bands, SNR, periodicity, spectral tilt, and/or zero-crossing rate. It is expressly contemplated and hereby disclosed that any of the various implementations of apparatus X100 suggested in FIGS. 5A and 6 may also be configured to include control of context suppressor 110 according to a state of process control signal S30 (e.g., as described with reference to FIGS. 4A, 4B) and/or selection of one among three or more frame encoders (e.g., as described with reference to FIG. 1B).

Figure 5B:
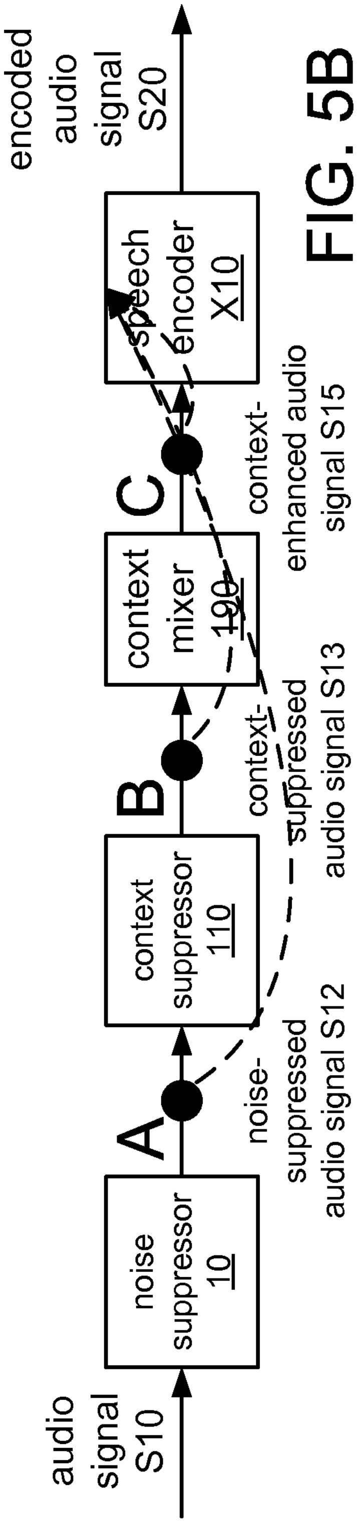
FIG. 5B illustrates various possible dependencies between audio signals and an encoder selection operation.
Figure 7:
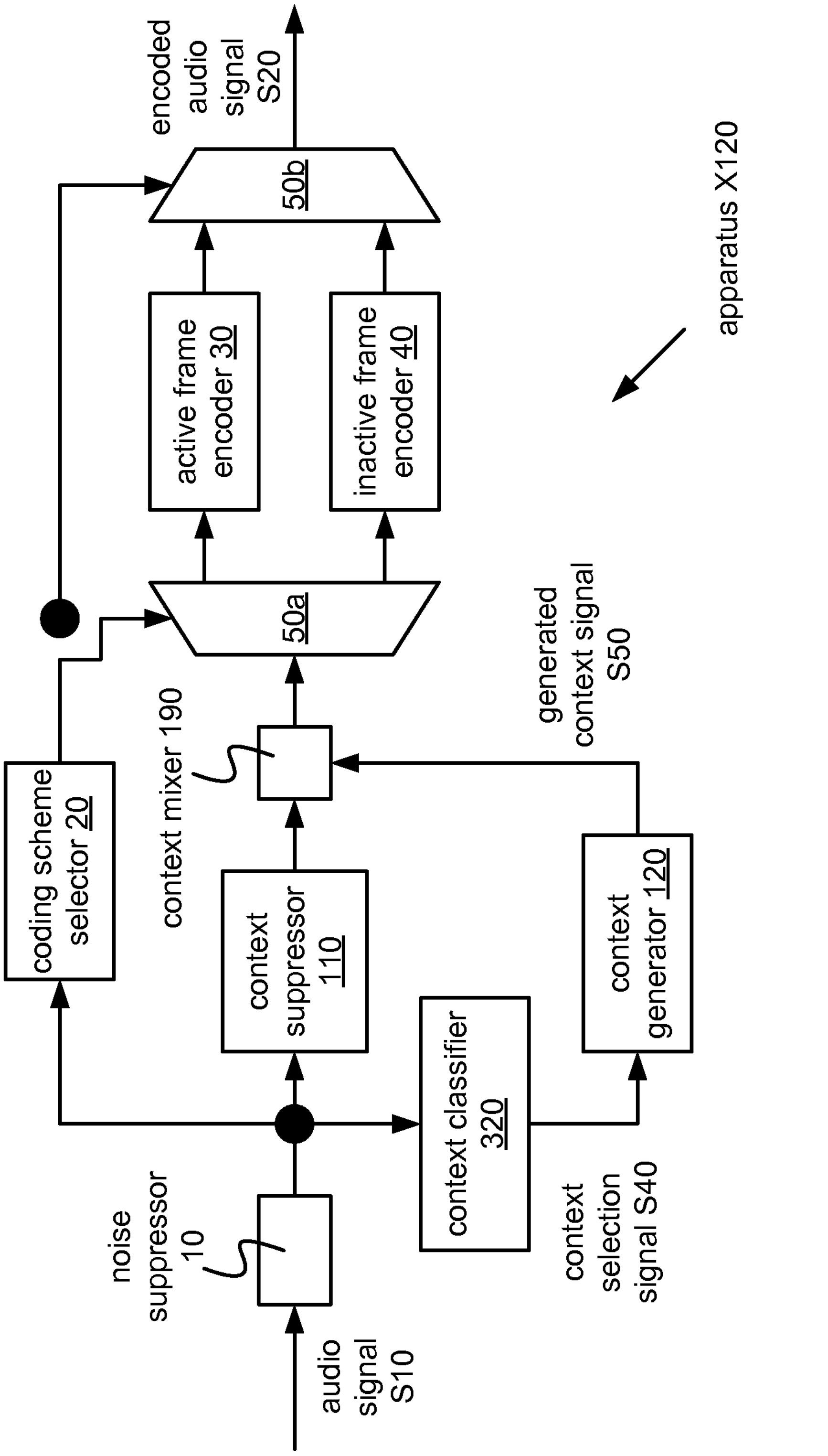
FIG. 7 shows a block diagram of an implementation X120 of apparatus X100.

It may be desirable to implement apparatus X100 to perform noise suppression and context suppression as separate operations. For example, it may be desirable to add an implementation of context processor 100 to a device having an existing implementation of speech encoder X20 without removing, disabling, or bypassing noise suppressor 10. FIG. 5B illustrates various possible dependencies, in an implementation of apparatus X100 that includes noise suppressor 10, between signals based on audio signal S10 and the encoder selection operation of speech encoder X20. FIG. 7 shows a block diagram of a particular implementation X120 of apparatus X100 in which coding scheme selector 20 is configured to produce an encoder selection signal based on one or more characteristics of noise-suppressed audio signal S12 (indicated as point A in FIG. 5B), such as frame energy, frame energy in each of two or more different frequency bands, SNR, periodicity, spectral tilt, and/or zero-crossing rate. It is expressly contemplated and hereby disclosed that any of the various implementations of apparatus X100 suggested in FIGS. 5B and 7 may also be configured to include control of context suppressor 110 according to a state of process control signal S30 (e.g., as described with reference to FIGS. 4A, 4B)

and/or selection of one among three or more frame encoders (e.g., as described with reference to FIG. 1B).

Context suppressor 110 may also be configured to include noise suppressor 10 or may otherwise be selectably configured to perform noise suppression on audio signal S10. For example, it may be desirable for apparatus X100 to perform, according to a state of process control signal S30, either context suppression (in which the existing context is substantially completely removed from audio signal S10) or noise suppression (in which the existing context remains substantially unchanged). In general, context suppressor 110 may also be configured to perform one or more other processing operations (such as a filtering operation) on audio signal S10 before performing context suppression and/or on the resulting audio signal after performing context suppression.

Figure 8:
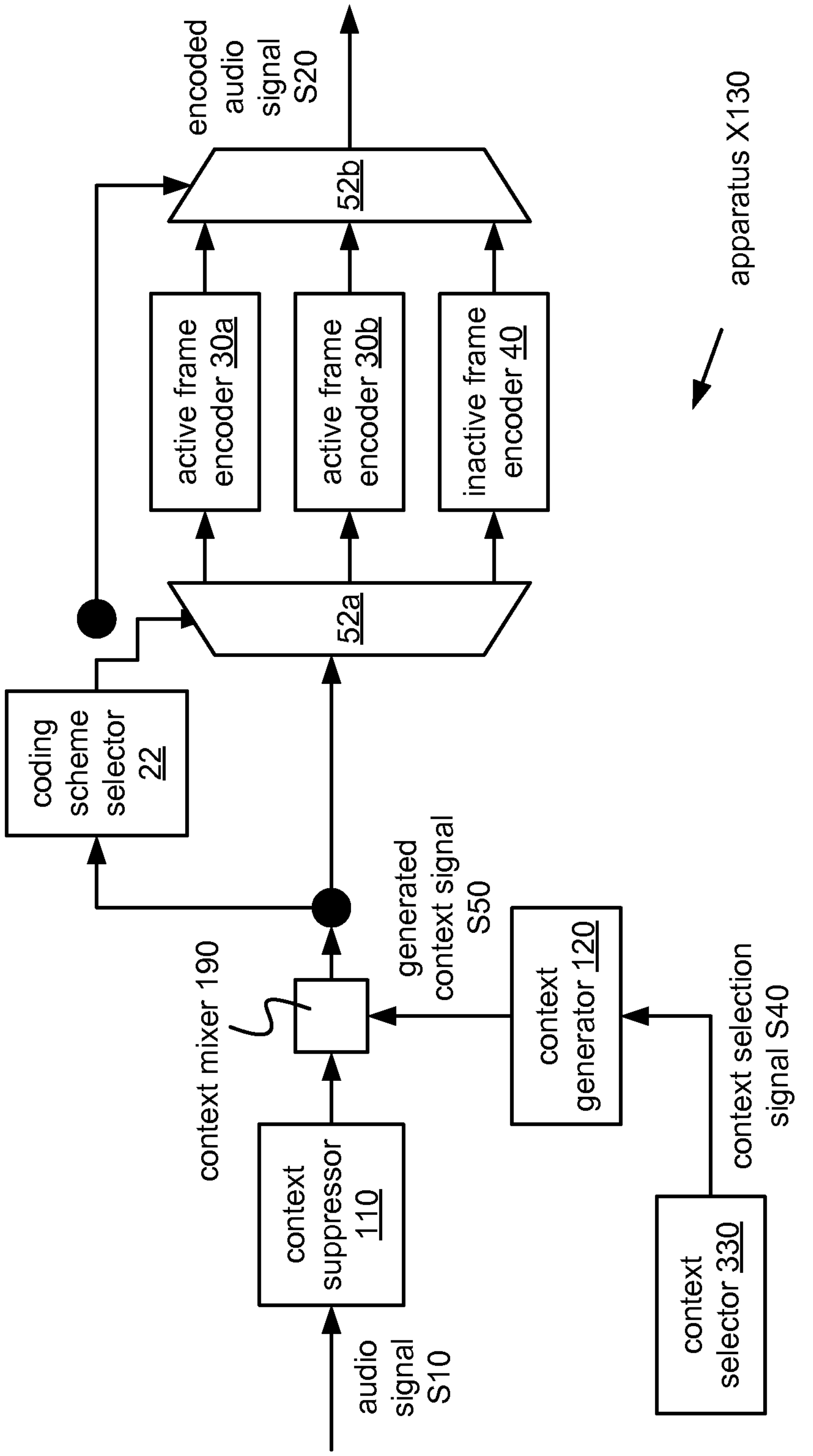
FIG. 8 shows a block diagram of an implementation X130 of apparatus X100.

As noted above, existing speech encoders typically use low bit rates and/or DTX to encode inactive frames. Consequently, the encoded inactive frames typically contain little contextual information. Depending on the particular context indicated by context selection signal S40 and/or the particular implementation of context generator 120, the sound quality and information content of generated context signal S50 may be greater than that of the original context. In such cases, it may be desirable to use a higher bit rate to encode inactive frames that include generated context signal S50 than the bit rate that is used to encode inactive frames that include only the original context. FIG. 8 shows a block diagram of an implementation X130 of apparatus X100 that includes at least two active frame encoders 30*a*, 30*b* and corresponding implementations of coding scheme selector 20 and selectors 50*a*, 50*b*. In this example, apparatus X130 is configured to perform coding scheme selection based on the context-enhanced signal (i.e., after generated context signal S50 is added to the context-suppressed audio signal). While such an arrangement may lead to false detections of voice activity, it may also be desirable in a system that uses a higher bit rate to encode context-enhanced silence frames.

It is expressly noted that the features of two or more active frame encoders and corresponding implementations of coding scheme selector 20 and selectors 50*a*, 50*b* as described with reference to FIG. 8 may also be included in the other implementations of apparatus X100 as disclosed herein.

Context generator 120 is configured to produce a generated context signal S50 according to a state of a context selection signal S40. Context mixer 190 is configured and arranged to mix context-suppressed audio signal S13 with generated context signal S50 to produce context-enhanced audio signal S15. In one example, context mixer 190 is implemented as an adder that is arranged to add generated context signal S50 to context-suppressed audio signal S13. It may be desirable for context generator 120 to produce generated context signal S50 in a form that is compatible with the context-suppressed audio signal. In a typical implementation of apparatus X100, for example, generated context signal S50 and the audio signal produced by context suppressor 110 are both sequences of PCM samples. In such case, context mixer 190 may be configured to add corresponding pairs of samples of generated context signal S50 and context-suppressed audio signal S13 (possibly as a frame-based operation), although it is also possible to implement context mixer 190 to add signals having different sampling resolutions. Audio signal S10 is generally also implemented as a sequence of PCM samples. In some cases, context mixer 190 is configured to perform one or more other processing operations (such as a filtering operation) on the context-enhanced signal.

Context selection signal S40 indicates a selection of at least one among two or more contexts. In one example, context selection signal S40 indicates a context selection that is based on one or more features of the existing context. For example, context selection signal S40 may be based on information relating to one or more temporal and/or frequency characteristics of one or more inactive frames of audio signal S10. Coding mode selector 20 may be configured to produce context selection signal S40 in such manner. Alternatively, apparatus X100 may be implemented to include a context classifier 320 (e.g., as shown in FIG. 7) that is configured to produce context selection signal S40 in such manner. For example, the context classifier may be configured to perform a context classification operation that is based on line spectral frequencies (LSFs) of the existing context, such as those operations described in El-Maleh et al., "Frame-level Noise Classification in Mobile Environments," Proc. IEEE Int'l Conf. ASSP, 1999, vol. I, pp. 237-240; U.S. Pat. No. 6,782,361 (El-Maleh et al.); and Qian et al., "Classified Comfort Noise Generation for Efficient Voice Transmission," Interspeech 2006, Pittsburgh, Pa., pp. 225-228.

In another example, context selection signal S40 indicates a context selection that is based on one or more other criteria, such as information relating to a physical location of a device that includes apparatus X100 (e.g., based on information obtained from a Global Positioning Satellite (GPS) system, calculated via a triangulation or other ranging operation, and/or received from a base station transceiver or other server), a schedule that associates different times or time periods with corresponding contexts, and a user-selected context mode (such as a business mode, a soothing mode, a party mode). In such cases, apparatus X100 may be implemented to include a context selector 330 (e.g., as shown in FIG. 8). Context selector 330 may be implemented to include one or more indexed data structures (e.g., tables) that associate different contexts with corresponding values of one or more variables such as the criteria mentioned above. In a further example, context selection signal S40 indicates a user selection (e.g., from a graphical user interface such as a menu) of one among a list of two or more contexts. Further examples of context selection signal S40 include signals based on any combination of the above examples.

Figure 9A:
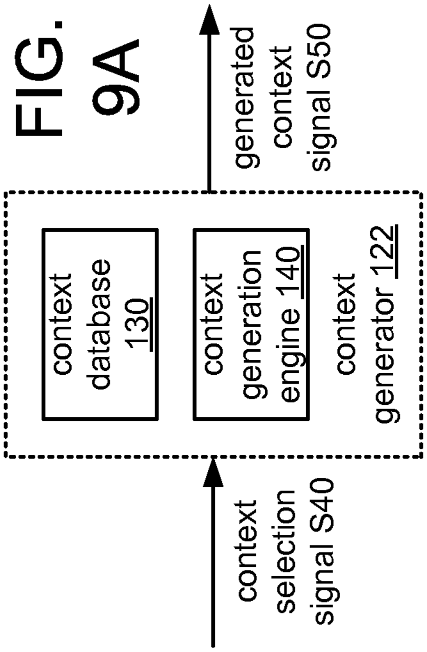
FIG. 9A shows a block diagram of an implementation 122 of context generator 120.

FIG. 9A shows a block diagram of an implementation 122 of context generator 120 that includes a context database 130 and a context generation engine 140. Context database 120 is configured to store sets of parameter values that describe different contexts. Context generation engine 140 is configured to generate a context according to a set of the stored parameter values that is selected according to a state of context selection signal S40.

Figure 9B:
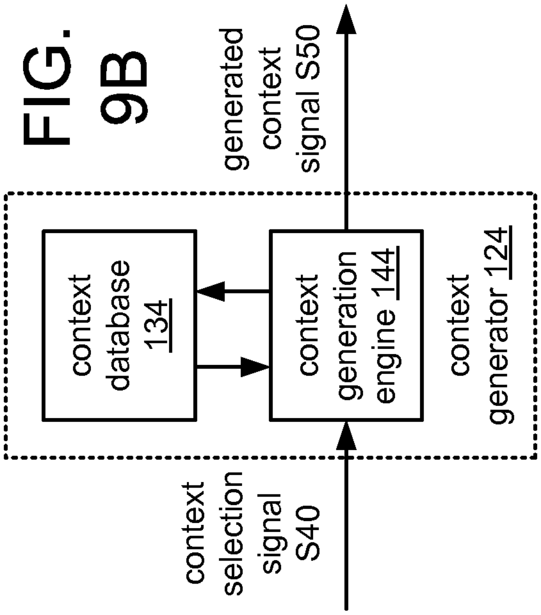
FIG. 9B shows a block diagram of an implementation 124 of context generator 122.
Figure 9C:
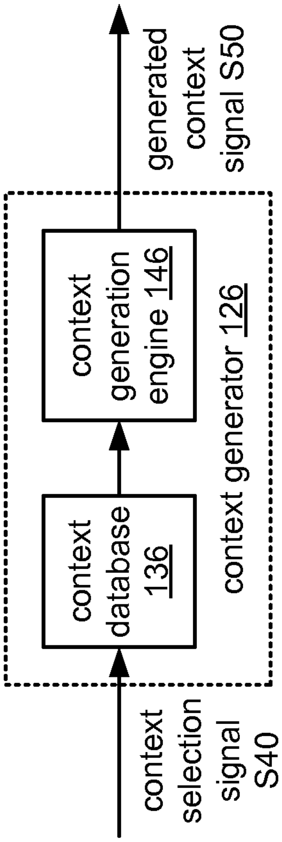
FIG. 9C shows a block diagram of another implementation 126 of context generator 122.

FIG. 9B shows a block diagram of an implementation 124 of context generator 122. In this example, an implementation 144 of context generation engine 140 is configured to receive context selection signal S40 and to retrieve a corresponding set of parameter values from an implementation 134 of context database 130. FIG. 9C shows a block diagram of another implementation 126 of context generator 122. In this example, an implementation 136 of context database 130 is configured to receive context selection signal S40 and to provide a corresponding set of parameter values to an implementation 146 of context generation engine 140.

Context database 130 is configured to store two or more sets of parameter values that describe corresponding contexts. Other implementations of context generator 120 may include an implementation of context generation engine 140 that is configured to download a set of parameter values corresponding to a selected context from a content provider such as a server (e.g., using a version of the Session Initiation Protocol (SIP), as currently described in RFC 3261, available online at www-dot-ietf-dot-org) or other non-local database or from a peer-to-peer network (e.g., as described in Cheng et al., "A Collaborative Privacy-Enhanced Alibi Phone," Proc. Int'l Conf. Grid and Pervasive Computing, pp. 405-414, Taichung, T W, May 2006).

Context generator 120 may be configured to retrieve or download a context in the form of a sampled digital signal (e.g., as a sequence of PCM samples). Because of storage and/or bit rate limitations, however, such a context would likely be much shorter than a typical communications session (e.g., a telephone call), requiring the same context to be repeated over and over again during a call and leading to an unacceptably distracting result for the listener. Alternatively, a large amount of storage and/or a high-bit-rate download connection would likely be needed to avoid an overly repetitive result.

Alternatively, context generation engine 140 may be configured to generate a context from a retrieved or downloaded parametric representation, such as a set of spectral and/or energy parameter values. For example, context generation engine 140 may be configured to generate multiple frames of context signal S50 based on a description of a spectral envelope (e.g., a vector of LSF values) and a description of an excitation signal, as may be included in a SID frame. Such an implementation of context generation engine 140 may be configured to randomize the set of parameter values from frame to frame to reduce a perception of repetition of the generated context.

Figure 10:
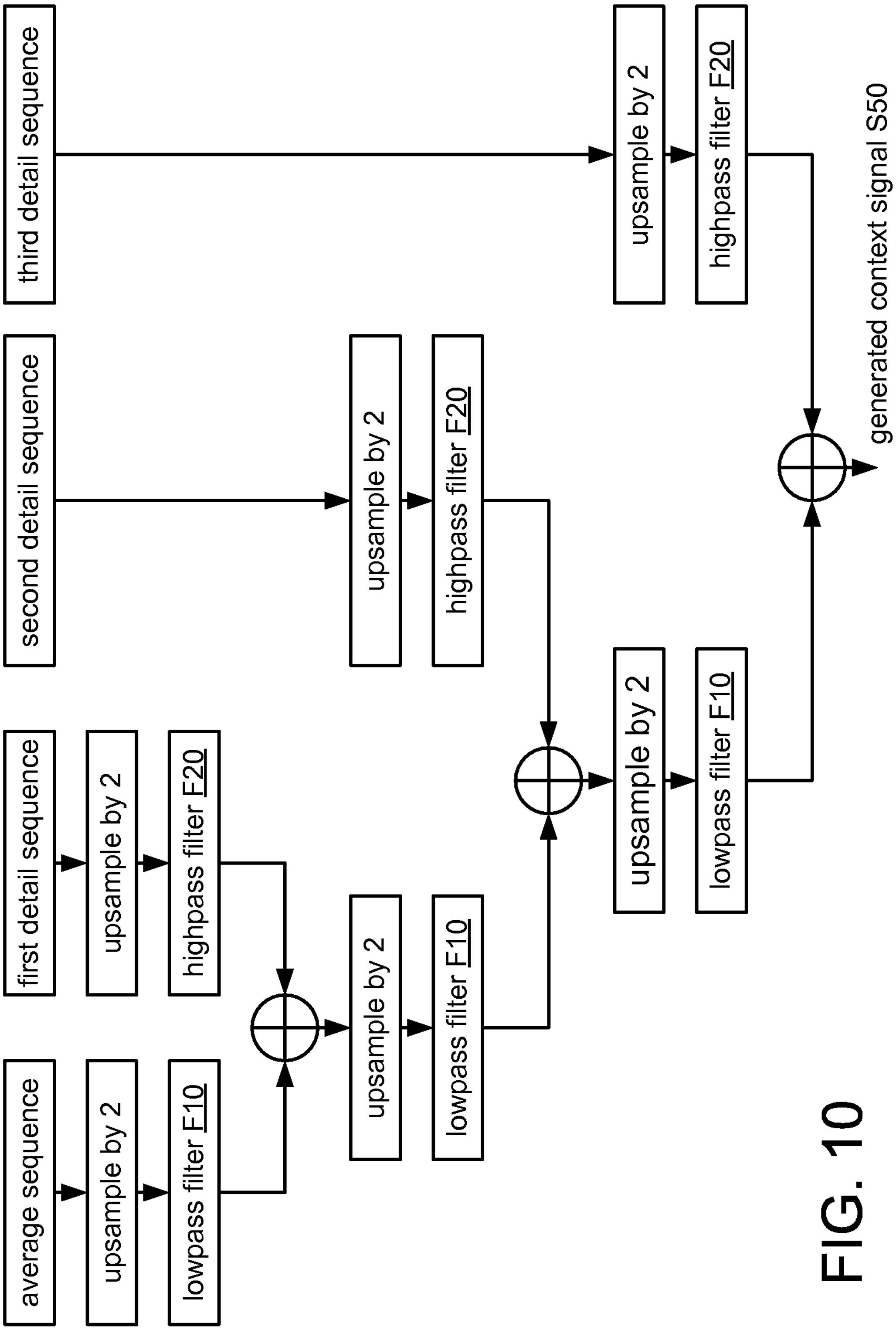
FIG. 10 shows a diagram of a process of multiresolution context synthesis.

It may be desirable for context generation engine 140 to produce generated context signal S50 based on a template that describes a sound texture. In one such example, context generation engine 140 is configured to perform a granular synthesis based on a template that includes a plurality of natural grains of different lengths. In another example, context generation engine 140 is configured to perform a cascade time-frequency linear prediction (CTFLP) synthesis based on a template that includes time-domain and frequency-domain coefficients of a CTFLP analysis (in a CTFLP analysis, the original signal is modeled using linear prediction in the frequency domain, and the residual of this analysis is then modeled using linear prediction in the frequency domain). In a further example, context generation engine 140 is configured to perform a multiresolution synthesis based on a template that includes a multiresolution analysis (MRA) tree, which describes coefficients of at least one basis function (e.g., coefficients of a scaling function, such as a Daubechies scaling function, and coefficients of a wavelet function, such as a Daubechies wavelet function) at different time and frequency scales. FIG. 10 shows one example of a multiresolution synthesis of generated context signal S50 based on sequences of average coefficients and detail coefficients.

It may be desirable for context generation engine 140 to produce generated context signal S50 according to an expected length of the voice communication session. In one such example, context generation engine 140 is configured to produce generated context signal S50 according to an average telephone call length. Typical values for average call length are in the range of from one to four minutes, and context generation engine 140 may be implemented to use a default value (e.g., two minutes) that may be varied upon user selection.

It may be desirable for context generation engine 140 to produce generated context signal S50 to include several or many different context signal clips that are based on the same template. The desired number of different clips may be set to a default value or selected by a user of apparatus X100, and a typical range of this number is from five to twenty. In one such example, context generation engine 140 is configured to calculate each of the different clips according to a clip length that is based on the average call length and the desired number of different clips. The clip length is typically one, two, or three orders of magnitude greater than the frame length. In one example, the average call length value is two minutes, the desired number of different clips is ten, and the clip length is calculated as twelve seconds by dividing two minutes by ten.

In such cases, context generation engine 140 may be configured to generate the desired number of different clips, each being based on the same template and having the calculated clip length, and to concatenate or otherwise combine these clips to produce generated context signal S50. Context generation engine 140 may be configured to repeat generated context signal S50 if necessary (e.g., if the length of the communication should exceed the average call length). It may be desirable to configure context generation engine 140 to generate a new clip according to a transition in audio signal S110 from voiced to unvoiced frames.

Figure 9D:
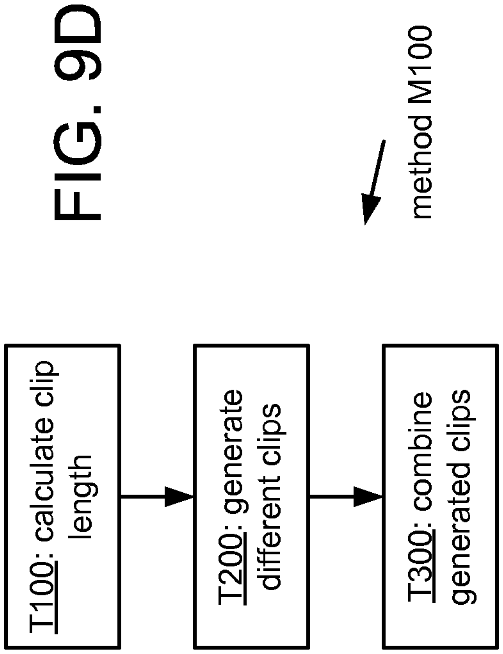
FIG. 9D shows a flowchart of a method M100 for producing a generated context signal S50.

FIG. 9D shows a flowchart of a method M100 for producing generated context signal S50 as may be performed by an implementation of context generation engine 140. Task T100 calculates a clip length based on an average call length value and a desired number of different clips. Task T200 generates the desired number of different clips based on the template. Task T300 combines the clips to produce generated context signal S50.

Task T200 may be configured to generate the context signal clips from a template that includes an MRA tree. For example, task T200 may be configured to generate each clip by generating a new MRA tree that is statistically similar to the template tree and synthesizing the context signal clip from the new tree. In such case, task T200 may be configured to generate a new MRA tree as a copy of the template tree in which one or more (possibly all) of the coefficients of one or more (possibly all) of the sequences are replaced with other coefficients of the template tree that have similar ancestors (i.e., in sequences at lower resolution) and/or predecessors (i.e., in the same sequence). In another example, task T200 is configured to generate each clip from a new set of coefficient values that is calculated by adding a small random value to each value of a copy of a template set of coefficient values.

Task T200 may be configured to scale one or more (possibly all) of the context signal clips according to one or more features of audio signal S10 and/or of a signal based thereon (e.g., signal S12 and/or S13). Such features may include signal level, frame energy, SNR, one or more mel frequency cepstral coefficients (MFCCs), and/or one or more results of a voice activity detection operation on the signal or signals. For a case in which task T200 is configured to synthesize the clips from generated MRA trees, task T200 may be configured to perform such scaling on coefficients of the generated MRA trees. An implementation of context generator 120 may be configured to perform such an implementation of task T200. Additionally or in the alternative, task T300 may be configured to perform such scaling on the combined generated context signal. An implementation of context mixer 190 may be configured to perform such an implementation of task T300.

Task T300 may be configured to combine the context signal clips according to a measure of similarity. Task T300 may be configured to concatenate clips that have similar MFCC vectors (e.g., to concatenate clips according to relative similarities of MFCC vectors over the set of candidate clips). For example, task T200 may be configured to minimize a total distance, calculated over the string of combined clips, between MFCC vectors of adjacent clips. For a case in which task T200 is configured to perform a CTFLP synthesis, task T300 may be configured to concatenate or otherwise combine clips generated from similar coefficients. For example, task T200 may be configured to minimize a total distance, calculated over the string of combined clips, between LPC coefficients of adjacent clips. Task T300 may also be configured to concatenate clips that have similar boundary transients (e.g., to avoid an audible discontinuity from one clip to the next). For example, task T200 may be configured to minimize a total distance, calculated over the string of combined clips, between energies over boundary regions of adjacent clips. In any of these examples, task T300 may be configured to combine adjacent clips using an overlap-and-add or cross-fade operation rather than concatenation.

As described above, context generation engine 140 may be configured to produce generated context signal S50 based on a description of a sound texture, which may be downloaded or retrieved in a compact representation form that allows low storage cost and extended non-repetitive generation. Such techniques may also be applied to video or audiovisual applications. For example, a video-capable implementation of apparatus X100 may be configured to perform a multiresolution synthesis operation to enhance or replace the visual context (e.g., the background and/or lighting characteristics) of an audiovisual communication, based on a set of parameter values that describe a replacement background.

Context generation engine 140 may be configured to repeatedly generate random MRA trees throughout the communications session (e.g., the telephone call). The depth of the MRA tree may be selected based on a tolerance to delay, as a larger tree may be expected to take longer to generate. In another example, context generation engine 140 may be configured to generate multiple short MRA trees using different templates, and/or to select multiple random MRA trees, and to mix and/or concatenate two or more of these trees to obtain a longer sequence of samples.

It may be desirable to configure apparatus X100 to control the level of generated context signal S50 according to a state of a gain control signal S90. For example, context generator 120 (or an element thereof, such as context generation engine 140) may be configured to produce generated context signal S50 at a particular level according to a state of gain control signal S90, possibly by performing a scaling operation on generated context signal S50 or on a precursor of signal S50 (e.g., on coefficients of a template tree or of an MRA tree generated from a template tree). In another example, FIG. 13A shows a block diagram of an implementation 192 of context mixer 190 that includes a scaler (e.g., a multiplier) which is arranged to perform a scaling operation on generated context signal S50 according to a state of a gain control signal S90. Context mixer 192 also includes an adder configured to add the scaled context signal to context-suppressed audio signal S13.

A device that includes apparatus X100 may be configured to set the state of gain control signal S90 according to a user selection. For example, such a device may be equipped with a volume control by which a user of the device may select a desired level of generated context signal S50 (e.g., a switch or knob, or a graphical user interface providing such functionality). In this case, the device may be configured to set the state of gain control signal S90 according to the selected level. In another example, such a volume control may be configured to allow the user to select a desired level of generated context signal S50 relative to a level of the speech component (e.g., of context-suppressed audio signal S13).

Figure 11A:
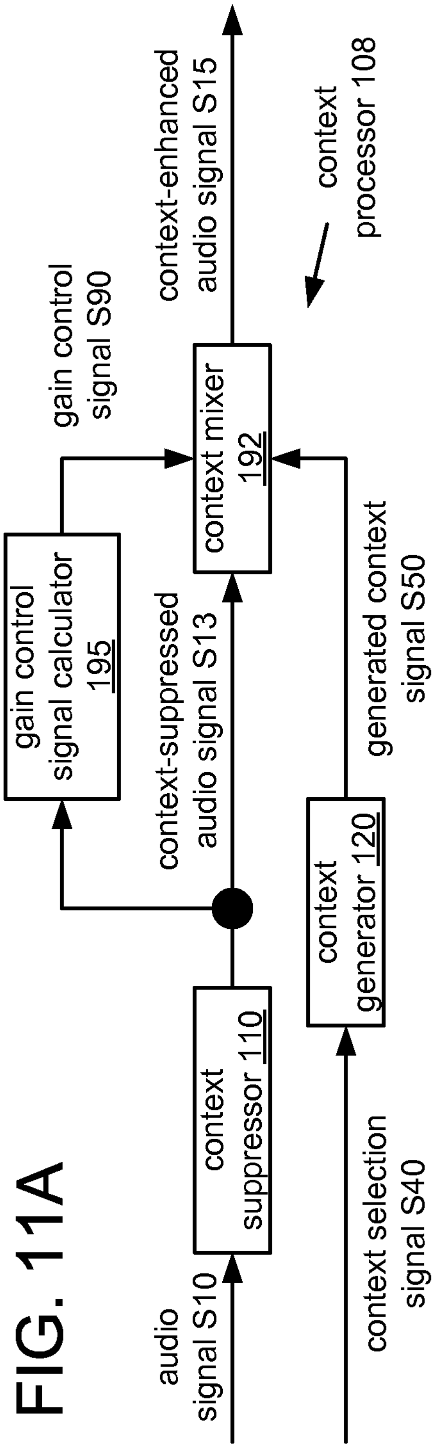
FIG. 11A shows a block diagram of an implementation 108 of context processor 102.

FIG. 11A shows a block diagram of an implementation 108 of context processor 102 that includes a gain control signal calculator 195. Gain control signal calculator 195 is configured to calculate gain control signal S90 according to a level of signal S13, which may change over time. For example, gain control signal calculator 195 may be configured to set a state of gain control signal S90 based on an average energy of active frames of signal S13. Additionally or in the alternative to either such case, a device that includes apparatus X100 may be equipped with a volume control that is configured to allow the user to control a level of the speech component (e.g., signal S13) or of context-enhanced audio signal S15 directly, or to control such a level indirectly (e.g., by controlling a level of a precursor signal).

Apparatus X100 may be configured to control the level of generated context signal S50 relative to a level of one or more of audio signals S11, S12, and S13, which may change over time. In one example, apparatus X100 is configured to control the level of generated context signal S50 according to the level of the original context of audio signal S10. Such an implementation of apparatus X100 may include an implementation of gain control signal calculator 195 that is configured to calculate gain control signal S90 according to a relation (e.g., a difference) between input and output levels of context suppressor 110 during active frames. For example, such a gain control calculator may be configured to calculate gain control signal S90 according to a relation (e.g., a difference) between a level of audio signal S10 and a level of context-suppressed audio signal S13. Such a gain control calculator may be configured to calculate gain control signal S90 according to an SNR of audio signal S10, which may be calculated from levels of active frames of signals S10 and S13. Such a gain control signal calculator may be configured to calculate gain control signal S90 based on an input level that is smoothed (e.g., averaged) over time and/or may be configured to output a gain control signal S90 that is smoothed (e.g., averaged) over time.

In another example, apparatus X100 is configured to control the level of generated context signal S50 according to a desired SNR. The SNR, which may be characterized as a ratio between the level of the speech component (e.g., context-suppressed audio signal S13) and the level of generated context signal S50 in active frames of context-enhanced audio signal S15, may also be referred to as a "signal-to-context ratio." The desired SNR value may be user-selected and/or may vary from one generated context to another. For example, different generated context signals S50 may be associated with different corresponding desired SNR values. A typical range of desired SNR values is from 20 to 25 dB. In another example, apparatus X100 is configured to control the level of generated context signal S50 (e.g., a background signal) to be less than the level of context-suppressed audio signal S13 (e.g., a foreground signal).

Figure 11B:
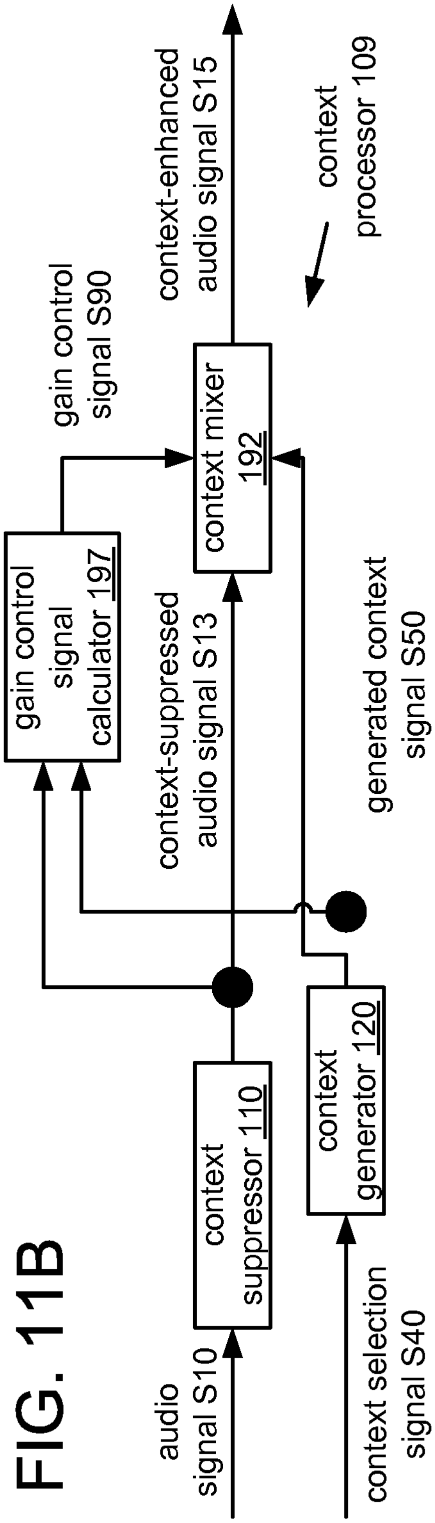
FIG. 11B shows a block diagram of an implementation 109 of context processor 102.

FIG. 11B shows a block diagram of an implementation 109 of context processor 102 that includes an implementation 197 of gain control signal calculator 195. Gain control calculator 197 is configured and arranged to calculate gain control signal S90 according to a relation between (A) a desired SNR value and (B) a ratio between levels of signals S13 and S50. In one example, if the ratio is less than the desired SNR value, the corresponding state of gain control signal S90 causes context mixer 192 to mix generated context signal S50 at a higher level (e.g., to increase the level of generated context signal S50 before adding it to context-suppressed signal S13), and if the ratio is greater than the desired SNR value, the corresponding state of gain control signal S90 causes context mixer 192 to mix generated context signal S50 at a lower level (e.g., to decrease the level of signal S50 before adding it to signal S13).

As described above, gain control signal calculator 195 is configured to calculate a state of gain control signal S90 according to a level of each of one or more input signals (e.g., S10, S13, S50). Gain control signal calculator 195 may be configured to calculate the level of an input signal as the amplitude of the signal averaged over one or more active frames. Alternatively, gain control signal calculator 195 may be configured to calculate the level of an input signal as the energy of the signal averaged over one or more active frames. Typically the energy of a frame is calculated as the sum of the squared samples of the frame. It may be desirable to configure gain control signal calculator 195 to filter (e.g., to average or smooth) one or more of the calculated levels and/or gain control signal S90. For example, it may be desirable to configure gain control signal calculator 195 to calculate a running average of the frame energy of an input signal such as S10 or S13 (e.g., by applying a first-order or higher-order finite-impulse-response or infinite-impulse-response filter to the calculated frame energy of the signal) and to use the average energy to calculate gain control signal S90. Likewise, it may be desirable to configure gain control signal calculator 195 to apply such a filter to gain control signal S90 before outputting it to context mixer 192 and/or to context generator 120.

It is possible for the level of the context component of audio signal S10 to vary independently of the level of the speech component, and in such case it may be desirable to vary the level of generated context signal S50 accordingly. For example, context generator 120 may be configured to vary the level of generated context signal S50 according to the SNR of audio signal S10. In such manner, context generator 120 may be configured to control the level of generated context signal S50 to approximate the level of the original context in audio signal S10.

To maintain the illusion of a context component that is independent of the speech component, it may be desirable to maintain a constant context level even if the signal level changes. Changes in the signal level may occur, for example, due to changes in the orientation of the speaker's mouth to the microphone or due to changes in the speaker's voice such as volume modulation or another expressive effect. In such cases, it may be desirable for the level of generated context signal S50 to remain constant for the duration of the communications session (e.g., a telephone call).

An implementation of apparatus X100 as described herein may be included in any type of device that is configured for voice communications or storage. Examples of such a device may include but are not limited to the following: a telephone, a cellular telephone, a headset (e.g., an earpiece configured to communicate in full duplex with a mobile user terminal via a version of the Bluetooth™ wireless protocol), a personal digital assistant (PDA), a laptop computer, a voice recorder, a game player, a music player, a digital camera. The device may also be configured as a mobile user terminal for wireless communications, such that an implementation of apparatus X100 as described herein may be included within, or may otherwise be configured to supply encoded audio signal S20 to, a transmitter or transceiver portion of the device.

A system for voice communications, such as a system for wired and/or wireless telephony, typically includes a number of transmitters and receivers. A transmitter and a receiver may be integrated or otherwise implemented together within a common housing as a transceiver. It may be desirable to implement apparatus X100 as an upgrade to a transmitter or transceiver that has sufficient available processing, storage, and upgradeability. For example, an implementation of apparatus X100 may be realized by adding the elements of context processor 100 (e.g., in a firmware update) to a device that already includes an implementation of speech encoder X10. In some cases, such an upgrade may be performed without altering any other part of the communications system. For example, it may be desirable to upgrade one or more of the transmitters in a communications system (e.g., the transmitter portion of each of one or more mobile user terminals in a system for wireless cellular telephony) to include an implementation of apparatus X100 without making any corresponding changes to the receivers. It may be desirable to perform the upgrade in a manner such that the resulting device remains backward-compatible (e.g., such that the device remains able to perform all or substantially all of its previous operations that do not involve use of context processor 100).

For a case in which an implementation of apparatus X100 is used to insert a generated context signal S50 into the encoded audio signal S20, it may be desirable for the speaker (i.e., the user of a device that includes the implementation of apparatus X100) to be able to monitor the transmission. For example, it may be desirable for the speaker to be able to hear generated context signal S50 and/or context-enhanced audio signal S15. Such capability may be especially desirable for a case in which generated context signal S50 is dissimilar to the existing context.

Accordingly, a device that includes an implementation of apparatus X100 may be configured to feedback at least one among generated context signal S50 and context-enhanced audio signal S15 to an earpiece, speaker, or other audio transducer located within a housing of the device; to an audio output jack located within a housing of the device; and/or to a short-range wireless transmitter (e.g., a transmitter compliant with a version of the Bluetooth protocol, as promulgated by the Bluetooth Special Interest Group, Bellevue, Wash., and/or another personal-area network protocol) located within a housing of the device. Such a device may include a digital-to-analog converter (DAC) configured and arranged to produce an analog signal from generated context signal S50 or context-enhanced audio signal S15. Such a device may also be configured to perform one or more analog processing operations on the analog signal (e.g., filtering, equalization, and/or amplification) before it is applied to the jack and/or transducer. It is possible but not necessary for apparatus X100 to be configured to include such a DAC and/or analog processing path.

It may be desirable, at the decoder end of a voice communication (e.g., at a receiver or upon retrieval), to replace or enhance the existing context in a manner similar to the encoder-side techniques described above. It may also be desirable to implement such techniques without requiring alteration to the corresponding transmitter or encoding apparatus.

Figure 12A:
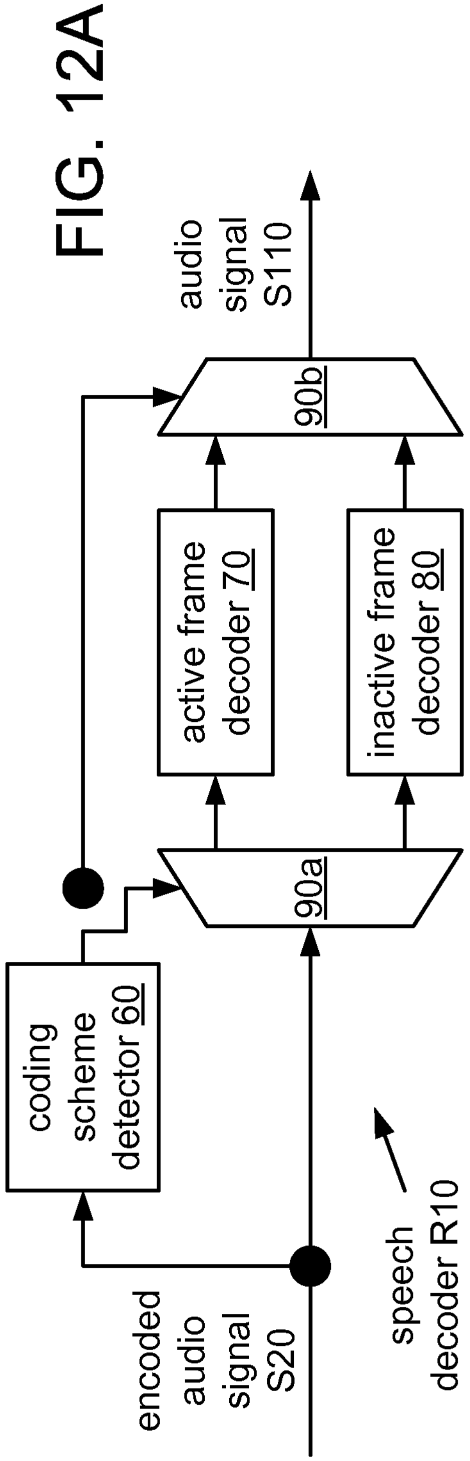
FIG. 12A shows a block diagram of a speech decoder R10.

FIG. 12A shows a block diagram of a speech decoder R10 that is configured to receive encoded audio signal S20 and to produce a corresponding decoded audio signal S110. Speech decoder R10 includes a coding scheme detector 60, an active frame decoder 70, and an inactive frame decoder 80. Encoded audio signal S20 is a digital signal as may be produced by speech encoder X10. Decoders 70 and 80 may be configured to correspond to the encoders of speech encoder X10 as described above, such that active frame decoder 70 is configured to decode frames that have been encoded by active frame encoder 30, and inactive frame decoder 80 is configured to decode frames that have been encoded by inactive frame encoder 40. Speech decoder R10 typically also includes a postfilter that is configured to process decoded audio signal S110 to reduce quantization noise (e.g., by emphasizing format frequencies and/or attenuating spectral valleys) and may also include adaptive gain control. A device that includes decoder R10 may include a digital-to-analog converter (DAC) configured and arranged to produce an analog signal from decoded audio signal S110 for output to an earpiece, speaker, or other audio transducer, and/or an audio output jack located within a housing of the device. Such a device may also be configured to perform one or more analog processing operations on the analog signal (e.g., filtering, equalization, and/or amplification) before it is applied to the jack and/or transducer.

Coding scheme detector 60 is configured to indicate a coding scheme that corresponds to the current frame of encoded audio signal S20. The appropriate coding bit rate and/or coding mode may be indicated by a format of the frame. Coding scheme detector 60 may be configured to perform rate detection or to receive a rate indication from another part of an apparatus within which speech decoder R10 is embedded, such as a multiplex sublayer. For example, coding scheme detector 60 may be configured to receive, from the multiplex sublayer, a packet type indicator that indicates the bit rate. Alternatively, coding scheme detector 60 may be configured to determine the bit rate of an encoded frame from one or more parameters such as frame energy. In some applications, the coding system is configured to use only one coding mode for a particular bit rate, such that the bit rate of the encoded frame also indicates the coding mode. In other cases, the encoded frame may include information, such as a set of one or more bits, that identifies the coding mode according to which the frame is encoded. Such information (also called a "coding index") may indicate the coding mode explicitly or implicitly (e.g., by indicating a value that is invalid for other possible coding modes).

Figure 12B:
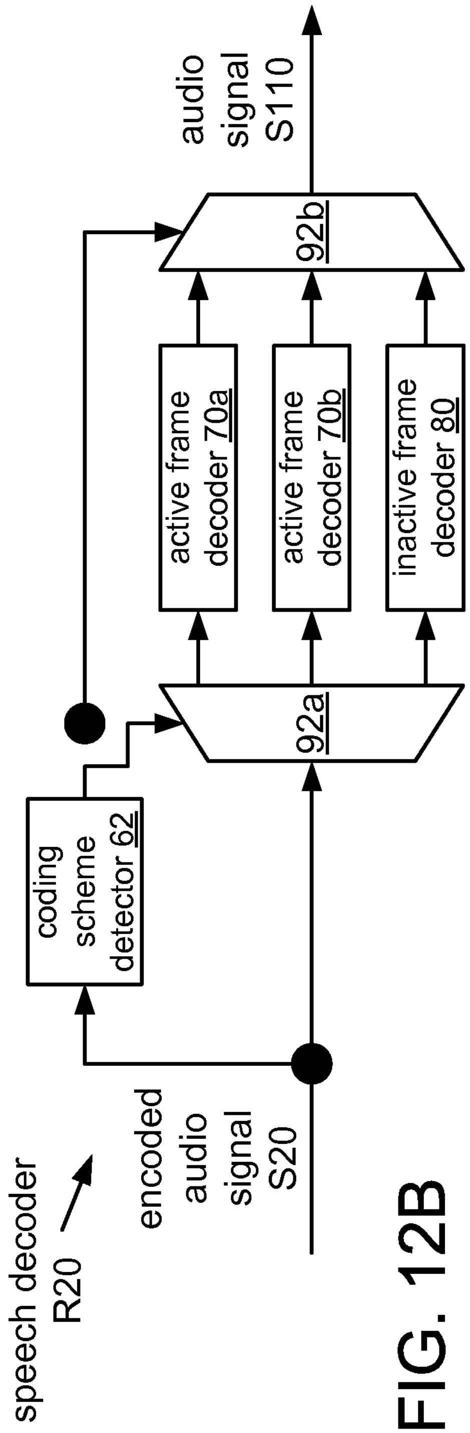
FIG. 12B shows a block diagram of an implementation R20 of speech decoder R10.

FIG. 12A shows an example in which a coding scheme indication produced by coding scheme detector 60 is used to control a pair of selectors 90*a* and 90*b* of speech decoder R10 to select one among active frame decoder 70 and inactive frame decoder 80. It is noted that a software or firmware implementation of speech decoder R10 may use the coding scheme indication to direct the flow of execution to one or another of the frame decoders, and that such an implementation may not include an analog for selector 90*a* and/or for selector 90*b*. FIG. 12B shows an example of an implementation R20 of speech decoder R10 that supports decoding of active frames encoded in multiple coding schemes, which feature may be included in any of the other speech decoder implementations described herein. Speech decoder R20 includes an implementation 62 of coding scheme detector 60; implementations 92*a*, 92*b* of selectors 90*a*, 90*b*; and implementations 70*a*, 70*b* of active frame decoder 70 that are configured to decode encoded frames using different coding schemes (e.g., full-rate CELP and half-rate NELP).

A typical implementation of active frame decoder 70 or inactive frame decoder 80 is configured to extract LPC coefficient values from the encoded frame (e.g., via dequantization followed by conversion of the dequantized vector or vectors to LPC coefficient value form) and to use those values to configure a synthesis filter. An excitation signal calculated or generated according to other values from the encoded frame and/or based on a pseudorandom noise signal is used to excite the synthesis filter to reproduce the corresponding decoded frame.

It is noted that two or more of the frame decoders may share common structure. For example, decoders 70 and 80 (or decoders 70*a*, 70*b*, and 80) may share a calculator of LPC coefficient values, possibly configured to produce a result having a different order for active frames than for inactive frames, but have respectively different temporal description calculators. It is also noted that a software or firmware implementation of speech decoder R10 may use the output of coding scheme detector 60 to direct the flow of execution to one or another of the frame decoders, and that such an implementation may not include an analog for selector 90*a* and/or for selector 90*b*.

FIG. 13B shows a block diagram of an apparatus R100 according to a general configuration (also called a decoder, decoding apparatus, or apparatus for decoding). Apparatus R100 is configured to remove the existing context from the decoded audio signal S110 and to replace it with a generated context that may be similar to or different from the existing context. In addition to the elements of speech decoder R10, apparatus R100 includes an implementation 200 of context processor 100 that is configured and arranged to process audio signal S110 to produce a context-enhanced audio signal S115. A communications device that includes apparatus R100, such as a cellular telephone, may be configured to perform processing operations on a signal received from a wired, wireless, or optical transmission channel (e.g., via radio-frequency demodulation of one or more carriers), such as error-correction, redundancy, and/or protocol (e.g., Ethernet, TCP/IP, CDMA2000) coding, to obtain encoded audio signal S20.

Figure 14A:
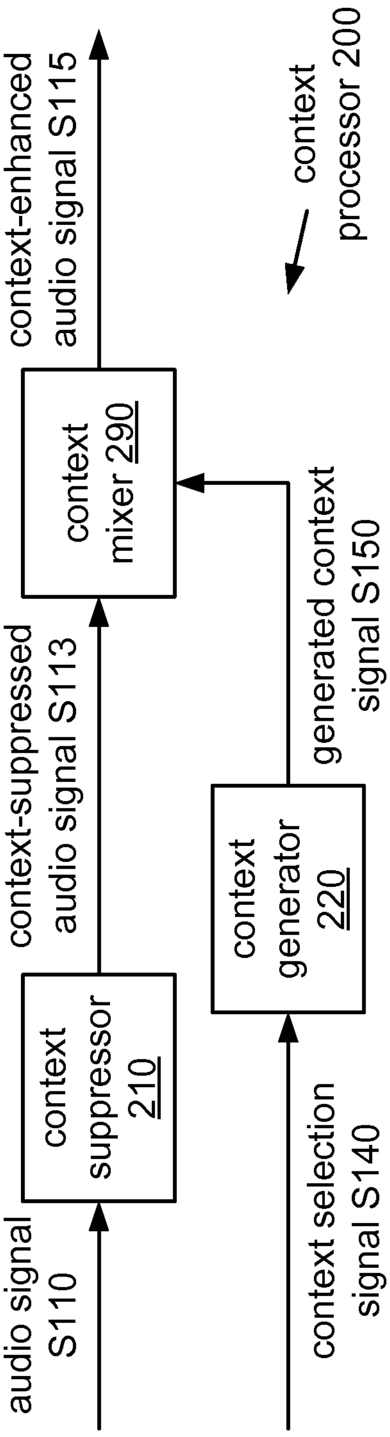
FIG. 14A shows a block diagram of an implementation of context processor 200.

As shown in FIG. 14A, context processor 200 may be configured to include an instance 210 of context suppressor 110, an instance 220 of context generator 120, and an instance 290 of context mixer 190, where such instances are configured according to any of the various implementations described above with reference to FIGS. 3B and 4B (with the exception that implementations of context suppressor 110 that use signals from multiple microphones as described above may not be suitable for use in apparatus R100.) For example, context processor 200 may include an implementation of context suppressor 110 that is configured to perform an aggressive implementation of a noise suppression operation as described above with reference to noise suppressor 10, such as a Wiener filtering operation, on audio signal S110 to obtain a context-suppressed audio signal S113. In another example, context processor 200 includes an implementation of context suppressor 110 that is configured to perform a spectral subtraction operation on audio signal S110, according to a statistical description of the existing context (e.g., of one or more inactive frames of audio signal S110) as described above, to obtain context-suppressed audio signal S113. Additionally or in the alternative to either such case, context processor 200 may be configured to perform a center clipping operation as described above on audio signal S110.

Figure 14B:
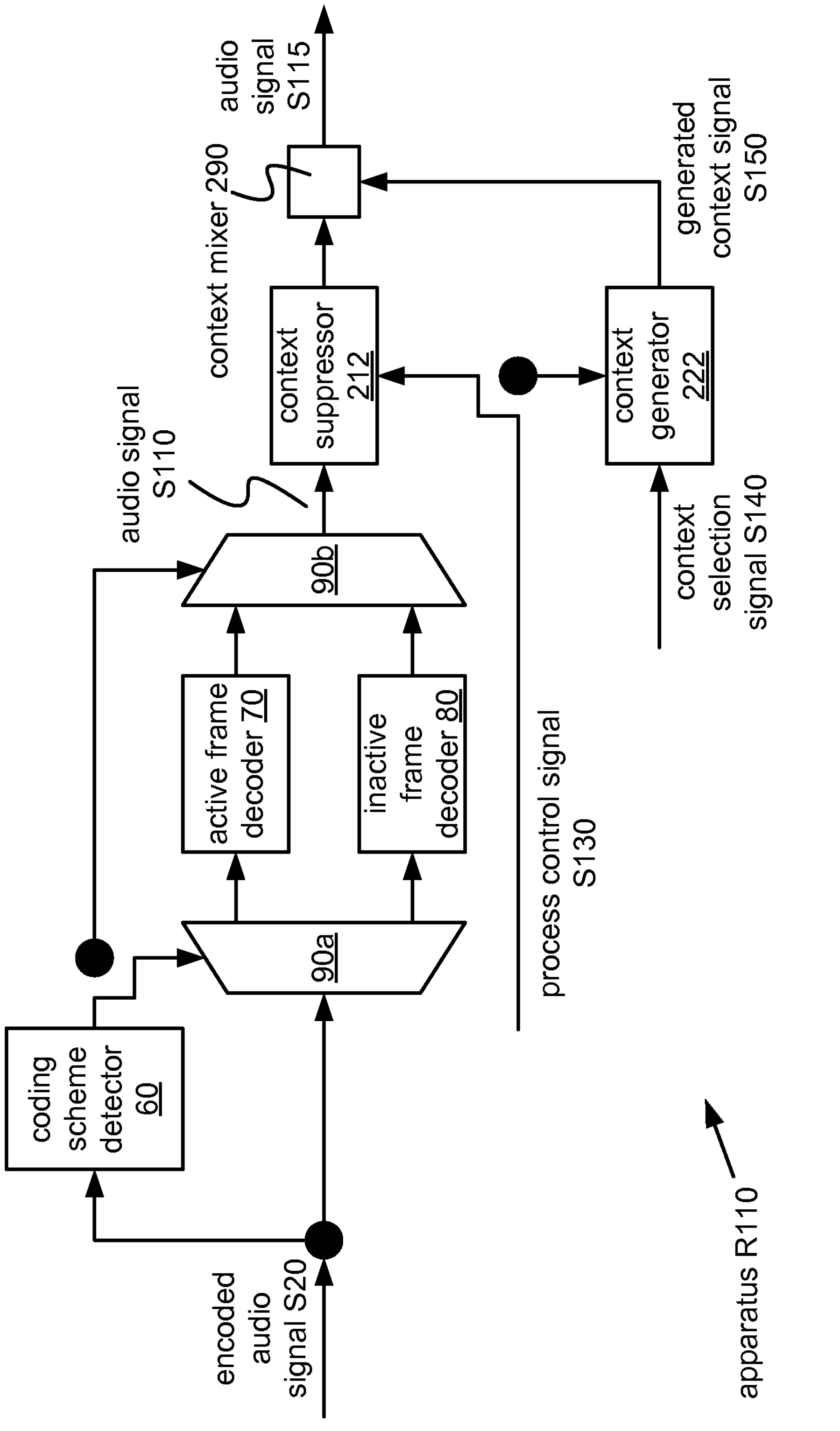
FIG. 14B shows a block diagram of an implementation R110 of apparatus R100.

As described above with reference to context suppressor 100, it may be desirable to implement context suppressor 200 to be configurable among two or more different modes of operation (e.g., ranging from no context suppression to substantially complete context suppression). FIG. 14B shows a block diagram of an implementation R110 of apparatus R100 that includes instances 212 and 222 of context suppressor 112 and context generator 122, respectively, that are configured to operate according to a state of an instance S130 of process control signal S30.

Context generator 220 is configured to produce an instance S150 of generated context signal S50 according to the state of an instance S140 of context selection signal S40. The state of context selection signal S140, which controls selection of at least one among two or more contexts, may be based on one or more criteria such as: information relating to a physical location of a device that includes apparatus R100 (e.g., based on GPS and/or other information as discussed above), a schedule that associates different times or time periods with corresponding contexts, the identity of the caller (e.g., as determined via calling number identification (CNID), also called "automatic number identification" (ANI) or Caller ID signaling), a user-selected setting or mode (such as a business mode, a soothing mode, a party mode), and/or a user selection (e.g., via a graphical user interface such as a menu) of one of a list of two or more contexts. For example, apparatus R100 may be implemented to include an instance of context selector 330 as described above that associates the values of such criteria with different contexts. In another example, apparatus R100 is implemented to include an instance of context classifier 320 as described above that is configured to generate context selection signal S140 based on one or more characteristics of the existing context of audio signal S110 (e.g., information relating to one or more temporal and/or frequency characteristics of one or more inactive frames of audio signal S110). Context generator 220 may be configured according to any of the various implementations of context generator 120 as described above. For example, context generator 220 may be configured to retrieve parameter values describing the selected context from local storage, or to download such parameter values from an external device such as a server (e.g., via SIP). It may be desirable to configure context generator 220 to synchronize the initiation and termination of producing context selection signal S50 with the start and end, respectively, of the communications session (e.g., the telephone call).

Process control signal S130 controls the operation of context suppressor 212 to enable or disable context suppression (i.e., to output an audio signal having either the existing context of audio signal S110 or a replacement context). As shown in FIG. 14B, process control signal S130 may also be arranged to enable or disable context generator 222. Alternatively, context selection signal S140 may be configured to include a state that selects a null output by context generator 220, or context mixer 290 may be configured to receive process control signal S130 as an enable/disable control input as described with reference to context mixer 190 above. Process control signal S130 may be implemented to have more than one state, such that it may be used to vary the level of suppression performed by context suppressor 212. Further implementations of apparatus R100 may be configured to control the level of context suppression, and/or the level of generated context signal S150, according to the level of ambient sound at the receiver. For example, such an implementation may be configured to control the SNR of audio signal S115 in inverse relation to the level of ambient sound (e.g., as sensed using a signal from a microphone of a device that includes apparatus R100). It is also expressly noted that inactive frame decoder 80 may be powered down when use of an artificial context is selected.

Figure 15:
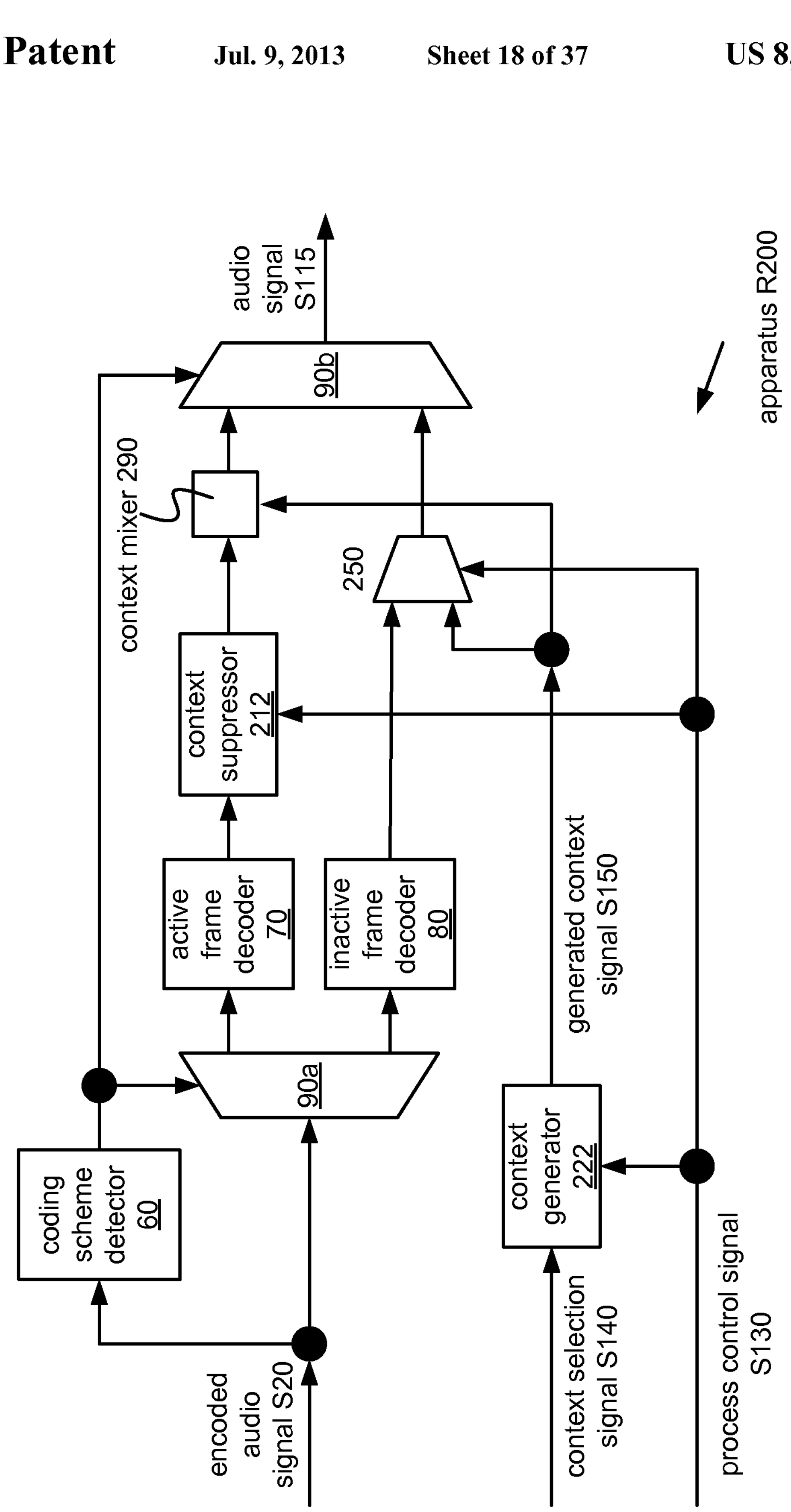
FIG. 15 shows a block diagram of an apparatus R200 according to a configuration.

In general, apparatus R100 may be configured to process active frames by decoding each frame according to an appropriate coding scheme, suppressing the existing context (possibly by a variable degree), and adding generated context signal S150 according to some level. For inactive frames, apparatus R100 may be implemented to decode each frame (or each SID frame) and add generated context signal S150. Alternatively, apparatus R100 may be implemented to ignore or discard inactive frames and replace them with generated context signal S150. For example, FIG. 15 shows an implementation of an apparatus R200 that is configured to discard the output of inactive frame decoder 80 when context suppression is selected. This example includes a selector 250 that is configured to select one among generated context signal S150 and the output of inactive frame decoder 80 according to the state of process control signal S130.

Further implementations of apparatus R100 may be configured to use information from one or more inactive frames of the decoded audio signal to improve a noise model applied by context suppressor 210 for context suppression in active frames. Additionally or in the alternative, such further implementations of apparatus R100 may be configured to use information from one or more inactive frames of the decoded audio signal to control the level of generated context signal S150 (e.g., to control the SNR of context-enhanced audio signal S115). Apparatus R100 may also be implemented to use context information from inactive frames of the decoded audio signal to supplement the existing context within one or more active frames of the decoded audio signal and/or one or more other inactive frames of the decoded audio signal. For example, such an implementation may be used to replace existing context that has been lost due to such factors as overly aggressive noise suppression at the transmitter and/or inadequate coding rate or SID transmission rate.

As noted above, apparatus R100 may be configured to perform context enhancement or replacement without action by and/or alteration of the encoder that produces encoded audio signal S20. Such an implementation of apparatus R100 may be included within a receiver that is configured to perform context enhancement or replacement without action by and/or alteration of a corresponding transmitter from which signal S20 is received. Alternatively, apparatus R100 may be configured to download context parameter values (e.g., from a SIP server) independently or according to encoder control, and/or such a receiver may be configured to download context parameter values (e.g., from a SIP server) independently or according to transmitter control. In such cases, the SIP server or other parameter value source may be configured such that a context selection by the encoder or transmitter overrides a context selection by the decoder or receiver.

It may be desirable to implement speech encoders and decoders, according to principles described herein (e.g., according to implementations of apparatus X100 and R100), that cooperate in operations of context enhancement and/or replacement. Within such a system, information that indicates the desired context may be transferred to the decoder in any of several different forms. In a first class of examples, the context information is transferred as a description that includes a set of parameter values, such as a vector of LSF values and a corresponding sequence of energy values (e.g., a silence descriptor or SID), or such as an average sequence and a corresponding set of detail sequences (as shown in the MRA tree example of FIG. 10). A set of parameter values (e.g., a vector) may be quantized for transmission as one or more codebook indices.

In a second class of examples, the context information is transferred to the decoder as one or more context identifiers (also called "context selection information"). A context identifier may be implemented as an index that corresponds to a particular entry in a list of two or more different audio contexts. In such cases, the indexed list entry (which may be stored locally or externally to the decoder) may include a description of the corresponding context that includes a set of parameter values. Additionally or in the alternative to the one or more context identifiers, the audio context selection information may include information that indicates the physical location and/or context mode of the encoder.

In either of these classes, the context information may be transferred from the encoder to the decoder directly and/or indirectly. In a direct transmission, the encoder sends the context information to the decoder within encoded audio signal S20 (i.e., over the same logical channel and via the same protocol stack as the speech component) and/or over a separate transmission channel (e.g., a data channel or other separate logical channel, which may use a different protocol). FIG. 16 shows a block diagram of an implementation X200 of apparatus X100 that is configured to transmit the speech component and encoded (e.g., quantized) parameter values for the selected audio context over different logical channels (e.g., within the same wireless signal or within different signals). In this particular example, apparatus X200 includes an instance of process control signal generator 340 as described above.

The implementation of apparatus X200 shown in FIG. 16 includes a context encoder 150. In this example, context encoder 150 is configured to produce an encoded context signal S80 that is based on a context description (e.g., a set of context parameter values S70). Context encoder 150 may be configured to produce encoded context signal S80 according to any coding scheme that is deemed suitable for the particular application. Such a coding scheme may include one or more compression operations such as Huffman coding, arithmetic coding, range encoding, and run-length-encoding. Such a coding scheme may be lossy and/or lossless. Such a coding scheme may be configured to produce a result having a fixed length and/or a result having a variable length. Such a coding scheme may include quantizing at least a portion of the context description.

Context encoder 150 may also be configured to perform protocol encoding of the context information (e.g., at a transport and/or application layer). In such case, context encoder 150 may be configured to perform one or more related operations such as packet formation and/or handshaking. It may even be desirable to configure such an implementation of context encoder 150 to send the context information without performing any other encoding operation.

Figure 17:
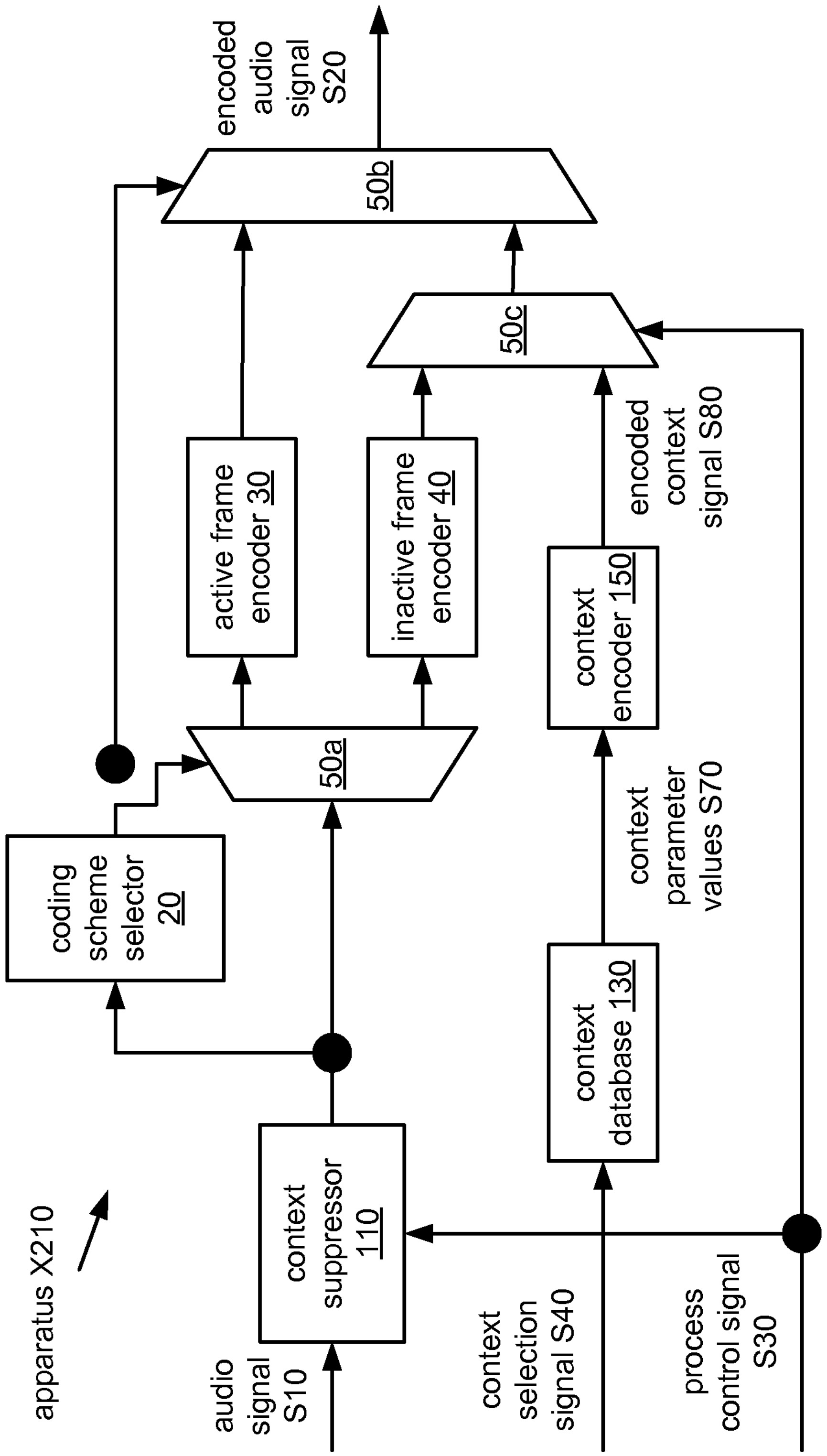
FIG. 17 shows a block diagram of an implementation X210 of apparatus X100.

FIG. 17 shows a block diagram of another implementation X210 of apparatus X100 that is configured to encode information identifying or describing the selected context into frame periods of encoded audio signal S20 that correspond to inactive frames of audio signal S10. Such frame periods are also referred to herein as "inactive frames of encoded audio signal S20." In some cases, a delay may result at the decoder until a sufficient amount of the description of the selected context has been received for context generation.

Figure 18:
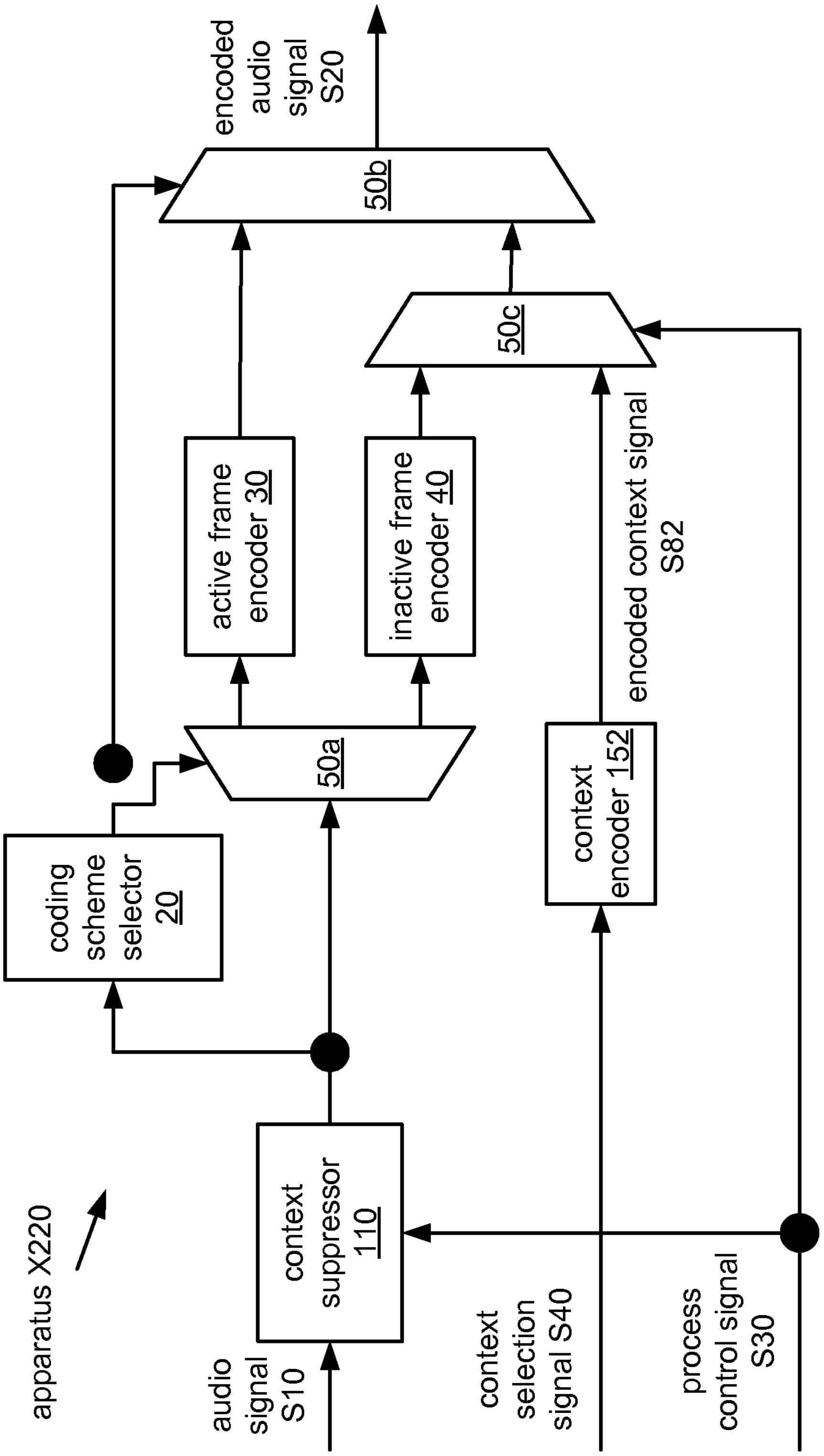
FIG. 18 shows a block diagram of an implementation X220 of apparatus X100.

In a related example, apparatus X210 is configured to send an initial context identifier that corresponds to a context description that is stored locally at the decoder and/or is downloaded from another device such as a server (e.g., during call setup) and is also configured to send subsequent updates to that context description (e.g., over inactive frames of encoded audio signal S20). FIG. 18 shows a block diagram of a related implementation X220 of apparatus X100 that is configured to encode audio context selection information (e.g., an identifier of the selected context) into inactive frames of encoded audio signal S20. In such case, apparatus X220 may be configured to update the context identifier during the course of the communications session, even from one frame to the next.

The implementation of apparatus X220 shown in FIG. 18 includes an implementation 152 of context encoder 150. Context encoder 152 is configured to produce an instance S82 of encoded context signal S80 that is based on audio context selection information (e.g., context selection signal S40), which may include one or more context identifiers and/or other information such as an indication of physical location and/or context mode. As described above with reference to context encoder 150, context encoder 152 may be configured to produce encoded context signal S82 according to any coding scheme that is deemed suitable for the particular application and/or may be configured to perform protocol encoding of the context selection information.

Implementations of apparatus X100 that are configured to encode context information into inactive frames of encoded audio signal S20 may be configured to encode such context information within each inactive frame or discontinuously. In one example of discontinuous transmission (DTX), such an implementation of apparatus X100 is configured to encode information that identifies or describes the selected context into a sequence of one or more inactive frames of encoded audio signal S20 according to a regular interval, such as every five or ten seconds, or every 128 or 256 frames. In another example of discontinuous transmission (DTX), such an implementation of apparatus X100 is configured to encode such information into a sequence of one or more inactive frames of encoded audio signal S20 according to some event, such as selection of a different context.

Figure 19:
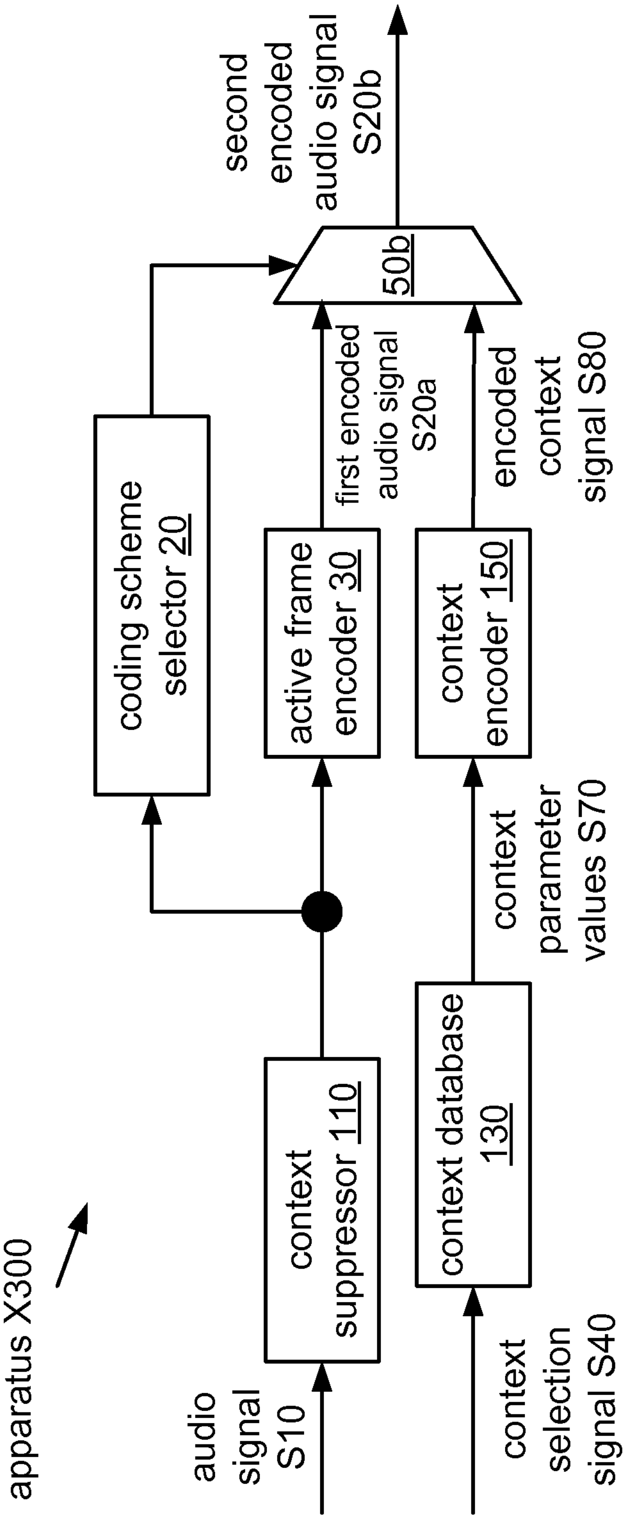
FIG. 19 shows a block diagram of an apparatus X300 according to a disclosed configuration.
Figure 20:
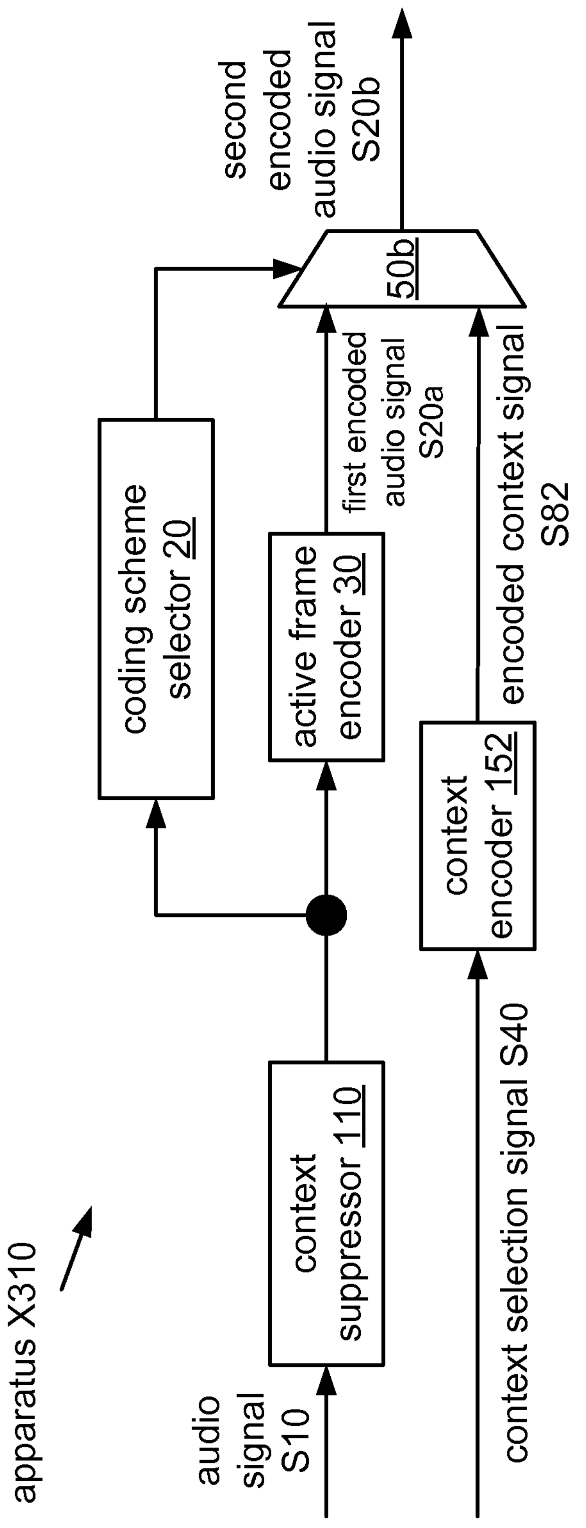
FIG. 20 shows a block diagram of an implementation X310 of apparatus X300.

Apparatus X210 and X220 are configured to perform either encoding of an existing context (i.e., legacy operation) or context replacement, according to the state of process control signal S30. In these cases, the encoded audio signal S20 may include a flag (e.g., one or more bits, possibly included in each inactive frame) that indicates whether the inactive frame includes the existing context or information relating to a replacement context. FIGS. 19 and 20 show block diagrams of corresponding apparatus (apparatus X300 and an implementation X310 of apparatus X300, respectively) that are configured without support for transmission of the existing context during inactive frames. In the example of FIG. 19, active frame encoder 30 is configured to produce a first encoded audio signal S20*a*, and coding scheme selector 20 is configured to control selector 50*b* to insert encoded context signal S80 into inactive frames of first encoded audio signal S20*a* to produce a second encoded audio signal S20*b*. In the example of FIG. 20, active frame encoder 30 is configured to produce a first encoded audio signal S20*a*, and coding scheme selector 20 is configured to control selector 50*b* to insert encoded context signal S82 into inactive frames of first encoded audio signal S20*a* to produce a second encoded audio signal S20*b*. It may be desirable in such examples to configure active frame encoder 30 to produce first encoded audio signal 20*a* in packetized form (e.g., as a series of encoded frames). In such cases, selector 50*b* may be configured to insert the encoded context signal at appropriate locations within packets (e.g., encoded frames) of first encoded audio signal S20*a* that correspond to inactive frames of the context-suppressed signal, as indicated by coding scheme selector 20, or selector 50*b* may be configured to insert packets (e.g., encoded frames) produced by context encoder 150 or 152 at appropriate locations within first encoded audio signal S20*a*, as indicated by coding scheme selector 20. As noted above, encoded context signal S80 may include information relating to the encoded context signal S80 such as a set of parameter values that describes the selected audio context, and encoded context signal S82 may include information relating to the encoded context signal S80 such as a context identifier that identifies the selected one among a set of audio contexts.

Figure 21A:
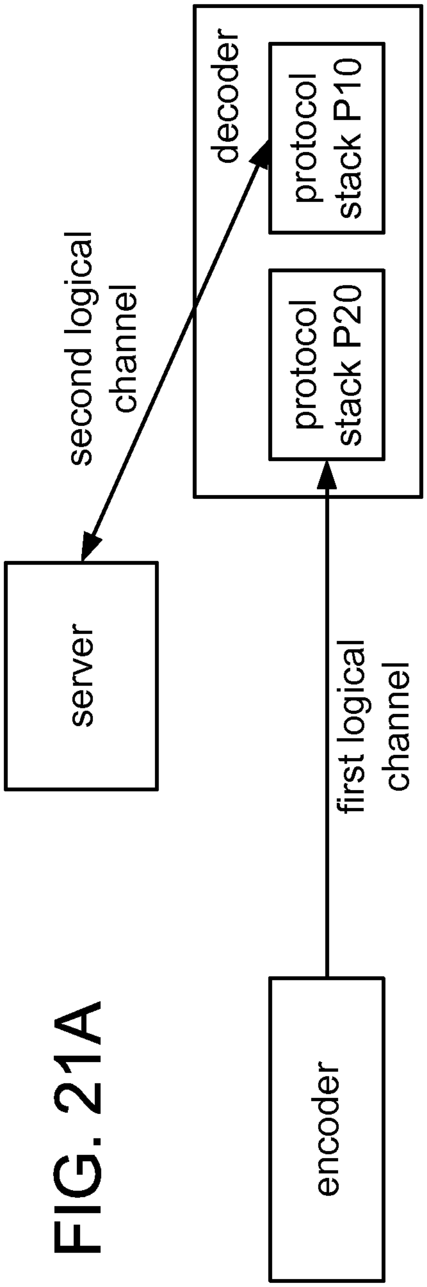
FIG. 21A shows an example of downloading context information from a server.

In an indirect transmission, the decoder receives the context information not only over a different logical channel than encoded audio signal S20 but also from a different entity, such as a server. For example, the decoder may be configured to request the context information from the server using an identifier of the encoder (e.g., a Uniform Resource Identifier (URI) or Uniform Resource Locator (URL), as described in RFC 3986, available online at www-dot-ietf-dot-org), an identifier of the decoder (e.g., a URL), and/or an identifier of the particular communications session. FIG. 21A shows an example in which a decoder downloads context information from a server, via a protocol stack P10 (e.g., within context generator 220 and/or context decoder 252) and over a second logical channel, according to information received from an encoder via a protocol stack P20 and over a first logical channel. Stacks P10 and P20 may be separate or may share one or more layers (e.g., one or more of a physical layer, a media access control layer, and a logical link layer). Downloading of context information from the server to the decoder, which may be performed in a manner similar to downloading of a ringtone or a music file or stream, may be performed using a protocol such as SIP.

Figure 21B:
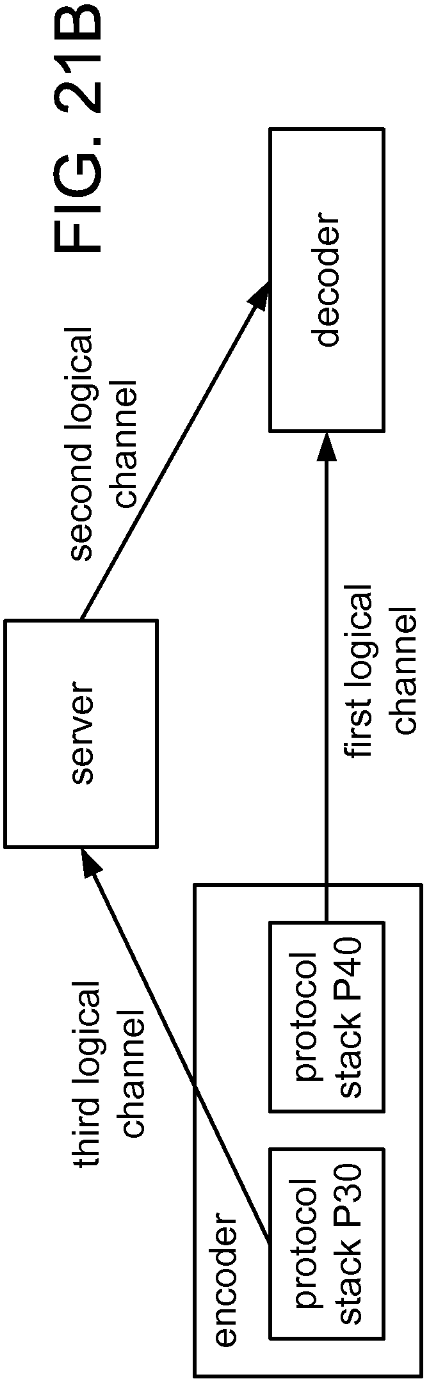
FIG. 21B shows an example of downloading context information to a decoder.

In other examples, the context information may be transferred from the encoder to the decoder by some combination of direct and indirect transmission. In one general example, the encoder sends context information in one form (e.g., as audio context selection information) to another device within the system, such as a server, and the other device sends corresponding context information in another form (e.g., as a context description) to the decoder. In a particular example of such a transfer, the server is configured to deliver the context information to the decoder without receiving a request for the information from the decoder (also called a "push"). For example, the server may be configured to push the context information to the decoder during call setup. FIG. 21B shows an example in which a server downloads context information to a decoder over a second logical channel according to information, which may include a URL or other identifier of the decoder, that is sent by an encoder via a protocol stack P30 (e.g., within context encoder 152) and over a third logical channel. In such case, the transfer from the encoder to the server, and/or the transfer from the server to the decoder, may be performed using a protocol such as SIP. This example also illustrates transmission of encoded audio signal S20 from the encoder to the decoder via a protocol stack P40 and over a first logical channel. Stacks P30 and P40 may be separate or may share one or more layers (e.g., one or more of a physical layer, a media access control layer, and a logical link layer).

An encoder as shown in FIG. 21B may be configured to initiate an SIP session by sending an INVITE message to the server during call setup. In one such example, the encoder sends audio context selection information to the server, such as a context identifier or a physical location (e.g., as a set of GPS coordinates). The encoder may also send entity identification information to the server, such as a URI of the decoder and/or a URI of the encoder. If the server supports the selected audio context, it sends an ACK message to the encoder, and the SIP session ends.

An encoder-decoder system may be configured to process active frames by suppressing the existing context at the encoder or by suppressing the existing context at the decoder. One or more potential advantages may be realized by performing context suppression at the encoder rather than at the decoder. For example, active frame encoder 30 may be expected to achieve a better coding result on a context-suppressed audio signal than on an audio signal in which the existing context is not suppressed. Better suppression techniques may also be available at the encoder, such as techniques that use audio signals from multiple microphones (e.g., blind source separation). It may also be desirable for the speaker to be able to hear the same context-suppressed speech component that the listener will hear, and performing context suppression at the encoder may be used to support such a feature. Of course, it is also possible to implement context suppression at both the encoder and decoder.

It may be desirable within an encoder-decoder system for the generated context signal S150 to be available at both of the encoder and decoder. For example, it may be desirable for the speaker to be able to hear the same context-enhanced audio signal that the listener will hear. In such case, a description of the selected context may be stored at and/or downloaded to both of the encoder and decoder. Moreover, it may be desirable to configure context generator 220 to produce generated context signal S150 deterministically, such that a context generation operation to be performed at the decoder may be duplicated at the encoder. For example, context generator 220 may be configured to use one or more values that are known to both of the encoder and the decoder (e.g., one or more values of encoded audio signal S20) to calculate any random value or signal that may be used in the generation operation, such as a random excitation signal used for CTFLP synthesis.

An encoder-decoder system may be configured to process inactive frames in any of several different ways. For example, the encoder may be configured to include the existing context within encoded audio signal S20. Inclusion of the existing context may be desirable to support legacy operation. Moreover, as discussed above, the decoder may be configured to use the existing context to support a context suppression operation.

Alternatively, the encoder may be configured to use one or more of the inactive frames of encoded audio signal S20 to carry information relating to a selected context, such as one or more context identifiers and/or descriptions. Apparatus X300 as shown in FIG. 19 is one example of an encoder that does not transmit the existing context. As noted above, encoding of context identifiers in the inactive frames may be used to support updating generated context signal S150 during a communications session such as a telephone call. A corresponding decoder may be configured to perform such an update quickly and possibly even on a frame-to-frame basis.

In a further alternative, the encoder may be configured to transmit few or no bits during inactive frames, which may allow the encoder to use a higher coding rate for the active frames without increasing the average bit rate. Depending on the system, it may be necessary for the encoder to include some minimum number of bits during each inactive frame in order to maintain the connection.

It may be desirable for an encoder such as an implementation of apparatus X100 (e.g., apparatus X200, X210, or X220) or X300 to send an indication of changes in the level of the selected audio context over time. Such an encoder may be configured to send such information as parameter values (e.g., gain parameter values) within an encoded context signal S80 and/or over a different logical channel. In one example, the description of the selected context includes information describing a spectral distribution of the context, and the encoder is configured to send information relating to changes in the audio level of the context over time as a separate temporal description, which may be updated at a different rate than the spectral description. In another example, the description of the selected context describes both spectral and temporal characteristics of the context over a first time scale (e.g., over a frame or other interval of similar length), and the encoder is configured to send information relating to changes in the audio level of the context over a second time scale (e.g., a longer time scale, such as from frame to frame) as a separate temporal description. Such an example may be implemented using a separate temporal description that includes a context gain value for each frame.

In a further example that may be applied to either of the two examples above, updates to the description of the selected context are sent using discontinuous transmission (within inactive frames of encoded audio signal S20 or over a second logical channel), and updates to the separate temporal description are also sent using discontinuous transmission (within inactive frames of encoded audio signal S20, over the second logical channel, or over another logical channel), with the two descriptions being updated at different intervals and/or according to different events. For example, such an encoder may be configured to update the description of the selected context less frequently than the separate temporal description (e.g., every 512, 1024, or 2048 frames vs. every four, eight, or sixteen frames). Another example of such an encoder is configured to update the description of the selected context according to a change in one or more frequency characteristics of the existing context (and/or according to a user selection) and is configured to update the separate temporal description according to a change in a level of the existing context.

Figure 22:
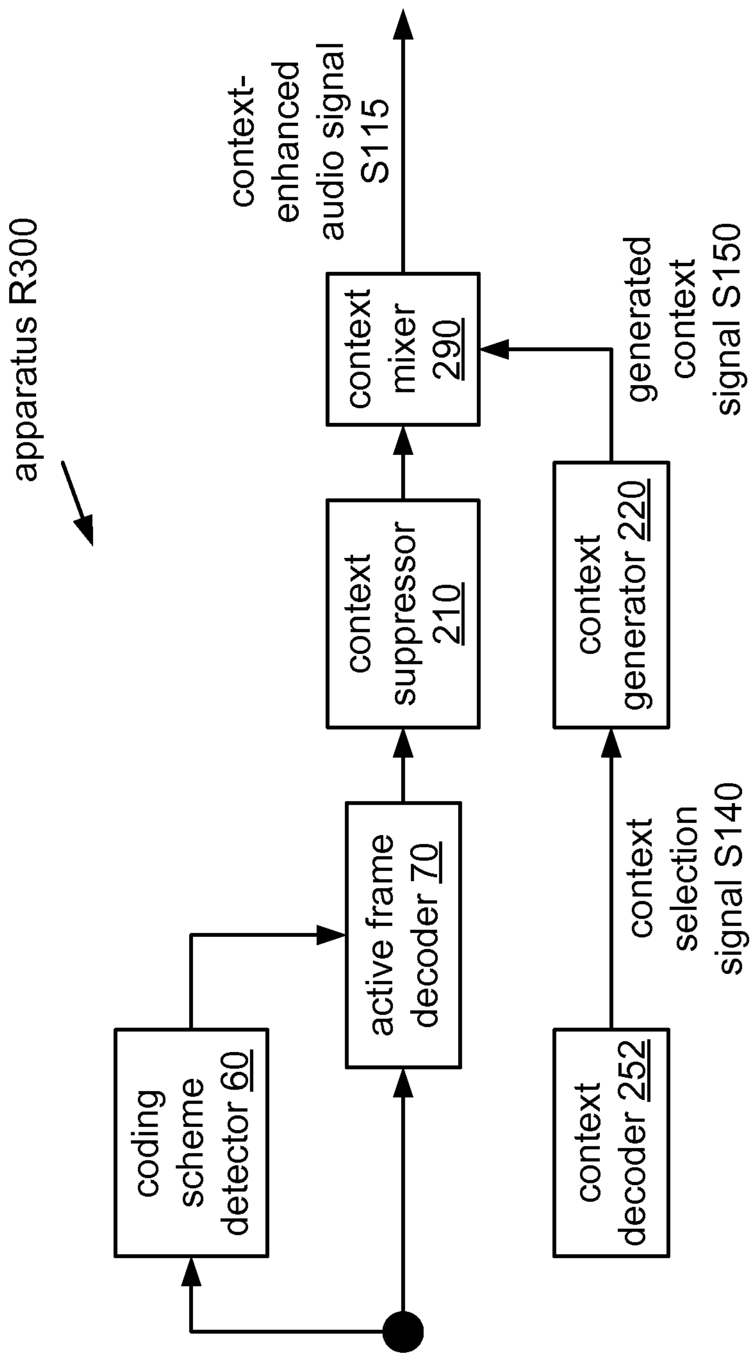
FIG. 22 shows a block diagram of an apparatus R300 according to a disclosed configuration.
Figure 23:
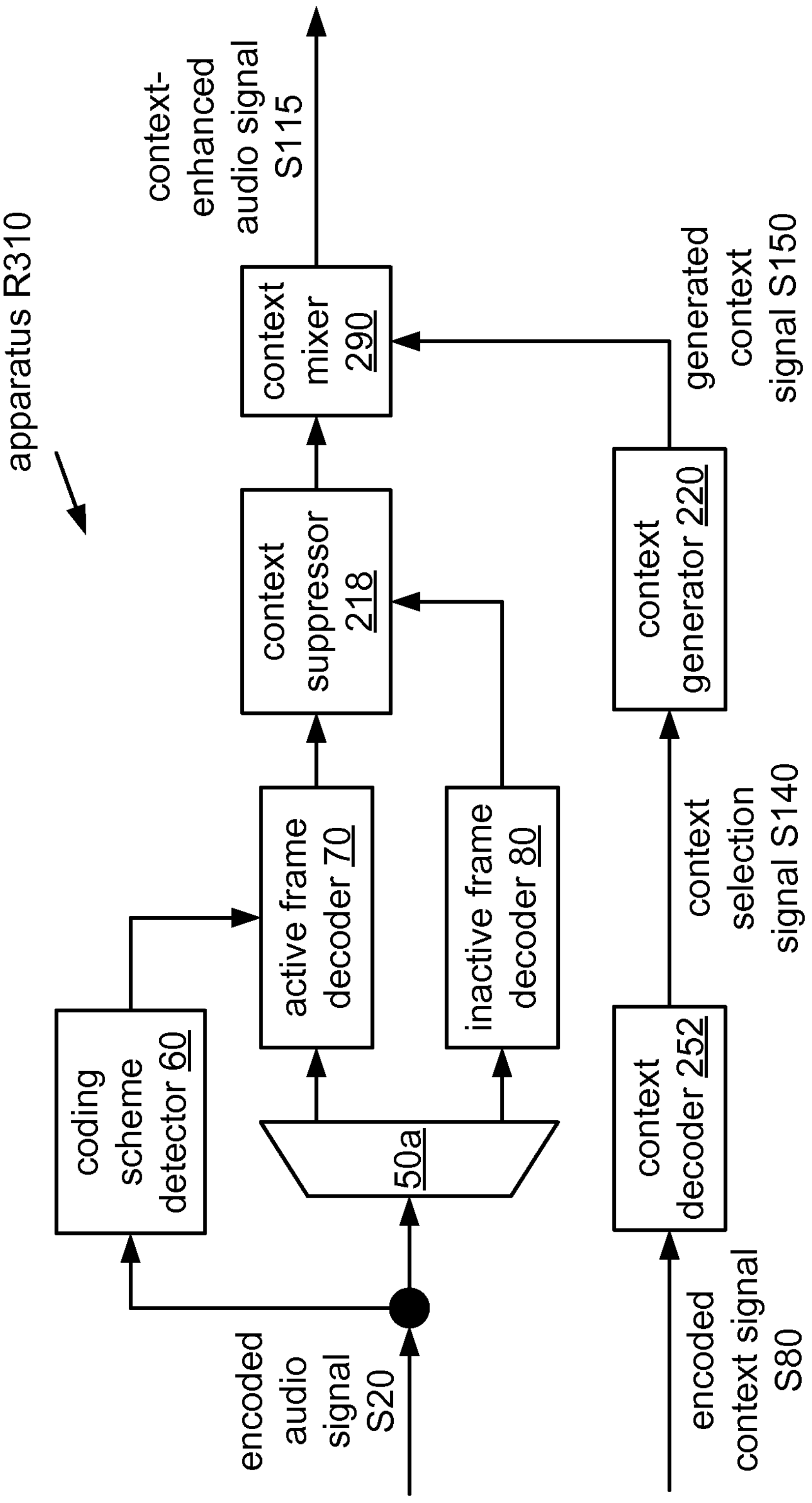
FIG. 23 shows a block diagram of an implementation R310 of apparatus R300.
Figure 24:
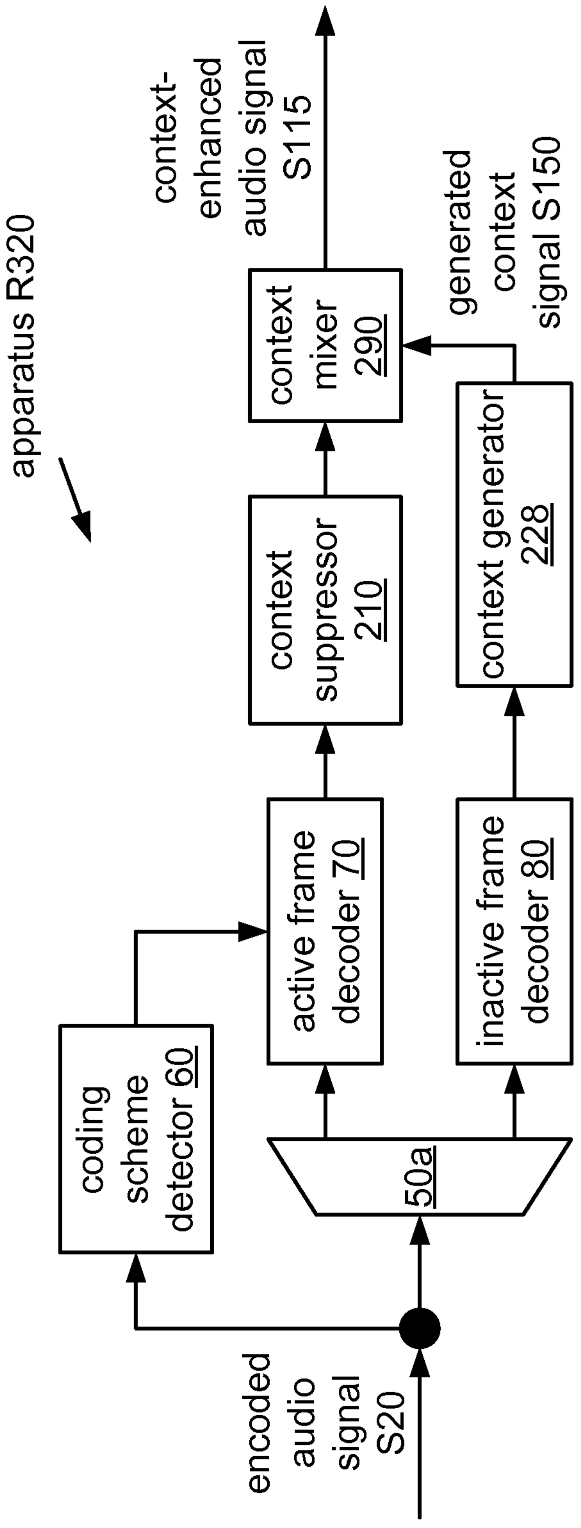
FIG. 24 shows a block diagram of an implementation R320 of apparatus R300.

FIGS. 22, 23, and 24 illustrate examples of apparatus for decoding that are configured to perform context replacement. FIG. 22 shows a block diagram of an apparatus R300 that includes an instance of context generator 220 which is configured to produce a generated context signal S150 according to the state of a context selection signal S140. FIG. 23 shows a block diagram of an implementation R310 of apparatus R300 that includes an implementation 218 of context suppressor 210. Context suppressor 218 is configured to use existing context information from inactive frames (e.g., a spectral distribution of the existing context) to support a context suppression operation (e.g., spectral subtraction).

The implementations of apparatus R300 and R310 shown in FIGS. 22 and 23 also include a context decoder 252. Context decoder 252 is configured to perform data and/or protocol decoding of encoded context signal S80 (e.g., complementary to the encoding operations described above with reference to context encoder 152) to produce context selection signal S140. Alternatively or additionally, apparatus R300 and R310 may be implemented to include a context decoder 250, complementary to context encoder 150 as described above, that is configured to produce a context description (e.g., a set of context parameter values) based on a corresponding instance of encoded context signal S80.

FIG. 24 shows a block diagram of an implementation R320 of speech decoder R300 that includes an implementation 228 of context generator 220. Context generator 228 is configured to use existing context information from inactive frames (e.g., information relating to a distribution of energy of the existing context in the time and/or frequency domains) to support a context generation operation.

The various elements of implementations of apparatus for encoding (e.g., apparatus X100 and X300) and apparatus for decoding (e.g., apparatus R100, R200, and R300) as described herein may be implemented as electronic and/or optical devices residing, for example, on the same chip or among two or more chips in a chipset, although other arrangements without such limitation are also contemplated. One or more elements of such an apparatus may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits).

It is possible for one or more elements of an implementation of such an apparatus to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times). In one example, context suppressor 110, context generator 120, and context mixer 190 are implemented as sets of instructions arranged to execute on the same processor. In another example, context processor 100 and speech encoder X10 are implemented as sets of instructions arranged to execute on the same processor. In another example, context processor 200 and speech decoder R10 are implemented as sets of instructions arranged to execute on the same processor. In another example, context processor 100, speech encoder X10, and speech decoder R10 are implemented as sets of instructions arranged to execute on the same processor. In another example, active frame encoder 30 and inactive frame encoder 40 are implemented to include the same set of instructions executing at different times. In another example, active frame decoder 70 and inactive frame decoder 80 are implemented to include the same set of instructions executing at different times.

A device for wireless communications, such as a cellular telephone or other device having such communications capability, may be configured to include both an encoder (e.g., an implementation of apparatus X100 or X300) and a decoder (e.g., an implementation of apparatus R100, R200, or R300). In such case, it is possible to the encoder and decoder to have structure in common. In one such example, the encoder and decoder are implemented to include sets of instructions that are arranged to execute on the same processor.

The operations of the various encoders and decoders described herein may also be viewed as particular examples of methods of signal processing. Such a method may be implemented as a set of tasks, one or more (possibly all) of which may be performed by one or more arrays of logic elements (e.g., processors, microprocessors, microcontrollers, or other finite state machines). One or more (possibly all) of the tasks may also be implemented as code (e.g., one or more sets of instructions) executable by one or more arrays of logic elements, which code may be tangibly embodied in a data storage medium.

Figure 25A:
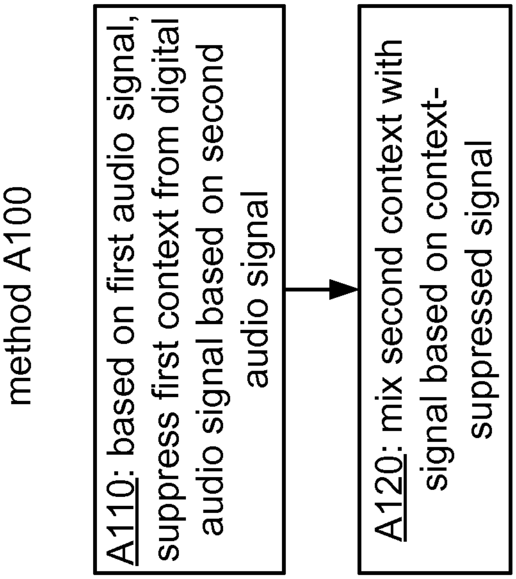
FIG. 25A shows a flowchart of a method A100 according to a disclosed configuration.

FIG. 25A shows a flowchart of a method A100, according to a disclosed configuration, of processing a digital audio signal that includes a first audio context. Method A100 includes tasks A10 and A120. Based on a first audio signal that is produced by a first microphone, task A 10 suppresses the first audio context from the digital audio signal to obtain a context-suppressed signal. Task A120 mixes a second audio context with a signal that is based on the context-suppressed signal to obtain a context-enhanced signal. In this method, the digital audio signal is based on a second audio signal that is produced by a second microphone different than the first microphone. Method A100 may be performed, for example, by an implementation of apparatus X100 or X300 as described herein.

Figure 25B:
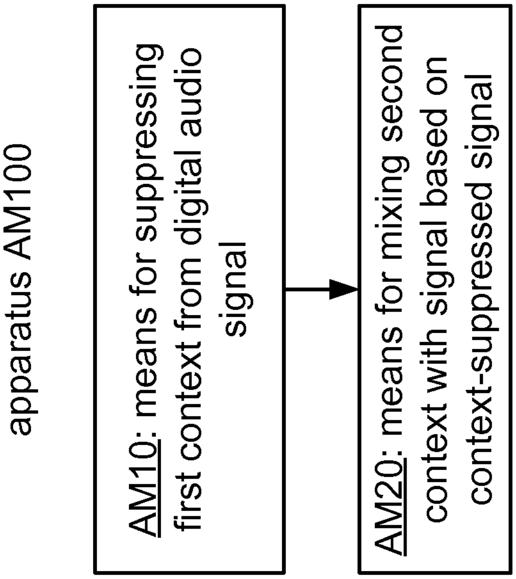
FIG. 25B shows a block diagram of an apparatus AM100 according to a disclosed configuration.

FIG. 25B shows a block diagram of an apparatus AM100, according to a disclosed configuration, for processing a digital audio signal that includes a first audio context. Apparatus AM100 includes means for performing the various tasks of method A100. Apparatus AM100 includes means AM10 for suppressing, based on a first audio signal that is produced by a first microphone, the first audio context from the digital audio signal to obtain a context-suppressed signal. Apparatus AM100 includes means AM20 for mixing a second audio context with a signal that is based on the context-suppressed signal to obtain a context-enhanced signal. In this apparatus, the digital audio signal is based on a second audio signal that is produced by a second microphone different than the first microphone. The various elements of apparatus AM100 may be implemented using any structures capable of performing such tasks, including any of the structures for performing such tasks that are disclosed herein (e.g., as one or more sets of instructions, one or more arrays of logic elements, etc.). Examples of the various elements of apparatus AM100 are disclosed herein in the descriptions of apparatus X100 and X300.

Figure 26A:
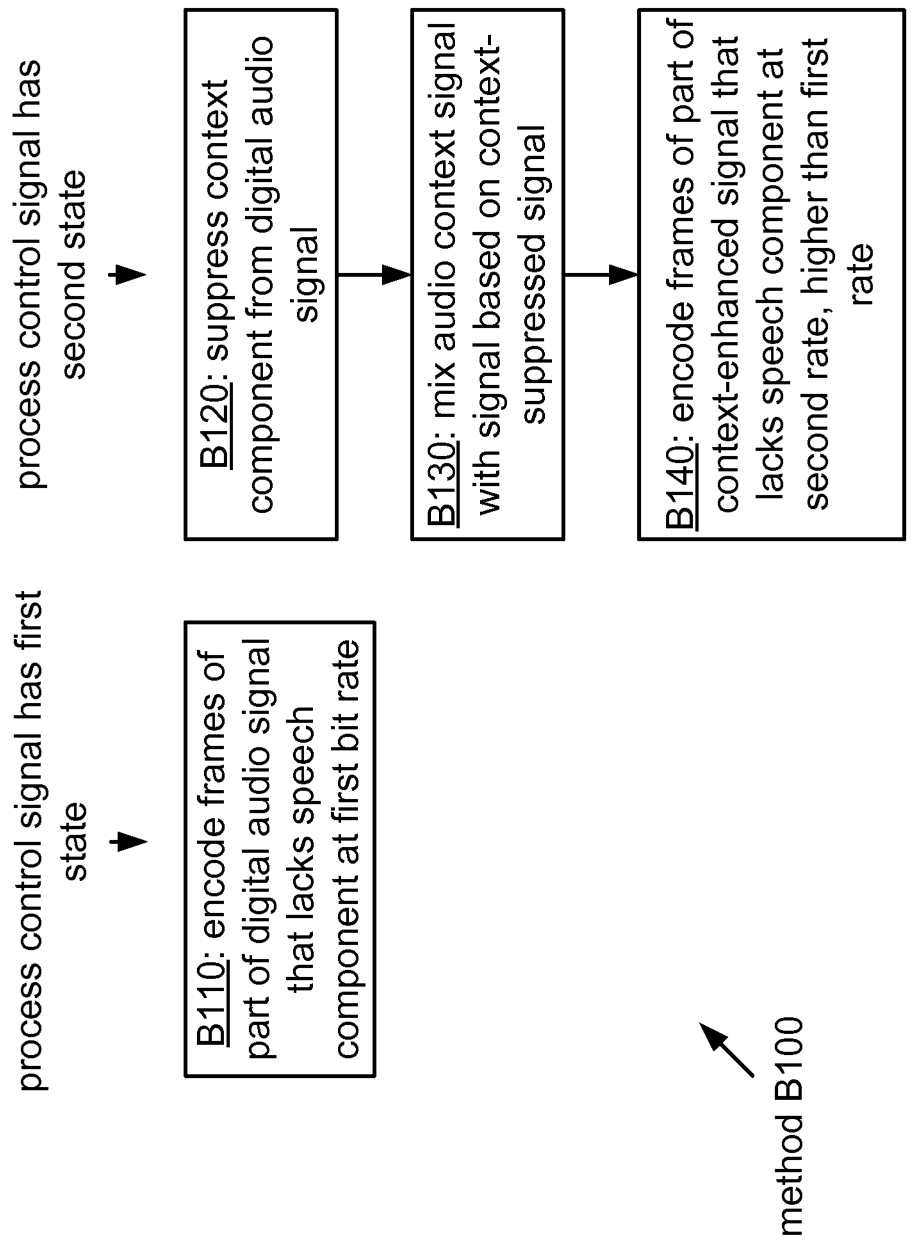
FIG. 26A shows a flowchart of a method B100 according to a disclosed configuration.

FIG. 26A shows a flowchart of a method B100, according to a disclosed configuration, of processing a digital audio signal according to a state of a process control signal, the digital audio signal having a speech component and a context component. Method B100 includes tasks B110, B120, B130, and B140. Task B110 encodes frames of a part of the digital audio signal that lacks the speech component at a first bit rate when the process control signal has a first state. Task B120 suppresses the context component from the digital audio signal, when the process control signal has a second state different than the first state, to obtain a context-suppressed signal. Task B130 mixes an audio context signal with a signal that is based on the context-suppressed signal, when the process control signal has the second state, to obtain a context-enhanced signal. Task B140 encodes frames of a part of the context-enhanced signal that lacks the speech component at a second bit rate when the process control signal has the second state, the second bit rate being higher than the first bit rate. Method B100 may be performed, for example, by an implementation of apparatus X100 as described herein.

Figure 26B:
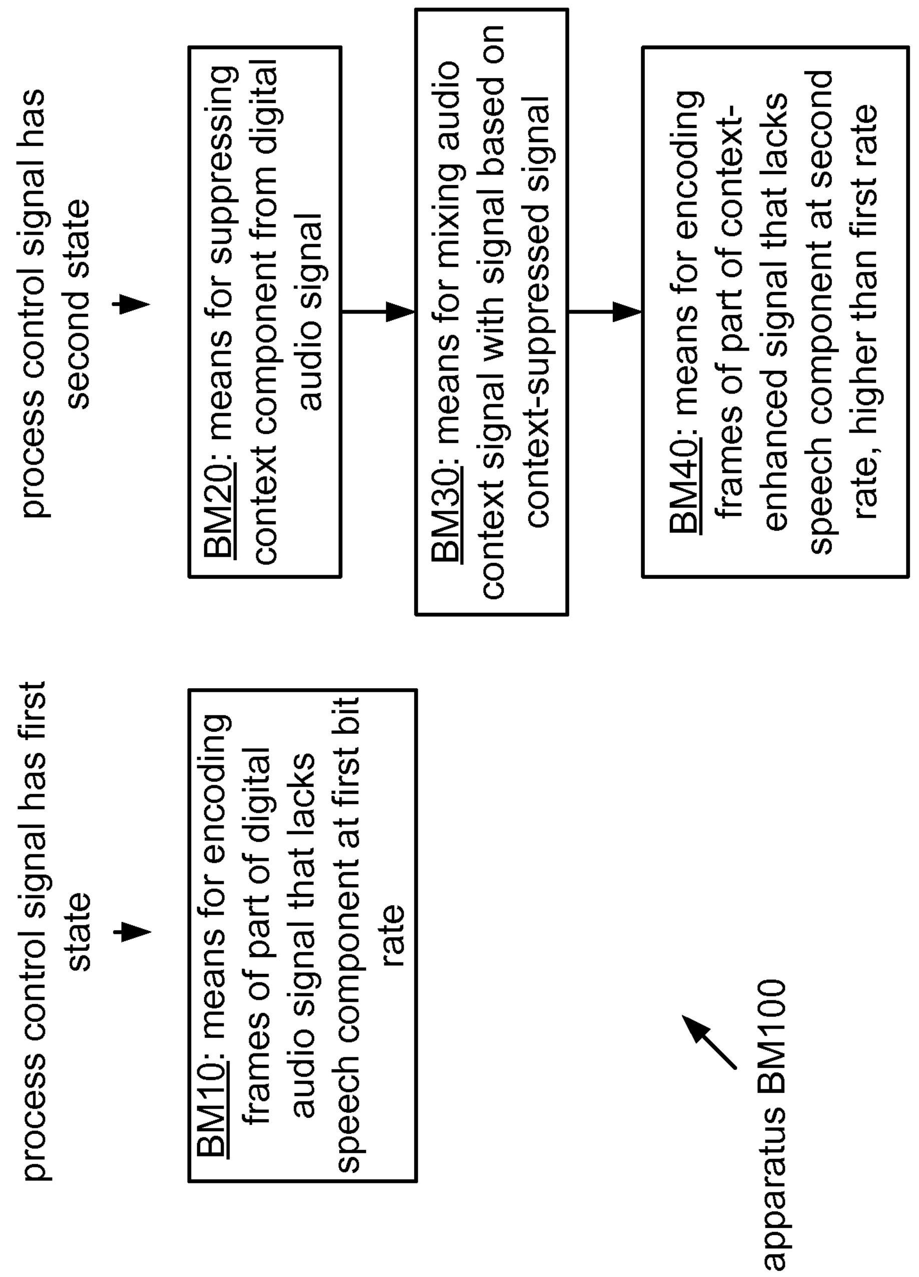
FIG. 26B shows a block diagram of an apparatus BM100 according to a disclosed configuration.

FIG. 26B shows a block diagram of an apparatus BM100, according to a disclosed configuration, for processing a digital audio signal according to a state of a process control signal, the digital audio signal having a speech component and a context component. Apparatus BM100 includes means BM10 for encoding frames of a part of the digital audio signal that lacks the speech component at a first bit rate when the process control signal has a first state. Apparatus BM100 includes means BM20 for suppressing the context component from the digital audio signal, when the process control signal has a second state different than the first state, to obtain a context-suppressed signal. Apparatus BM100 includes means BM30 for mixing an audio context signal with a signal that is based on the context-suppressed signal, when the process control signal has the second state, to obtain a context-enhanced signal. Apparatus BM100 includes means BM40 for encoding frames of a part of the context-enhanced signal that lacks the speech component at a second bit rate when the process control signal has the second state, the second bit rate being higher than the first bit rate. The various elements of apparatus BM100 may be implemented using any structures capable of performing such tasks, including any of the structures for performing such tasks that are disclosed herein (e.g., as one or more sets of instructions, one or more arrays of logic elements, etc.). Examples of the various elements of apparatus BM100 are disclosed herein in the description of apparatus X100.

Figure 27A:
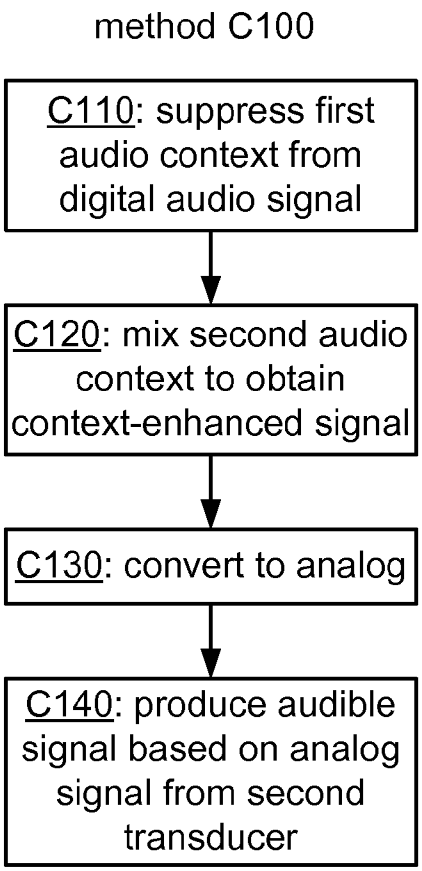
FIG. 27A shows a flowchart of a method C100 according to a disclosed configuration.

FIG. 27A shows a flowchart of a method C100, according to a disclosed configuration, of processing a digital audio signal that is based on a signal received from a first transducer. Method C100 includes tasks C110, C120, C130, and C140. Task C110 suppresses a first audio context from the digital audio signal to obtain a context-suppressed signal. Task C120 mixes a second audio context with a signal that is based on the context-suppressed signal to obtain a context-enhanced signal. Task C130 converts a signal that is based on at least one among (A) the second audio context and (B) the context-enhanced signal to an analog signal. Task C140 produces an audible signal, which is based on the analog signal, from a second transducer. In this method, both of the first and second transducers are located within a common housing. Method C100 may be performed, for example, by an implementation of apparatus X100 or X300 as described herein.

Figure 27B:
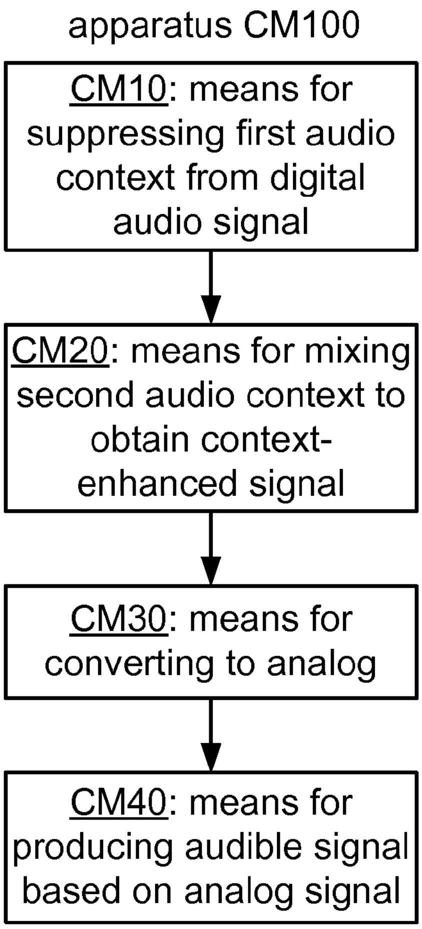
FIG. 27B shows a block diagram of an apparatus CM100 according to a disclosed configuration.

FIG. 27B shows a block diagram of an apparatus CM100, according to a disclosed configuration, for processing a digital audio signal that is based on a signal received from a first transducer. Apparatus CM100 includes means for performing the various tasks of method C100. Apparatus CM100 includes means CM110 for suppressing a first audio context from the digital audio signal to obtain a context-suppressed signal. Apparatus CM100 includes means CM120 for mixing a second audio context with a signal that is based on the context-suppressed signal to obtain a context-enhanced signal. Apparatus CM100 includes means CM130 for converting a signal that is based on at least one among (A) the second audio context and (B) the context-enhanced signal to an analog signal. Apparatus CM100 includes means CM140 for producing an audible signal, which is based on the analog signal, from a second transducer. In this apparatus, both of the first and second transducers are located within a common housing. The various elements of apparatus CM100 may be implemented using any structures capable of performing such tasks, including any of the structures for performing such tasks that are disclosed herein (e.g., as one or more sets of instructions, one or more arrays of logic elements, etc.). Examples of the various elements of apparatus CM100 are disclosed herein in the descriptions of apparatus X100 and X300.

Figure 28A:
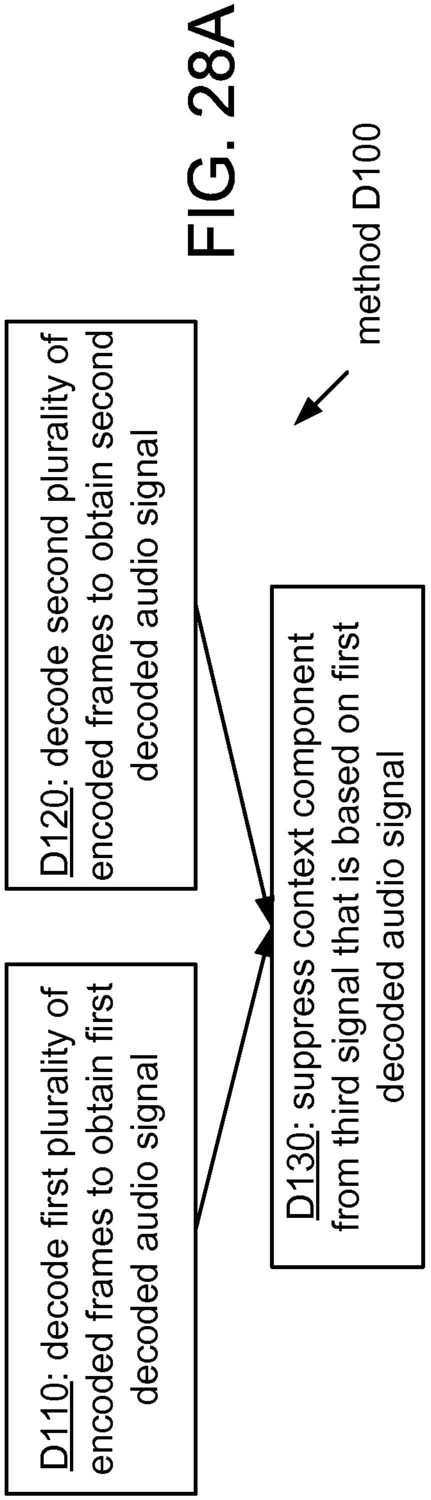
FIG. 28A shows a flowchart of a method D100 according to a disclosed configuration.

FIG. 28A shows a flowchart of a method D100, according to a disclosed configuration, of processing an encoded audio signal. Method D100 includes tasks D10, D120, and D130. Task D110 decodes a first plurality of encoded frames of the encoded audio signal according to a first coding scheme to obtain a first decoded audio signal that includes a speech component and a context component. Task D120 decodes a second plurality of encoded frames of the encoded audio signal according to a second coding scheme to obtain a second decoded audio signal. Based on information from the second decoded audio signal, task D130 suppresses the context component from a third signal that is based on the first decoded audio signal to obtain a context-suppressed signal. Method D100 may be performed, for example, by an implementation of apparatus R100, R200, or R300 as described herein.

Figure 28B:
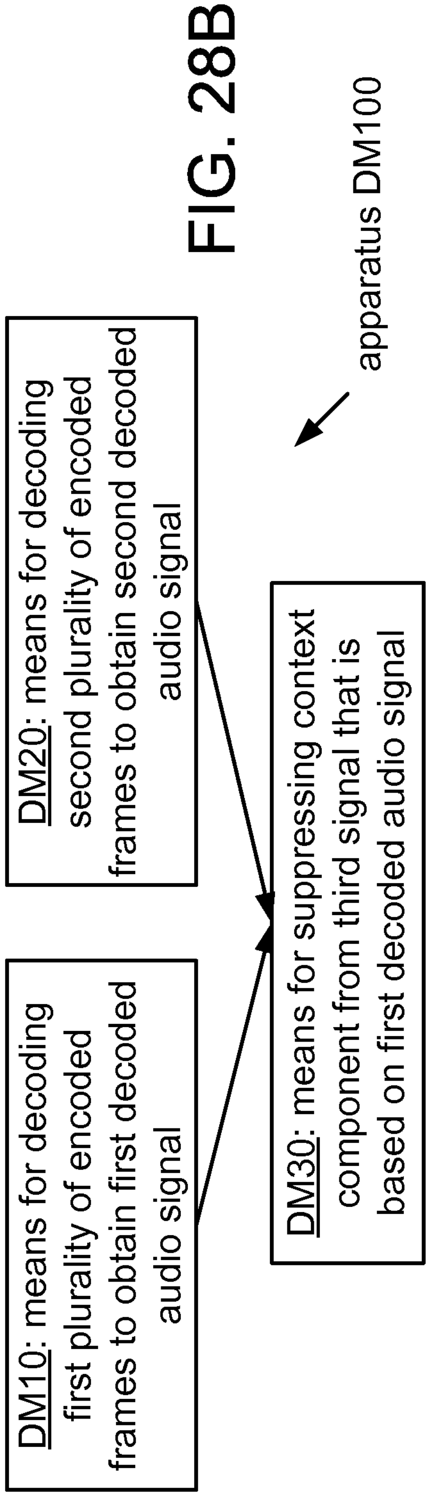
FIG. 28B shows a block diagram of an apparatus DM100 according to a disclosed configuration.

FIG. 28B shows a block diagram of an apparatus DM100, according to a disclosed configuration, for processing an encoded audio signal. Apparatus DM100 includes means for performing the various tasks of method D100. Apparatus DM100 includes means DM10 for decoding a first plurality of encoded frames of the encoded audio signal according to a first coding scheme to obtain a first decoded audio signal that includes a speech component and a context component. Apparatus DM100 includes means DM20 for decoding a second plurality of encoded frames of the encoded audio signal according to a second coding scheme to obtain a second decoded audio signal. Apparatus DM100 includes means DM30 for suppressing, based on information from the second decoded audio signal, the context component from a third signal that is based on the first decoded audio signal to obtain a context-suppressed signal. The various elements of apparatus DM100 may be implemented using any structures capable of performing such tasks, including any of the structures for performing such tasks that are disclosed herein (e.g., as one or more sets of instructions, one or more arrays of logic elements, etc.). Examples of the various elements of apparatus DM100 are disclosed herein in the descriptions of apparatus R100, R200, and R300.

Figure 29A:
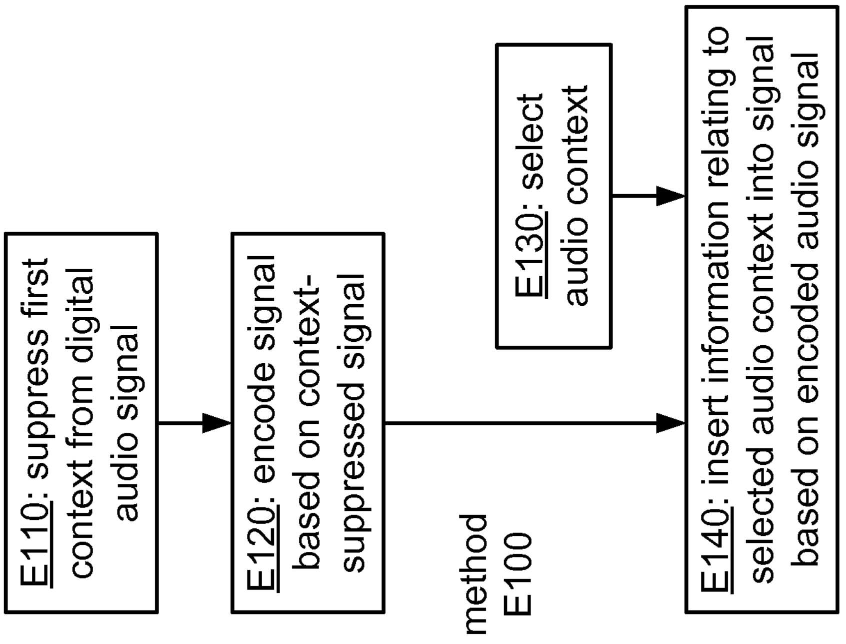
FIG. 29A shows a flowchart of a method E100 according to a disclosed configuration.

FIG. 29A shows a flowchart of a method E100, according to a disclosed configuration, of processing a digital audio signal that includes a speech component and a context component. Method E100 includes tasks E110, E120, E130, and E140. Task E110 suppresses the context component from the digital audio signal to obtain a context-suppressed signal. Task E120 encodes a signal that is based on the context-suppressed signal to obtain an encoded audio signal. Task E130 selects one among a plurality of audio contexts. Task E140 inserts information relating to the selected audio context into a signal that is based on the encoded audio signal. Method E100 may be performed, for example, by an implementation of apparatus X100 or X300 as described herein.

Figure 29B:
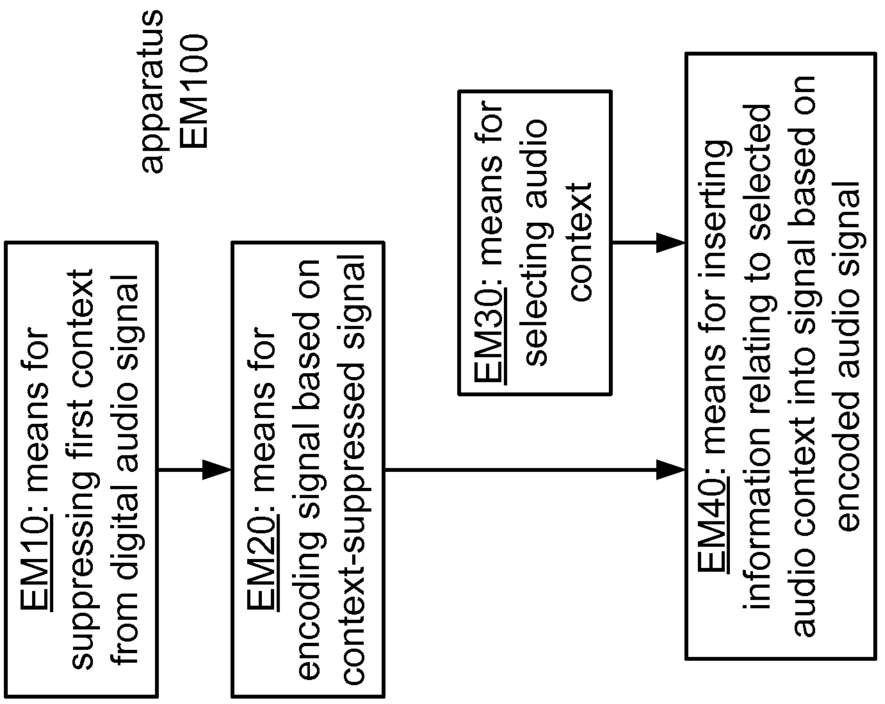
FIG. 29B shows a block diagram of an apparatus EM100 according to a disclosed configuration.

FIG. 29B shows a block diagram of an apparatus EM100, according to a disclosed configuration, for processing a digital audio signal that includes a speech component and a context component. Apparatus EM100 includes means for performing the various tasks of method E100. Apparatus EM100 includes means EM10 for suppressing the context component from the digital audio signal to obtain a context-suppressed signal. Apparatus EM100 includes means EM20 for encoding a signal that is based on the context-suppressed signal to obtain an encoded audio signal. Apparatus EM100 includes means EM30 for selecting one among a plurality of audio contexts. Apparatus EM100 includes means EM40 for inserting information relating to the selected audio context into a signal that is based on the encoded audio signal. The various elements of apparatus EM100 may be implemented using any structures capable of performing such tasks, including any of the structures for performing such tasks that are disclosed herein (e.g., as one or more sets of instructions, one or more arrays of logic elements, etc.). Examples of the various elements of apparatus EM100 are disclosed herein in the descriptions of apparatus X100 and X300.

Figure 30A:
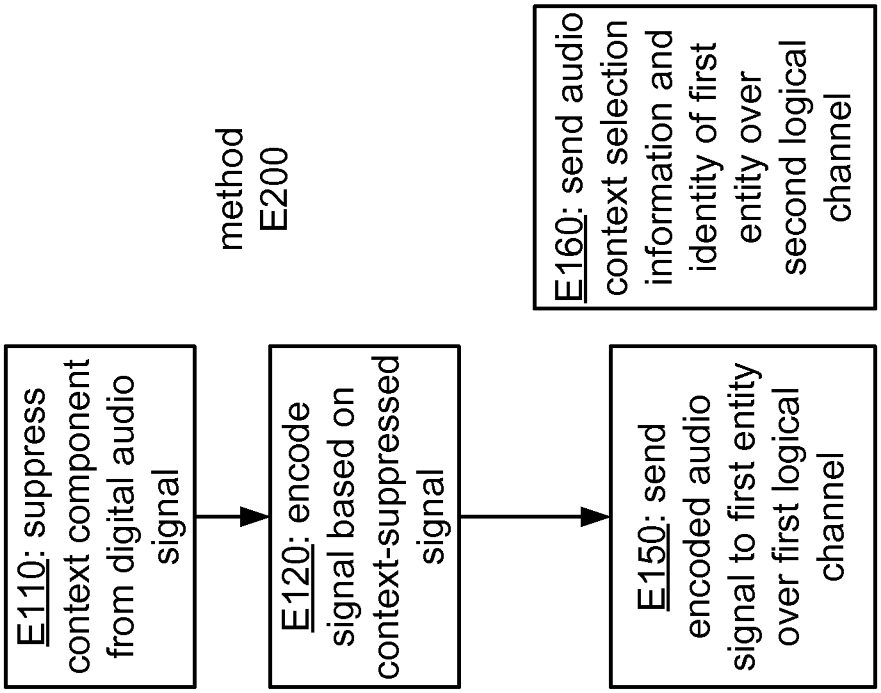
FIG. 30A shows a flowchart of a method E200 according to a disclosed configuration.

FIG. 30A shows a flowchart of a method E200, according to a disclosed configuration, of processing a digital audio signal that includes a speech component and a context component. Method E200 includes tasks E110, E120, E150, and E160. Task E150 sends the encoded audio signal to a first entity over a first logical channel. Task E160 sends, to a second entity and over a second logical channel different than the first logical channel, (A) audio context selection information and (B) information identifying the first entity. Method E200 may be performed, for example, by an implementation of apparatus X100 or X300 as described herein.

Figure 30B:
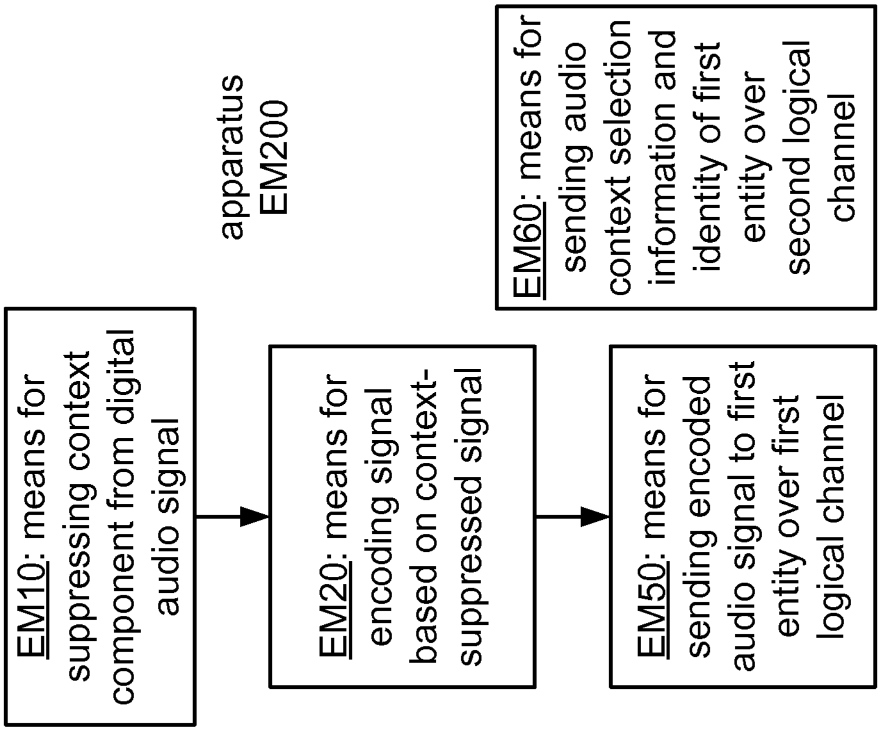
FIG. 30B shows a block diagram of an apparatus EM200 according to a disclosed configuration.

FIG. 30B shows a block diagram of an apparatus EM200, according to a disclosed configuration, for processing a digital audio signal that includes a speech component and a context component. Apparatus EM200 includes means for performing the various tasks of method E200. Apparatus EM200 includes means EM10 and EM20 as described above. Apparatus EM100 includes means EM50 for sending the encoded audio signal to a first entity over a first logical channel. Apparatus EM100 includes means EM60 for sending, to a second entity and over a second logical channel different than the first logical channel, (A) audio context selection information and (B) information identifying the first entity. The various elements of apparatus EM200 may be implemented using any structures capable of performing such tasks, including any of the structures for performing such tasks that are disclosed herein (e.g., as one or more sets of instructions, one or more arrays of logic elements, etc.). Examples of the various elements of apparatus EM200 are disclosed herein in the descriptions of apparatus X100 and X300.

Figure 31A:
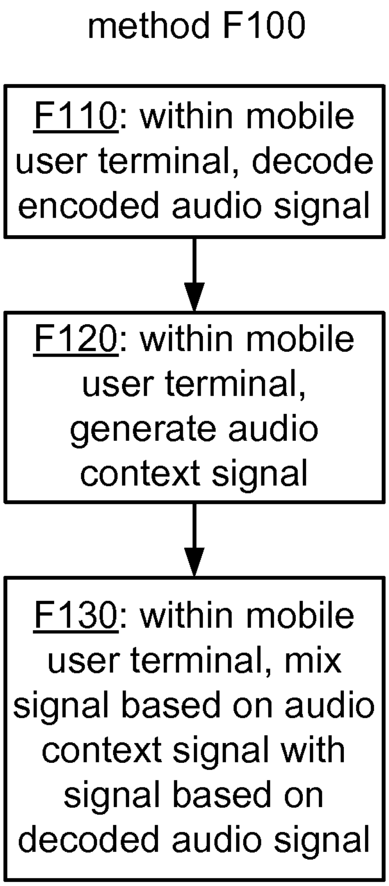
FIG. 31A shows a flowchart of a method F100 according to a disclosed configuration.

FIG. 31A shows a flowchart of a method F100, according to a disclosed configuration, of processing an encoded audio signal. Method F100 includes tasks F10, F120, and F130. Within a mobile user terminal, task F110 decodes the encoded audio signal to obtain a decoded audio signal. Within the mobile user terminal, task F120 generates an audio context signal. Within the mobile user terminal, task F130 mixes a signal that is based on the audio context signal with a signal that is based on the decoded audio signal. Method F100 may be performed, for example, by an implementation of apparatus R100, R200, or R300 as described herein.

Figure 31B:
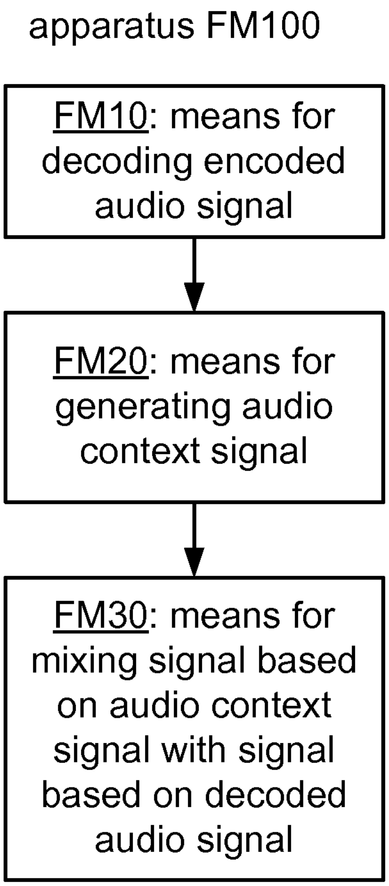
FIG. 31B shows a block diagram of an apparatus FM100 according to a disclosed configuration.

FIG. 31B shows a block diagram of an apparatus FM100, according to a disclosed configuration, for processing an encoded audio signal and located within a mobile user terminal. Apparatus FM100 includes means for performing the various tasks of method F100. Apparatus FM100 includes means FM10 for decoding the encoded audio signal to obtain a decoded audio signal. Apparatus FM100 includes means FM20 for generating an audio context signal. Apparatus FM100 includes means FM30 for mixing a signal that is based on the audio context signal with a signal that is based on the decoded audio signal. The various elements of apparatus FM100 may be implemented using any structures capable of performing such tasks, including any of the structures for performing such tasks that are disclosed herein (e.g., as one or more sets of instructions, one or more arrays of logic elements, etc.). Examples of the various elements of apparatus FM100 are disclosed herein in the descriptions of apparatus R100, R200, and R300.

Figure 32A:
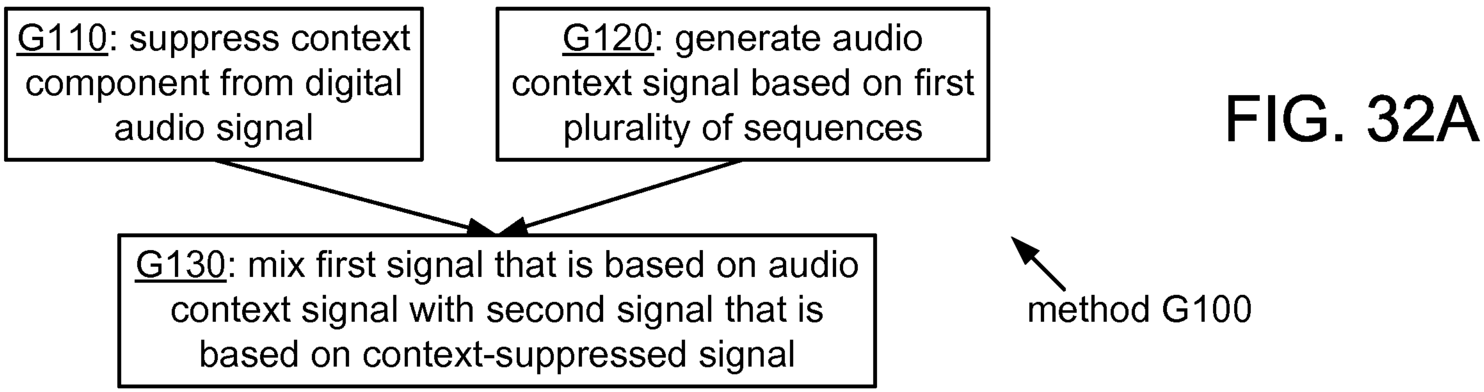
FIG. 32A shows a flowchart of a method G100 according to a disclosed configuration.

FIG. 32A shows a flowchart of a method G100, according to a disclosed configuration, of processing a digital audio signal that includes a speech component and a context component. Method G100 includes tasks G110, G120, and G130. Task G100 suppresses the context component from the digital audio signal to obtain a context-suppressed signal. Task G120 generates an audio context signal that is based on a first filter and a first plurality of sequences, each of the first plurality of sequences having a different time resolution. Task G120 includes applying the first filter to each of the first plurality of sequences. Task G130 mixes a first signal that is based on the generated audio context signal with a second signal that is based on the context-suppressed signal to obtain a context-enhanced signal. Method G100 may be performed, for example, by an implementation of apparatus X100, X300, R100, R200, or R300 as described herein.

Figure 32B:
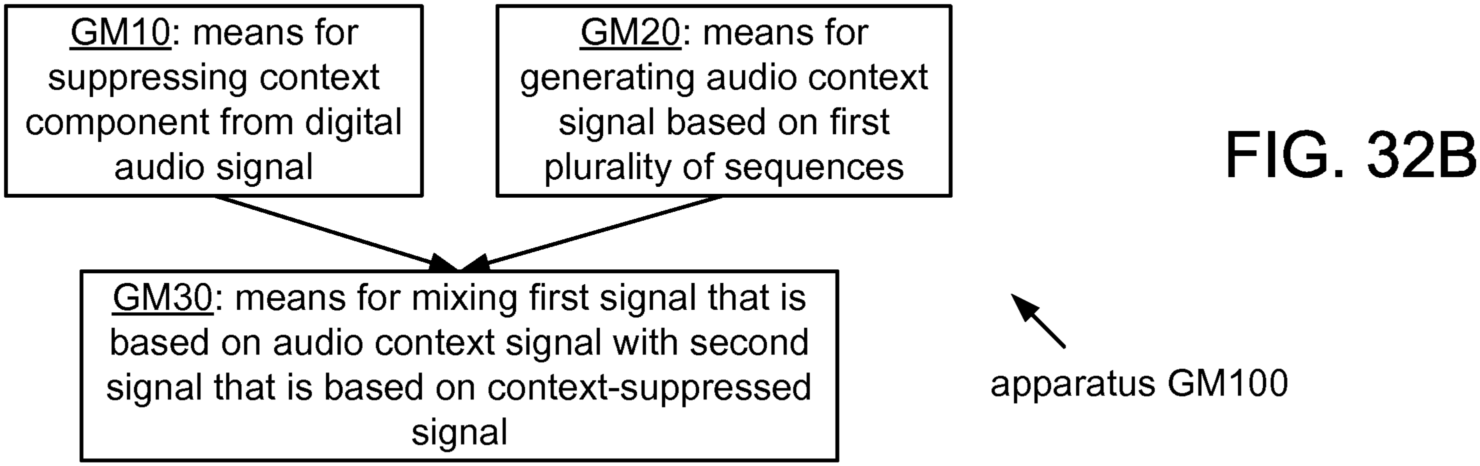
FIG. 32B shows a block diagram of an apparatus GM100 according to a disclosed configuration.

FIG. 32B shows a block diagram of an apparatus GM100, according to a disclosed configuration, for processing a digital audio signal that includes a speech component and a context component. Apparatus GM100 includes means for performing the various tasks of method G100. Apparatus GM100 includes means GM10 for suppressing the context component from the digital audio signal to obtain a context-suppressed signal. Apparatus GM100 includes means GM20 for generating an audio context signal that is based on a first filter and a first plurality of sequences, each of the first plurality of sequences having a different time resolution. Means GM20 includes means for applying the first filter to each of the first plurality of sequences. Apparatus GM100 includes means GM30 for mixing a first signal that is based on the generated audio context signal with a second signal that is based on the context-suppressed signal to obtain a context-enhanced signal. The various elements of apparatus GM100 may be implemented using any structures capable of performing such tasks, including any of the structures for performing such tasks that are disclosed herein (e.g., as one or more sets of instructions, one or more arrays of logic elements, etc.). Examples of the various elements of apparatus GM100 are disclosed herein in the descriptions of apparatus X100, X300, R100, R200, and R300.

Figure 33A:
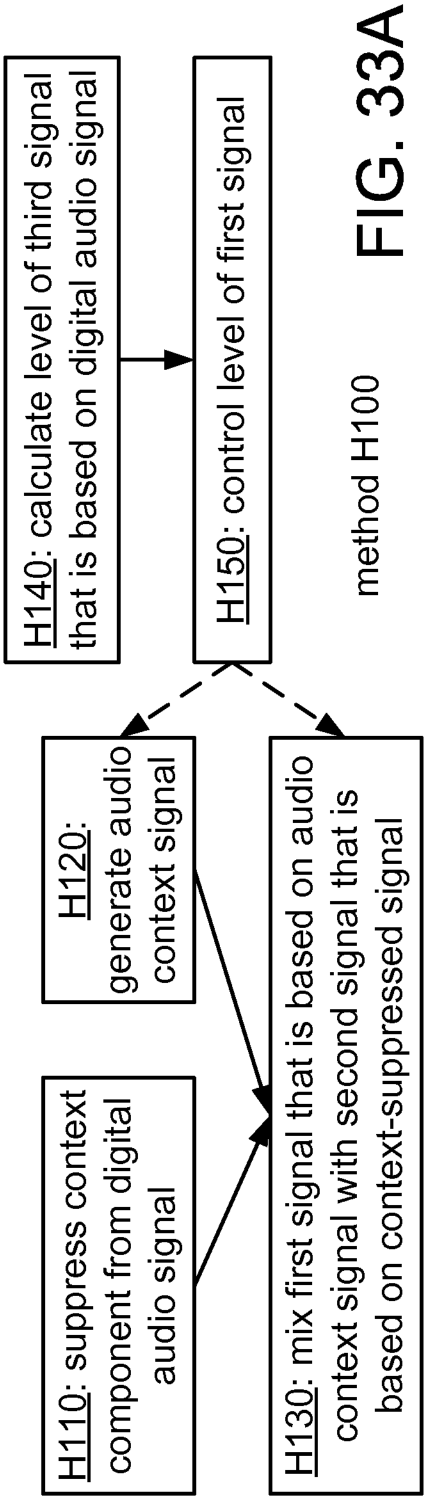
FIG. 33A shows a flowchart of a method H100 according to a disclosed configuration.

FIG. 33A shows a flowchart of a method H100, according to a disclosed configuration, of processing a digital audio signal that includes a speech component and a context component. Method H100 includes tasks H110, H120, H130, H140, and H150. Task H110 suppresses the context component from the digital audio signal to obtain a context-suppressed signal. Task H120 generates an audio context signal. Task H130 mixes a first signal that is based on the generated audio context signal with a second signal that is based on the context-suppressed signal to obtain a context-enhanced signal. Task H140 calculates a level of a third signal that is based on the digital audio signal. At least one among tasks H120 and H130 includes controlling, based on the calculated level of the third signal, a level of the first signal. Method H100 may be performed, for example, by an implementation of apparatus X100, X300, R100, R200, or R300 as described herein.

Figure 33B:
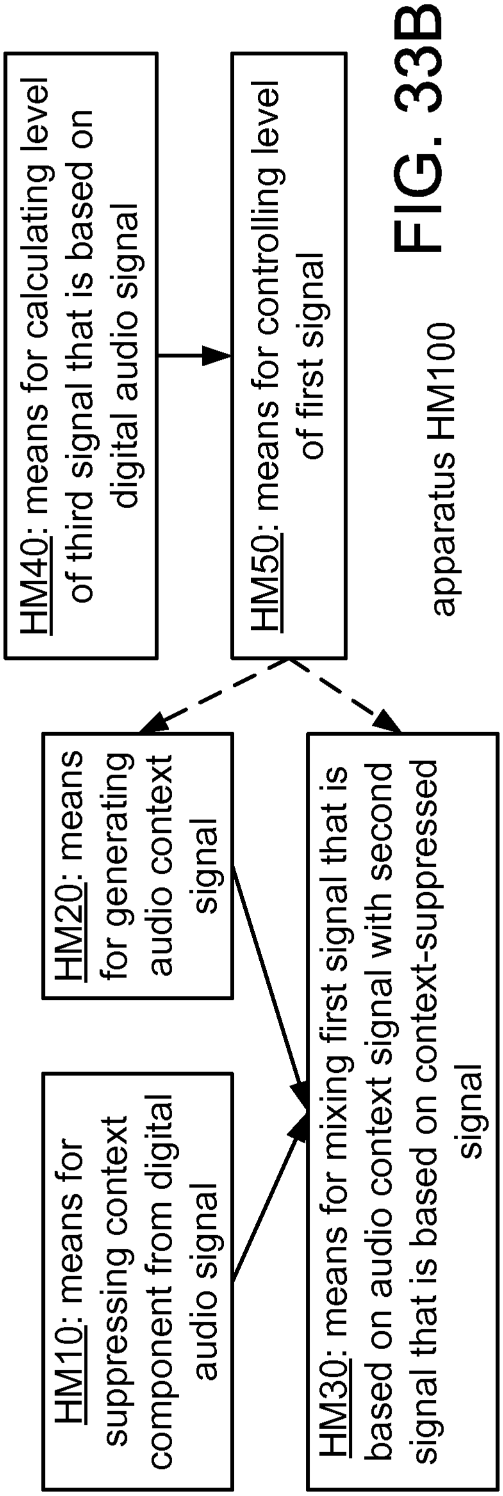
FIG. 33B shows a block diagram of an apparatus HM100 according to a disclosed configuration.

FIG. 33B shows a block diagram of an apparatus HM100, according to a disclosed configuration, for processing a digital audio signal that includes a speech component and a context component. Apparatus HM100 includes means for performing the various tasks of method H100. Apparatus HM100 includes means HM10 for suppressing the context component from the digital audio signal to obtain a context-suppressed signal. Apparatus HM100 includes means HM20 for generating an audio context signal. Apparatus HM100 includes means HM30 for mixing a first signal that is based on the generated audio context signal with a second signal that is based on the context-suppressed signal to obtain a context-enhanced signal. Apparatus HM100 includes means HM40 for calculating a level of a third signal that is based on the digital audio signal. At least one among means HM20 and HM30 includes means for controlling, based on the calculated level of the third signal, a level of the first signal. The various elements of apparatus HM100 may be implemented using any structures capable of performing such tasks, including any of the structures for performing such tasks that are disclosed herein (e.g., as one or more sets of instructions, one or more arrays of logic elements, etc.). Examples of the various elements of apparatus HM100 are disclosed herein in the descriptions of apparatus X100, X300, R100, R200, and R300.

The foregoing presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. For example, it is emphasized that the scope of this disclosure is not limited to the illustrated configurations. Rather, it is expressly contemplated and hereby disclosed that features of the different particular configurations as described herein may be combined to produce other configurations that are included within the scope of this disclosure, for any case in which such features are not inconsistent with one another. For example, any of the various configurations of context suppression, context generation, and context mixing may be combined, so long as such combination is not inconsistent with the descriptions of those elements herein. It is also expressly contemplated and hereby disclosed that where a connection is described between two or more elements of an apparatus, one or more intervening elements (such as a filter) may exist, and that where a connection is described between two or more tasks of a method, one or more intervening tasks or operations (such as a filtering operation) may exist.

Examples of codecs that may be used with, or adapted for use with, encoders and decoders as described herein include an Enhanced Variable Rate Codec (EVRC) as described in the 3GPP2 document C.S0014-C referenced above; the Adaptive Multi Rate (AMR) speech codec as described in the ETSI document TS126 092 V6.0.0, ch. 6, December 2004; and the AMR Wideband speech codec, as described in the ETSI document TS126 192 V6.0.0., ch. 6, December 2004. Examples of radio protocols that may be used with encoders and decoders as described herein include Interim Standard-95 (IS-95) and CDMA2000 (as described in specifications published by Telecommunications Industry Association (TIA), Arlington, Va.), AMR (as described in the ETSI document TS 26.101), GSM (Global System for Mobile communications, as described in specifications published by ETSI), UMTS (Universal Mobile Telecommunications System, as described in specifications published by ETSI), and W-CDMA (Wideband Code Division Multiple Access, as described in specifications published by the International Telecommunication Union).

The configurations described herein may be implemented in part or in whole as a hard-wired circuit, as a circuit configuration fabricated into an application-specific integrated circuit, or as a firmware program loaded into non-volatile storage or a software program loaded from or into a computer-readable medium as machine-readable code, such code being instructions executable by an array of logic elements such as a microprocessor or other digital signal processing unit. The computer-readable medium may be an array of storage elements such as semiconductor memory (which may include without limitation dynamic or static RAM (random-access memory), ROM (read-only memory), and/or flash RAM), or ferroelectric, magnetoresistive, ovonic, polymeric, or phase-change memory; a disk medium such as a magnetic or optical disk; or any other computer-readable medium for data storage. The term “software” should be understood to include source code, assembly language code, machine code, binary code, firmware, macrocode, microcode, any one or more sets or sequences of instructions executable by an array of logic elements, and any combination of such examples.

Each of the methods disclosed herein may also be tangibly embodied (for example, in one or more computer-readable media as listed above) as one or more sets of instructions readable and/or executable by a machine including an array of logic elements (e.g., a processor, microprocessor, microcontroller, or other finite state machine). Thus, the present disclosure is not intended to be limited to the configurations shown above but rather is to be accorded the widest scope consistent with the principles and novel features disclosed in any fashion herein, including in the attached claims as filed, which form a part of the original disclosure.

What is claimed is:

1. A method of mixing an enhanced context signal with an audio signal comprising:

receiving a first digital audio signal from a first microphone positioned to primarily receive a first audio context;

suppressing noise from the first digital audio signal to obtain a noise-suppressed context signal;

selecting from at least two or more audio contexts, a second audio context wherein the selecting is based on the first digital audio signal;

mixing the second audio context with the noise suppressed context signal to obtain an enhanced audio context;

receiving a second audio signal from a second microphone positioned to primarily receive a speech component; and mixing the enhanced audio context with the second audio signal to obtain a context-enhanced signal.

2. The method according to claim 1, wherein the first and second microphones are located within a common housing.

3. The method according to claim 1, wherein said suppressing noise comprises performing, based on information from the first audio signal, a blind source separation operation on the first digital audio signal.

4. The method according to claim 1, wherein said suppressing noise comprises performing, based on information from the first audio signal, a spectral subtraction operation on a signal that is based on the first digital audio signal.

5. The method according to claim 1, wherein said suppressing noise comprises performing a center clipping operation on a signal that is based on the first digital audio signal.

6. The method according to claim 1, wherein said method comprises encoding a third audio signal that is based on the context-enhanced signal to obtain a series of encoded frames, wherein said encoding the third audio signal includes performing a linear prediction coding analysis on the third audio signal.

7. The method of claim 1, wherein the selecting of a second audio context is based on information relating to one or more temporal or frequency characteristics of one or more inactive frames.

8. The method of claim 1, wherein the selecting of a second audio context based on a classification of the first digital audio signal, the classification based on line spectral frequencies of the first digital audio signal.

9. An apparatus for mixing an enhanced context signal with an audio signal, said apparatus comprising:

a noise suppressor configured to suppress noise from a first digital audio signal, based on a first audio signal that is produced by a first microphone arranged to produce an audio signal that contains primarily a first audio context, to obtain a noise-suppressed context signal;

a context classifier configured to select from at least two or more audio contexts, a second audio context, wherein the selecting is based on the first digital audio signal; and a context mixer configured to mix the second audio context with the noise suppressed context signal to obtain an enhanced audio context signal, and to mix the enhanced audio context signal with a second digital audio signal to obtain a context-enhanced signal, wherein the second digital audio signal is based on a second audio signal that is produced by a second microphone arranged to produce an audio signal that contains primarily a speech component.

10. The apparatus according to claim 9, wherein the first and second microphones are located within a common housing.

11. The apparatus according to claim 9, wherein said noise suppressor is configured to perform, based on information from the first audio signal, a blind source separation operation on the first digital audio signal.

12. The apparatus according to claim 9, wherein said noise suppressor is configured to perform, based on information from the first audio signal, a spectral subtraction operation on a signal that is based on the first digital audio signal.

13. The apparatus according to claim 9, wherein said noise suppressor is configured to perform a center clipping operation on a signal that is based on the first digital audio signal.

14. The apparatus according to claim 9, wherein said apparatus comprises an encoder configured to encode a third audio signal that is based on the context-enhanced signal to obtain a series of encoded frames, wherein said encoder is configured to perform a linear prediction coding analysis on the third audio signal.

15. An apparatus for mixing an enhanced context signal with an audio signal, said apparatus comprising:

means for suppressing noise from a first digital audio signal, based on a first audio signal that is produced by a first microphone arranged to produce an audio signal that contains primarily a first audio context, to obtain a noise-suppressed context signal;

means for selecting from at least two or more audio contexts, a second audio context, wherein the selecting is based on the first audio signal; and means for mixing the second audio context with the noise suppressed context signal to obtain an enhanced audio context;

means for mixing the enhanced audio context with a second audio signal to obtain a context-enhanced signal, wherein the second audio signal is based on a signal that is produced by a second microphone arranged to produce an audio signal that contains primarily a speech component.

16. The apparatus according to claim 15, wherein the first and second microphones are located within a common housing.

17. The apparatus according to claim 15, wherein said means for suppressing noise comprises means for performing, based on information from the first audio signal, a blind source separation operation on the first digital audio signal.

18. The apparatus according to claim 15, wherein said means for suppressing noise comprises means for performing, based on information from the first audio signal, a spectral subtraction operation on a signal that is based on the first digital audio signal.

19. The apparatus according to claim 15, wherein said means for suppressing noise comprises means for performing a center clipping operation on a signal that is based on the first digital audio signal.

20. The apparatus according to claim 15, wherein said apparatus comprises means for encoding a third audio signal that is based on the context-enhanced signal to obtain a series of encoded frames, wherein said means for encoding the third audio signal includes means for performing a linear prediction coding analysis on the third audio signal.

21. A non transitory computer-readable medium comprising instructions, which when executed by a processor cause the processor to:

suppress noise from a first digital audio signal, based on a first audio signal that is produced by a first microphone arranged to produce an audio signal that contains primarily a first audio context, to obtain a noise-suppressed context signal;

select from at least two or more audio contexts, a second audio context based on the first audio signal;

mix the second audio context with a signal that is based on the noise-suppressed context signal to obtain an enhanced audio context signal;

mix the enhanced audio context signal with a second digital audio signal to obtain a context enhanced signal, wherein the second digital audio signal is based on a second audio signal that is produced by a second microphone arranged to produce an audio signal that contains primarily a speech component.

22. The computer-readable medium according to claim 21, wherein the first and second microphones are located within a common housing.

23. The computer-readable medium according to claim 21, wherein said instructions which when executed by a processor cause the processor to suppress noise are configured to cause the processor to perform, based on information from the first audio signal, a blind source separation operation on the first digital audio signal.

24. The computer-readable medium according to claim 21, wherein said instructions which when executed by a processor cause the processor to suppress noise are configured to cause the processor to perform, based on information from the first audio signal, a spectral subtraction operation on a signal that is based on the first digital audio signal.

25. The computer-readable medium according to claim 21, wherein said instructions which when executed by a processor cause the processor to suppress noise are configured to cause the processor to perform a center clipping operation on a signal that is based on the first digital audio signal.

26. The computer-readable medium according to claim 21, wherein said medium comprises instructions which when executed by a processor cause the processor to encode a third audio signal that is based on the context-enhanced signal to obtain a series of encoded frames, wherein said instructions which when executed by a processor cause the processor to encode the third audio signal are configured to cause the processor to perform a linear prediction coding analysis on the third audio signal.

* * * * *